US008885470B2

(12) United States Patent
Raveendran et al.

(10) Patent No.: US 8,885,470 B2
(45) Date of Patent: *Nov. 11, 2014

(54) METHODS AND SYSTEMS FOR RESIZING MULTIMEDIA CONTENT BASED ON QUALITY AND RATE INFORMATION

(75) Inventors: Vijayalakshmi R. Raveendran, San Diego, CA (US); Gordon Kent Walker, San Diego, CA (US); Binita Gupta, La Jolla, CA (US); Phanikumar Bhamidipati, San Diego, CA (US); Bruce Collins, San Diego, CA (US); Devarshi Shah, San Diego, CA (US); Robert S. Daly, Del Mar, CA (US); Sten Jorgen Dahl, San Diego, CA (US); Serafim S. Loukas, Carlsbad, CA (US); Bharat Ahuja, Longmont, CO (US); Thadi M. Nagaraj, San Diego, CA (US); Vinod Kaushik, San Diego, CA (US); Prasanna Kannan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/175,786
(22) Filed: Jul. 1, 2011
(65) Prior Publication Data
US 2011/0299587 A1 Dec. 8, 2011

Related U.S. Application Data

(63) Continuation of application No. 11/700,369, filed on Jan. 30, 2007, now Pat. No. 7,974,193, which is a (Continued)

(51) Int. Cl.
*H04L 1/00* (2006.01)
*H04N 21/2365* (2011.01)

(Continued)

(52) U.S. Cl.
CPC ....... *H04N 19/002* (2013.01); *H04N 19/00472* (2013.01); *H04N 21/23655* (2013.01); *H04L*

(Continued)

(58) Field of Classification Search
CPC .................................................. H04N 21/2365
See application file for complete search history.

(56) References Cited

U.S. PATENT DOCUMENTS

| 5,426,463 A | 6/1995 | Reininger et al. |
| 5,764,632 A | 6/1998 | Ylitervo |

(Continued)

FOREIGN PATENT DOCUMENTS

| CN | 1492685 A | 4/2004 |
| CN | 1555612 A | 12/2004 |

(Continued)

OTHER PUBLICATIONS

International Search Report—PCT/US2008/052497, International Search Authority—European Patent Office, Jul. 24, 2008.

(Continued)

*Primary Examiner* — Jianye Wu
(74) *Attorney, Agent, or Firm* — Arent Fox LLP

(57) ABSTRACT

In general, this disclosure describes techniques for exchanging information between a plurality of encoder modules and a multiplex module to combine segments of data from the encoder modules with an improved overall quality. In particular, the encoder modules associate their respective segments of data with quality and rate information and send at least the quality and rate information associated with the segments of data to the multiplex module. The multiplex module analyzes the quality and rate information to determine whether the segments of data that encoder modules desire to include in the current superframe fit within the available bandwidth of a transmission channel. If the multiplex module determines the plurality of segments of data do not fit within the available bandwidth, the multiplex module selects one or more of the segments to be resized based on the quality and rate information received from the encoder modules.

14 Claims, 28 Drawing Sheets

Related U.S. Application Data continuation-in-part of application No. 11/400,438, filed on Apr. 7, 2006, now Pat. No. 7,653,085.

(60) Provisional application No. 60/720,000, filed on Sep. 23, 2005, provisional application No. 60/669,406, filed on Apr. 8, 2005, provisional application No. 60/763,995, filed on Jan. 31, 2006, provisional application No. 60/832,353, filed on Jul. 20, 2006.

(51) Int. Cl.
| | |
|---|---|
| *H04N 19/40* | (2014.01) |
| *H04N 19/154* | (2014.01) |
| *H04N 21/24* | (2011.01) |
| *H04N 19/147* | (2014.01) |
| *H04N 19/19* | (2014.01) |
| *H04N 21/2381* | (2011.01) |
| *H04N 19/46* | (2014.01) |
| *H04N 21/2343* | (2011.01) |
| *H04N 21/845* | (2011.01) |
| *H04L 5/00* | (2006.01) |

(52) U.S. Cl.
CPC . 5/0064 (2013.01); *H04N 21/2402* (2013.01); *H04L 5/0044* (2013.01); *H04N 19/00175* (2013.01); *H04N 19/00351* (2013.01); *H04N 21/2381* (2013.01); *H04L 5/0007* (2013.01); *H04N 19/00545* (2013.01); *H04N 21/234354* (2013.01); *H04N 21/8456* (2013.01)
USPC .................................. 370/230.1; 370/235.1

(56) References Cited

U.S. PATENT DOCUMENTS

| | | | |
|---|---|---|---|
| 5,844,613 A | 12/1998 | Chaddha | |
| 5,854,658 A | 12/1998 | Uz et al. | |
| 6,038,256 A | 3/2000 | Linzer et al. | |
| 6,091,777 A | 7/2000 | Guetz et al. | |
| 6,185,253 B1 | 2/2001 | Pauls | |
| 6,243,495 B1 | 6/2001 | Naveen et al. | |
| 6,256,423 B1 | 7/2001 | Krishnamurthy et al. | |
| 6,310,915 B1 | 10/2001 | Wells et al. | |
| 6,526,031 B1 | 2/2003 | Zaff et al. | |
| 6,539,124 B2 | 3/2003 | Sethuraman et al. | |
| 6,560,231 B1 | 5/2003 | Kawakami et al. | |
| 6,574,279 B1 | 6/2003 | Vetro et al. | |
| 6,674,796 B1 | 1/2004 | Haskell et al. | |
| 6,704,281 B1 | 3/2004 | Hourunranta et al. | |
| 6,744,743 B2 | 6/2004 | Walton et al. | |
| 6,895,410 B2 | 5/2005 | Ridge | |
| 6,959,042 B1 | 10/2005 | Liu et al. | |
| 7,023,915 B2 | 4/2006 | Pian et al. | |
| 7,024,480 B2 | 4/2006 | Weik | |
| 7,042,856 B2 | 5/2006 | Walton et al. | |
| 7,095,754 B2 | 8/2006 | Benveniste | |
| 7,180,905 B2 | 2/2007 | Benveniste | |
| 7,245,605 B2 | 7/2007 | Benveniste | |
| 7,248,600 B2 | 7/2007 | Benveniste | |
| 7,272,181 B2 | 9/2007 | Bayazit | |
| 7,277,415 B2 | 10/2007 | Benveniste | |
| 7,280,517 B2 | 10/2007 | Benveniste | |
| 7,400,642 B2 | 7/2008 | Koo et al. | |
| 7,406,202 B2 | 7/2008 | Kodama et al. | |
| 7,415,241 B2 | 8/2008 | Oprescu-Surcobe et al. | |
| 7,571,246 B2 | 8/2009 | Virdi et al. | |
| 7,623,458 B2 | 11/2009 | Ayyagari et al. | |
| 7,653,085 B2 | 1/2010 | Dahl et al. | |
| 7,659,907 B1 | 2/2010 | Chalfin et al. | |
| 7,746,836 B2 | 6/2010 | Jentz et al. | |
| 7,835,437 B1 | 11/2010 | Zhang et al. | |
| 7,876,821 B2 | 1/2011 | Li et al. | |
| 7,913,277 B1 | 3/2011 | Rahrer | |
| 8,351,513 B2 | 1/2013 | Wen et al. | |
| 2002/0101832 A1 | 8/2002 | Chen et al. | |
| 2002/0137535 A1 | 9/2002 | Hunzinger | |
| 2002/0141357 A1 | 10/2002 | Park et al. | |
| 2002/0142772 A1 | 10/2002 | Hunzinger | |
| 2003/0040315 A1 | 2/2003 | Khaleghi et al. | |
| 2003/0053416 A1* | 3/2003 | Ribas-Corbera et al. | 370/233 |
| 2003/0083093 A1 | 5/2003 | Yun et al. | |
| 2003/0093515 A1 | 5/2003 | Kauffman | |
| 2003/0110297 A1 | 6/2003 | Tabatabai et al. | |
| 2003/0112366 A1 | 6/2003 | Baylon et al. | |
| 2003/0123413 A1 | 7/2003 | Moon et al. | |
| 2003/0185369 A1 | 10/2003 | Oliver et al. | |
| 2004/0013102 A1 | 1/2004 | Fong et al. | |
| 2004/0013103 A1 | 1/2004 | Zhang et al. | |
| 2004/0028139 A1 | 2/2004 | Zaccarin et al. | |
| 2004/0042438 A1 | 3/2004 | Jiang et al. | |
| 2004/0087331 A1 | 5/2004 | Hwang et al. | |
| 2004/0114817 A1 | 6/2004 | Jayant et al. | |
| 2004/0165783 A1 | 8/2004 | Reynolds et al. | |
| 2005/0058058 A1 | 3/2005 | Cho et al. | |
| 2005/0063330 A1 | 3/2005 | Lee et al. | |
| 2005/0078759 A1 | 4/2005 | Zhang | |
| 2005/0110188 A1 | 5/2005 | Rausch et al. | |
| 2005/0120128 A1 | 6/2005 | Willes et al. | |
| 2005/0210515 A1 | 9/2005 | Roh et al. | |
| 2005/0220188 A1 | 10/2005 | Wang | |
| 2005/0223013 A1 | 10/2005 | Jarman et al. | |
| 2005/0286631 A1 | 12/2005 | Wu et al. | |
| 2006/0013298 A1 | 1/2006 | Tong et al. | |
| 2006/0171460 A1 | 8/2006 | Masuda et al. | |
| 2006/0262750 A1 | 11/2006 | Walton et al. | |
| 2007/0201388 A1 | 8/2007 | Shah et al. | |
| 2007/0204067 A1 | 8/2007 | Walker et al. | |
| 2007/0274340 A1 | 11/2007 | Raveendran et al. | |
| 2008/0037420 A1* | 2/2008 | Tang | 370/229 |
| 2008/0037624 A1 | 2/2008 | Walker et al. | |
| 2008/0152003 A1 | 6/2008 | Oguz | |

FOREIGN PATENT DOCUMENTS

| | | |
|---|---|---|
| EP | 0759667 A2 | 2/1997 |
| EP | 1014632 A2 | 6/2000 |
| EP | 1061522 A2 | 12/2000 |
| EP | 1168731 A1 | 1/2002 |
| EP | 1395039 A1 | 3/2004 |
| EP | 1443511 A2 | 8/2004 |
| JP | 8018976 A | 1/1996 |
| JP | 9233475 A | 9/1997 |
| JP | 10276439 A | 10/1998 |
| JP | 2000031964 | 1/2000 |
| JP | 2000092471 A | 3/2000 |
| JP | 2000324498 A | 11/2000 |
| JP | 2001136139 A | 5/2001 |
| JP | 2002010260 A | 1/2002 |
| JP | 2003046582 A | 2/2003 |
| JP | 2004248144 A | 9/2004 |
| JP | 2004349855 A | 12/2004 |
| JP | 2005167514 A | 6/2005 |
| JP | 2006014288 A | 1/2006 |
| KR | 1019990077445 | 10/1999 |
| KR | 1020000049059 | 7/2000 |
| WO | WO 0008891 A1 | 2/2000 |
| WO | WO 0147283 A1 | 6/2001 |
| WO | WO 0207447 A1 | 1/2002 |
| WO | WO 02082743 A2 | 10/2002 |
| WO | WO 2004023743 A2 | 3/2004 |
| WO | WO2006099082 A2 | 9/2006 |
| WO | WO2006110876 A2 | 10/2006 |
| WO | 2007035238 A2 | 3/2007 |
| WO | WO 2007090176 | 8/2007 |
| WO | WO 2007090177 | 8/2007 |

OTHER PUBLICATIONS

Written Opinion—PCT/US2008/052497, International Search Authority—European Patent Office, Jul. 24, 2008.
Derryberry, Thomas R. et al, "Overview of CDMA2000, Revision D", May 28, 2002, XP-002311845.

(56) References Cited

OTHER PUBLICATIONS

Nakajima, T. et al. "Continuous media storage system supporting VBR streams." Real Time Computing Systems and Applications, 1996. Proceedings, 3rd International Workshop on Seoul, S. Korea. Oct. 30-Nov. 1, 1996. Los Alamitos, CA, IEEE Computer. Soc. US. Oct. 30, 1996, pp. 26-33.

TIA-1099, Forward Link Only Air Interface Specification for Terrestrial Mobile Multimedia Multicast, Oct. 2006.

Zheng, B. et al., "TFSD: Two stage frame dropping for scalable video transmission over data networks"—High Performance Switching and Routing, 2001 IEEE Workshop on, May 29-31, 2001, pp. 43-47.

Zhike, Jia et al., "Adaptive quantization scheme for very low bit rate video coding" Fifth Asia-Pacific Confernece on Communications and Fourth Optoelectronics and Communications Conference. APCC/OECC' 99; vol. 2, 1999, pp. 940-943.

Taiwan Search Report—TW097103554—TIPO—Sep. 2, 2012 (050559B1TW).

Taiwan Search Report—TW097103554—TIPO—Sep. 2, 2012.

3rd Generation Partnership Project (3GPP), "Physical Layer Standard for CDMA 2000 Spread Spectrum Systems", DOC. No. 3GPP2 C.S0002-C, Release C, Version 1.0, Dated May 28, 2002.

European Search Report—EP11153432—Search Authority—Hague—Mar. 6, 2014.

Zhang X., et al., "Constant-Quality Constrained-Rate Allocation For FGS Video Coded Bitstreams," Proceedings of SPIE Conference on Visual Communications and Image Processing (VCIP), Jan. 2002, pp. 817-827, vol. 4671, XP030080576.

\* cited by examiner

METHODS AND SYSTEMS FOR RESIZING MULTIMEDIA CONTENT BASED ON QUALITY AND RATE INFORMATION

This application is a Continuation of patent application Ser. No. 11/700,369 filed Jan. 30, 2007, which is a Continuation-in-part of, and claims the benefit of priority from, U.S. application Ser. No. 11/400,438, filed Apr. 7, 2006, now issued as U.S. Pat. No. 7,653,085, which claims the benefit from U.S. Provisional Application No. 60/720,000, filed Sep. 23, 2005 and U.S. Provisional Application No. 60/669,406, filed Apr. 8, 2005, the entire content of each of which is incorporated herein by reference.

This application claims the benefit of U.S. Provisional Application No. 60/832,353, filed Jul. 20, 2006 and U.S. Provisional Application No. 60/763,995, filed Jan. 31, 2006, the entire content of each of which is incorporated herein by reference.

TECHNICAL FIELD

The disclosure relates to multimedia encoding and decoding and, more particularly, multimedia resizing for efficient statistical multiplexing.

BACKGROUND

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

Content delivery/media distribution systems may pack real time and non real time services into a transmission frame and deliver the frame to devices on a network. For example, a communication network may utilize Orthogonal Frequency Division Multiplexing (OFDM) to provide communications between a network server and one or more mobile devices. This technology provides a transmission frame having data slots that are packed with services to be delivered and transmitted over a distribution network.

SUMMARY

In general, this disclosure describes techniques for exchanging information between a plurality of encoder modules and a multiplex module to combine segments of data from the encoder modules with an improved quality. In particular, the encoder modules associate their respective segments of data with quality and rate information, such as quality-rate curves and/or quality-rate tables. The encoder modules send at least the quality and rate information associated with the segments of data to the multiplex module.

The multiplex module analyzes at least the quality and rate information to determine whether the segments of data that encoder modules desire to transmit fit within the available bandwidth of a transmission channel. If the multiplex module determines the plurality of segments of data do not fit within the available bandwidth, the multiplex module selects one or more of the segments to be resized based on at least the quality and rate information received from the encoder modules. Multiplex module requests the encoder modules associated with the selected segments of data to resize the segments of data in accordance with the reduced bit allocation.

In one aspect, a method for combining flows of digital multimedia data comprises receiving at least quality and rate information for a plurality of segments of data associated with the flows of digital multimedia data, determining whether the plurality of segments of data fit within an available bandwidth, selecting one or more of the plurality of segments of data to be resized based on at least the quality and rate information associated with the plurality of segments of data when the plurality of segments of data do not fit within the available bandwidth, and requesting resizing of each of the one or more selected segments of data to achieve the available bandwidth for the plurality of segments.

In another aspect, an apparatus for combining flows of digital multimedia data comprises a data collection module that receives at least quality and rate information for a plurality of segments of data associated with the flows of digital multimedia data, an allocation module that determines whether the plurality of segments of data fit within an available bandwidth, and a selection module that selects one or more of the plurality of segments of data to be resized based on at least the quality and rate information associated with the plurality of segments of data when the plurality of segments of data do not fit within the available bandwidth and requests resizing of each of the one or more selected segments of data to achieve the available bandwidth for the plurality of segments.

In a further aspect, an apparatus for combining flows of digital multimedia data comprises means for receiving at least quality and rate information for a plurality of segments of data associated with the flows of digital multimedia data, means for determining whether the plurality of segments of data fit within an available bandwidth, means for selecting one or more of the plurality of segments of data to be resized based on at least the quality and rate information associated with the plurality of segments of data when the plurality of segments of data do not fit within the available bandwidth, and means for requesting resizing of each of the one or more selected segments of data to achieve the available bandwidth for the plurality of segments.

In another aspect, a processor for processing digital video data is adapted to receive at least quality and rate information for a plurality of segments of data associated with the flows of digital multimedia data, determine whether the plurality of segments of data fit within an available bandwidth, select one or more of the plurality of segments of data to be resized based on at least the quality and rate information associated with the plurality of segments of data when the plurality of segments of data do not fit within the available bandwidth, and request resizing of each of the one or more selected segments of data to achieve the available bandwidth for the plurality of segments.

The techniques described herein may be implemented in hardware, software, firmware, or any combination thereof. If implemented in software, the techniques may be realized in whole or in part by a computer readable medium comprising instructions that, when executed by a processor, performs one or more of the methods described herein. Accordingly, this disclosure also contemplates a computer-program product for processing digital video data comprises a computer readable medium comprising instructions that cause at least one computer to receive at least quality and rate information for a plurality of segments of data associated with the flows of digital multimedia data, determine whether the plurality of segments of data fit within an available bandwidth, select one or more of the plurality of segments of data to be resized based on at least the quality and rate information associated with the plurality of segments of data when the plurality of segments of data do not fit within the available bandwidth, and request resizing of each of the one or more selected segments of data to achieve the available bandwidth for the plurality of segments.

In yet another aspect, a method for encoding a flow of digital multimedia data comprises associating a segment of data of the flow with at least quality and rate information and sending at least the quality and rate information associated with the segment of data for multiplex processing.

In another aspect, an apparatus for encoding a flow of digital multimedia data comprises a content classification module that associates a segment of data of the flow with at least quality and rate information and an encoding module that sends at least the quality and rate information associated with the segment of data for multiplex processing.

In another aspect, an apparatus for encoding a flow of digital multimedia data comprises means for associating a segment of data of the flow with at least quality and rate information and means for sending at least the quality and rate information associated with the segment of data for multiplex processing.

In another aspect, a processor for processing digital video data is adapted to associate a segment of data of the flow with at least quality and rate information and send at least the quality and rate information associated with the segment of data for multiplex processing.

In another aspect, a computer-program product for processing digital video data comprises a computer readable medium comprising instructions that cause at least one computer to associate a segment of data of the flow with at least quality and rate information and send at least the quality and rate information associated with the segment of data for multiplex processing.

The details of one or more aspects are set forth in the accompanying drawings and the description below. Other features, objects, and advantages will be apparent from the description and drawings, and from the claims.

DETAILED DESCRIPTION

In one or more aspects of this disclosure, a multiplexing system is provided that operates to multiplex content flows into a transmission frame for transmission over a data network. For example, the multiplexed content flows comprise a particular arrangement, sequence, mixing, and/or selection of real-time and/or non real-time services for transmission to a device. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

For the purpose of this description, one or more aspects of a multiplexing system are described herein with reference to a communication network that utilizes Orthogonal Frequency Division Multiplexing (OFDM) to provide communications between a network server and one or more mobile devices. For example, in an OFDM system, a superframe is defined that comprises time division multiplex (TDM) pilot signals, frequency division multiplex (FDM) pilot signals, overhead information symbols (OIS), and data symbols. A data slot includes a set of data symbols that occur over one OFDM symbol time. As an example, a data slot may include a set of 500 data symbols. Additionally, an OFDM symbol time in the superframe may carry multiple slots of data, e.g., seven slots.

The following definitions are used herein to describe one or more aspects of a multiplexing system.

Flow An element of a service, for example, a service may have two flows—an audio flow and a video flow.

Service A media content that can have one or more flows.

MLC A media logical channel ("channel") used for data or control information.

Resize A procedure by which services are resized to require less bandwidth for transmission.

Overhead Information Symbols (OIS)

Symbols in a superframe that carry information about the location of various MLCs in the superframe.

Slot The smallest unit of bandwidth allocated to a MLC over an OFDM symbol.

Figure 1:
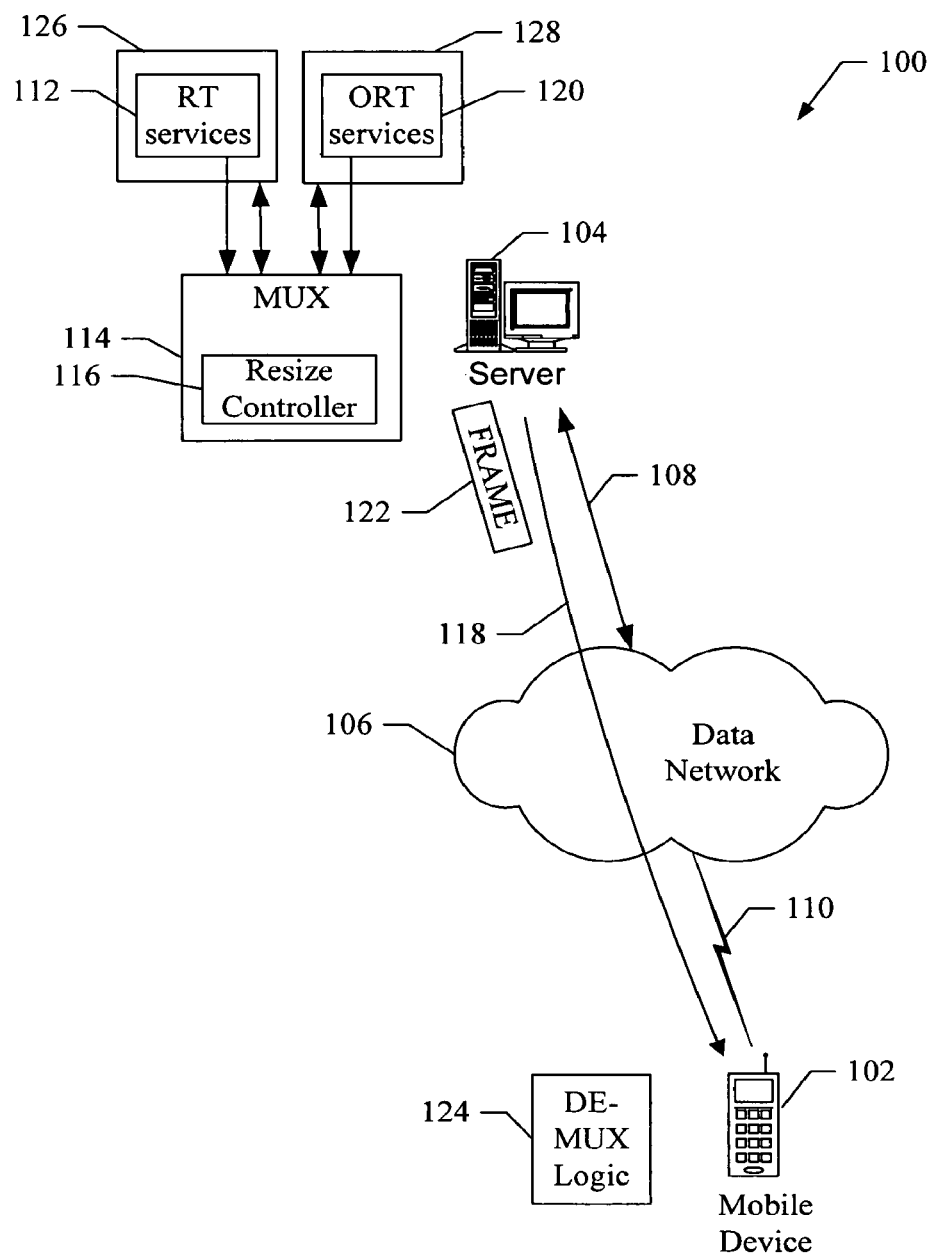
FIG. 1 shows a network that comprises an exemplary multiplexing system.

FIG. 1 illustrates a multimedia encoding and decoding system 100. System 100 comprises a multimedia encoding device, such as a server 104, a multimedia decoding device, such as mobile device 102, and a data network 106. For the purpose of this description, it will be assumed that the data network 106 operates to communicate with one or more portable devices using OFDM technology; however, the multiplexer system is suitable for use with other transmission technologies as well, such as any of a variety of radio access technologies, such as Global System for Mobile Communications (GSM), CDMA 2000, wideband CDMA (W-CDMA), CDMA 1× EV-DO, or the broad family of standards developed to facilitate wireless networking defined by the various IEEE 801.11x standards.

In one aspect, the server 104 operates to provide services to one or more devices, such as mobile device 102, in communication with the network 106. For example, the devices may subscribe to the services provided by server 104. The server 104 is coupled to the network 106 through the communication link 108. The communication link 108 comprises any suitable communication link, such as a wired and/or wireless link that operates to allow the server 104 to communicate with the network 106. The network 106 comprises any combination of wired and/or wireless networks that allows services to be delivered from the server 104 to devices in communication with the network 106, such as the device 102.

It should be noted that the network 106 may communicate with any number and/or types of portable devices within the scope of this disclosure. A single multimedia decoding device 18 is illustrated in FIG. 1 for simplicity. For example, other devices suitable for use in the multiplexer system include, but are not limited to, a personal digital assistant (PDA), email device, pager, a notebook or laptop computer, desktop computer digital music and video device, such as an mp3 player and those sold under the trademark "iPod," radiotelephone such as cellular, satellite or terrestrial-based radiotelephone. The wireless link 110 comprises a wireless communication link based on OFDM technology; however, the wireless link may comprise any suitable wireless technology that operates to allow devices to communicate with the network 106.

The device 102 illustrated in FIG. 1 comprises a mobile telephone that communicates with the network 106 through the wireless link 110. In some cases, the device 102 takes part in an activation process that allows the device 102 to subscribe to receive services over the network 106. The activation process may be performed with the server 104. However, the activation process may also be performed with another server, service provider, content retailer, or other network entity. For the purpose of this description, it will be assumed that the device 102 performs the activation process with the server 104 and is now ready to subscribe and receive services from the server 104. Although the example illustrated in FIG. 1 is described in terms of subscribing to services, device 102 may receive services over network 106 that do not require a subscription.

Server 104 communicates with a real time media server (RTMS) 126 that comprises or has access to content that includes one or more real time (RT) services 112. The server 104 may also communicate with a non real time media server (NRTMS) 128 that comprises or has access to one or more other than real time (ORT) or non real time (NRT) services 120. For example, the services (112, 120) comprise multimedia content that includes news, sports, weather, financial information, movies, and/or applications, programs, scripts, or any other type of suitable content or service. Thus, the services (112, 120) may comprise video, audio or other information formatted in any suitable format. It should be noted that the server 104 may also communicate with one or more other media servers that comprise or have access to RT and/or ORT services. The services (112, 120) have associated delivery requirements that may include, but are not limited to bandwidth, quality and rate information, priority, latency, type of service, and/or any other type of delivery requirement.

The server 104 also comprises a multiplexer (MUX) 114 that operates to efficiently multiplex one or more of the services (112, 120) into a transmission frame 122 based on the delivery requirements. Server 104 transmits the transmission frame over the network 106 to the device 102, as shown by the path 118. A more detailed description of the MUX 114 is provided in another section of this document. As a result of the operation of the MUX 114, the services (112, 120) are optimally packed into the transmission frame 122 so that the delivery requirements (bandwidth, priority, latency, type of service, etc.) of the services (112, 120) are met, transmission bandwidth of the transmission frame 122 is efficiently utilized, and power at receiving device 102 is conserved. For example, by efficiently utilizing the available bandwidth, a mobile device can receive transmitted services over a short time interval, thereby conserving battery power.

The MUX 114 may comprise a resize controller 116 that operates to control how the RT services 112 and/or the ORT services 120 are resized. For example, if selected RT services 112 to be multiplexed into the transmission frame 122 will not fit into the available bandwidth of the transmission frame 122, the resize controller 116 operates to control how those services are resized (or re-encoded) so as to reduce their bandwidth requirements. As will be described in detail herein, resize controller 116 may analyze quality and rate information associated with RT services to determine which of the RT services to resize, and communicate with the RTMS 126 to request selected resizing of the selected RT services. The resize controller 116 also operates in a similar fashion to communicate with the NRTMS 128 to control how selected ORT services 120 are resized. As a result of the operation of the resize controller 116, resized RT and ORT services will fit within the available bandwidth of the transmission frame 122. A more detailed description of the resize controller 116 is provided in another section of this document.

The device 102 may comprise de-multiplexer (DE-MUX) logic 124 that operates to de-multiplex the transmission frame 122 to obtain the transmitted services (112, 120). Because the services have been efficiently multiplexed into the transmission frame 122, network bandwidth is conserved and the device 102 utilizes less power to receive the transmitted services.

Therefore, the multiplexing system operates to perform one or more of the following functions to provide efficient multiplexing of RT and ORT services into a transmission frame.

1. Receive or gain access to one or more RT and/or ORT services for transmission over a network.
2. Determine if the RT and/or ORT services will fit into the available bandwidth of a transmission frame.
3. If the RT and/or ORT services will not fit into the transmission frame, resize one or more selected RT and/or ORT services to reduce their bandwidth requirements.
4. Utilize an allocation algorithm to assemble the transmission frame with original and/or resized RT services, and original and/or resized ORT services so that the frame is efficiently packed.
5. Transmit the transmission frame over a network to one or more receiving devices.

Therefore, the multiplexing system operates to efficiently multiplex and transmit one or more RT and/or ORT services to devices on a data network. It should be noted that the multiplexing system is not limited to the implementations described with reference to FIG. 1, and that other implementations are possible within the scope of this disclosure.

Figure 2:
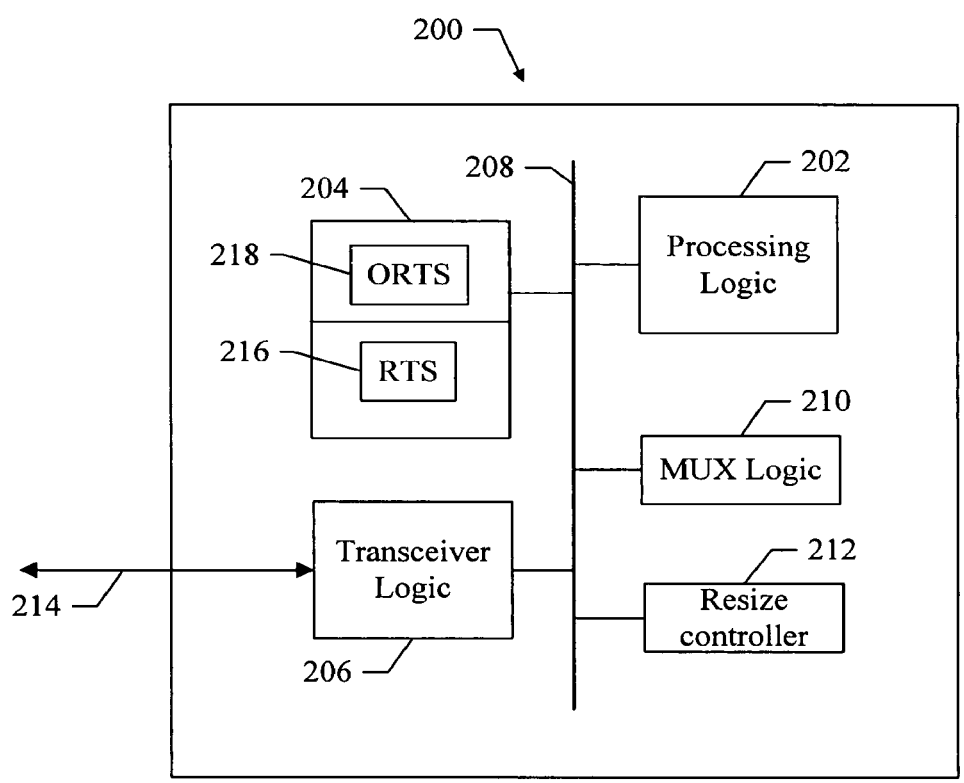
FIG. 2 shows an exemplary server for use in a multiplexer system.

FIG. 2 shows an exemplary server 200 for use in a multiplexing system. For example, the server 200 may be used as the server 104 in FIG. 1. The server 200 comprises processing logic 202, memory 204, and transceiver logic 206, all coupled to a data bus 208. The server 200 also comprises multiplexer (MUX) logic 210 and resize controller 212, which are also coupled to the data bus 208. It should be noted that the server 200 represents just one implementation and that other implementations are possible within the scope of this disclosure.

The processing logic 202 may comprise a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the data bus 208.

The transceiver logic 206 comprises hardware and/or software that operate to allow the server 200 to transmit and receive data and/or other information with remote devices or systems through the communication channel 214. For example, the communication channel 214 may comprise any suitable type of wireless or wired communication link, or a combination thereof to allow the server 200 to communicate directly with other servers or with one or more data networks and/or devices coupled to those data networks.

The memory 204 comprises any suitable type of storage device or element that allows the server 200 to store information parameters. For example, the memory 204 may comprise any type of Random Access Memory (RAM), Flash memory, hard disk, or any other type of storage device.

The processing logic 202 may operate to communicate with one or more content providers through the transceiver logic 206 and channel 214. The processing logic 202 communicates with a RTMS to receive RT services 216 and a NRTMS to receive ORT services 218. For example, the RT services 216 and the ORT services 218 comprises one or more content flows that are to be delivered to devices on a network. Furthermore, the RT 216 and ORT 218 services have associated delivery requirements that include, but are not limited to, quality and rate information, bandwidth, priority, latency, type of service, and/or any other type of delivery requirement. In one aspect of this disclosure, processing logic 202 receives at least quality and rate information associated with RT services 216 to assist in monitoring the size of the RT services 216 to be included within the transmission frame 122 and selecting one or more of the RT services 216 to be resized. In addition, if processing logic 202 is including ORT services 218 in the transmission frame, processing logic 202 may receive delivery requirements, e.g., priority and latency information, associated with the ORT services 218 to monitor the size of the ORT services to be included within the transmission frame 122.

The MUX logic 210 may comprise a CPU, processor, gate array, hardware logic, memory elements, virtual machine, software, firmware and/or any combination of hardware, software and firmware. The MUX logic 210 operates to multiplex one or more of the RT services 216 and/or ORT services 218 into a transmission frame based on the delivery requirements for transmission to devices using the transceiver logic 206 and the channel 214. For example, the MUX logic 210 operates to determine if selected ORT services 218, RT services 216, and Best Effort services (not shown) will fit into the available bandwidth of the transmission frame (with respect to their delivery requirements). In one aspect, MUX logic 210 analyzes the delivery requirements associated with the RT services 216, the ORT services 218 and the Best Effort services (not shown) to determine whether the services 216, 218 will fit into the available bandwidth of the transmission frame. With respect to the RT services 216, for example, MUX logic 210 may analyze at least quality and rate information associated with each of the RT services 216 to determine whether the RT services 216 fit within the available bandwidth of the transmission frame or at least the portion of the transmission frame for transmitting RT services 216. Similarly, with respect to ORT services 218, MUX logic 210 may analyze other delivery requirements, such as priority and latency requirements, to determine whether the RT services 216 fit within the available bandwidth of the transmission frame. For example, the Best Effort services comprise any type of data or information that needs to be transmitted. If the above flows will fit into the available bandwidth, the MUX logic 210 operates to pack them into the transmission frame according to one or more allocation algorithms described herein.

If selected RT services 216 and/or ORT services 218 will not fit into the transmission frame, the MUX logic 210 signals the resize controller 212. The resize controller 212 operates to control how those services are resized to fit into the available bandwidth of the transmission frame. In one aspect of this disclosure, resize controller 212 analyzes the delivery requirements associated with the services to select one or more of services 216, 218 to be resized. For example, resize controller 212 may analyze at least quality and rate information associated with the RT services 216 and priority and latency requirements associated with the ORT services 218 to select the services to be resized. In this manner, the resize controller 212 operates to determine how much "resizing" a particular service needs to reduce its transmission bandwidth requirements. Resize controller 212 then assembles a resize request that is transmitted to the media server associated with that service. For example, the resize request is transmitted by the transceiver logic 206 using the communication link 214. The media server then operates to resize the service as requested in accordance with the techniques described herein. After the services have been resized to reduce their bandwidth requirements the MUX logic 210 is able to efficiently pack the original services and any resized services into the transmission frame. A more detailed description of allocation algorithms provided by the MUX logic 210 is provided in another section of this document.

The resize controller 212 may comprise a CPU, processor, gate array, hardware logic, memory elements, virtual machine, software, and/or any combination of hardware and software. The resize controller 212 operates to control how one or more of the flows of the RT service 216 and the ORT services 218 are resized based on the delivery requirements associated with the services so that those flows will fit into the available bandwidth of a transmission frame. Thus, the resize controller 212 operates to resize one or more services so as to adjust its associated delivery requirements. For example, a service may be downsized so that its bandwidth requirements are reduced when there is not enough bandwidth to transmit the service or upsized so that its bandwidth requirements are increased when there is excess available bandwidth. The resize controller 212 may be part of the MUX logic 210. A more detailed description of the resize controller 212 is provided in another section of this document.

The multiplexing system may comprise a computer program having one or more program instructions ("instructions") stored on a computer-readable medium, which when executed by at least one processor, for instance, the processing logic 202, provides the functions of the multiplexing system described herein. For example, instructions may be loaded into the server 200 from a computer-readable media, such as a floppy disk, CDROM, memory card, FLASH memory device, RAM, ROM, or any other type of memory device or computer-readable medium that interfaces to the server 200. Alternatively, the instructions may be downloaded into the server 200 from an external device or network resource that interfaces to the server 200 through the transceiver logic 206. The instructions, when executed by the processing logic 202, provide one or more aspects of a multiplexing system as described herein.

Thus, the server 200 operates to provide a multiplexing system to efficiently multiplex flows associated with the RT services 216 and the ORT services 218 into a transmission frame for transmission to devices on a network.

Transmission Frame Slot Allocation Algorithm

The following description describes a slot allocation algorithm for use in a multiplexing system. The slot allocation algorithm may operate to allocate slots in a transmission frame to content flows associated with available RT and ORT services. The allocation algorithm operates to achieve efficient bandwidth utilization and thereby allows a receiving device to conserve power. The allocation algorithm may be performed by and/or under the control of the MUX logic 210.

For the purpose of this description, the transmission frame will be referred to hereinafter as a superframe. It should be noted that the superframe is just one implementation and that the multiplexing system is suitable for use with other types of transmission frame implementations.

A superframe may, for example comprises a data symbol portion that is utilized for bandwidth allocation. The data symbol portion of a superframe may be divided into four equal portions, which are referred to hereinafter as "frames." Data from services to be transmitted, which in an aspect are in Reed Solomon (RS) blocks, are distributed equally over the four frames. Therefore, the operation of the slot allocation algorithm over a superframe is a repetition of the operation of the slot allocation algorithm over a frame. Thus, the following description describes slot allocation over a frame, but is equally applicable to an entire superframe. Additionally, the slot allocation algorithm discussed may be used to allocate slots for all types of services, including but not limited to, real time services, non real time services, and IP data cast.

Channel Allocations

In one or more aspects, a media logical channel (MLC) carries one or more flows of the same service. Thus, every service can have one or more MLC's, with their location in the frame described in the OIS. A device that desires to receive a particular MLC gets the location of that MLC from the OIS. The location of an MLC in a frame is described in the OIS using the following.

Start Symbol
Start Slot
Lowest Slot
Highest Slot
Total Slots

Figure 3:
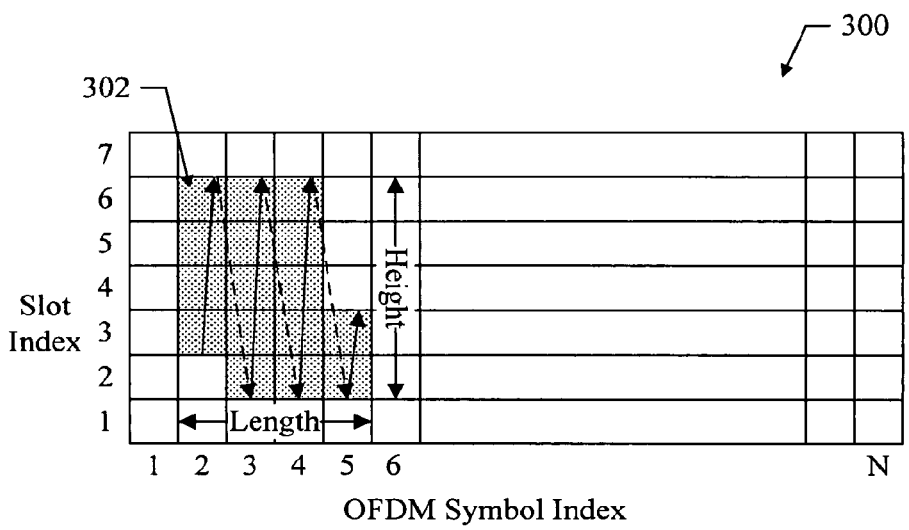
FIG. 3 shows an exemplary frame that illustrates a MLC's slot allocation for use in a multiplexing system.

FIG. 3 shows an example of a frame 300 that illustrates a MLC's slot allocation for use in a multiplexing system. The frame 300 comprises "N" OFDM symbols for each of seven (7) slots. The MLC's slot allocation is the shaded region shown generally at 302. Two variables are used to describe the slot allocation, namely; length and height. The length is in OFDM symbols and the height is in slots.

Allocation Shapes

Figure 4:
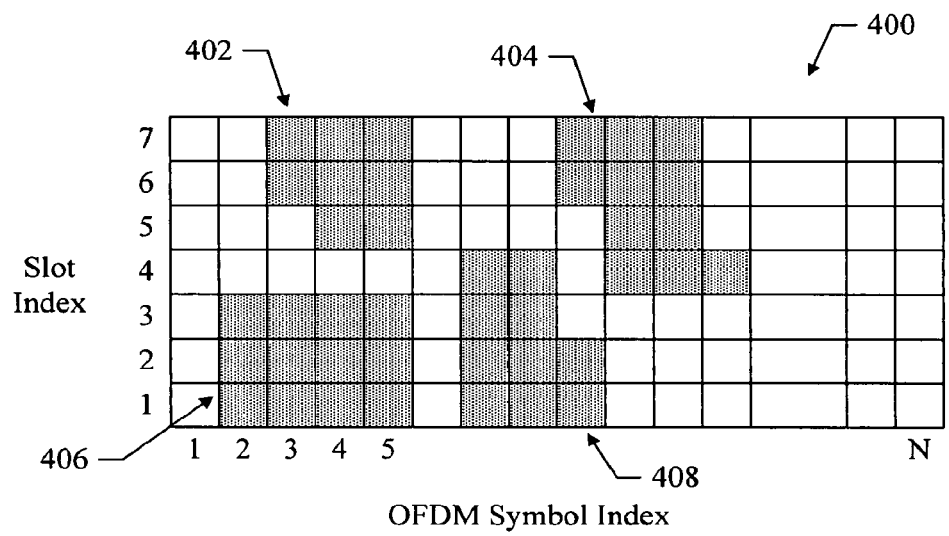
FIG. 4 shows an exemplary frame that comprises various MLC allocation shapes for use in a multiplexing system.

FIG. 4 shows an example of a frame 400 that comprises various MLC allocation shapes for use in a multiplexing system. For example, the MLC allocations are the shaded regions shown generally at 402, 404, 406, and 408. In an example, the allocation shapes are selected so that they may be described in the OIS of the frame 400 using a fixed limited number of data fields.

Height of an Allocation

Figure 5:
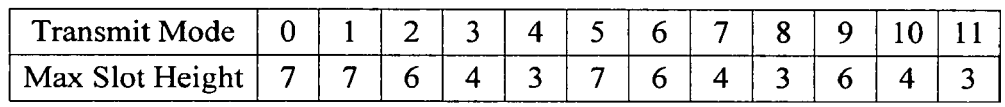
FIG. 5 shows a table that illustrates a relationship between a transmit mode parameter and a maximum slot height value for a selected MLC allocation.

FIG. 5 shows a table 500 that illustrates a relationship between a transmit mode parameter and a maximum slot height value for a selected MLC allocation. The peak output rate of a turbo decoder at a receiving device limits the number of turbo packets that can be decoded in a single OFDM symbol. As a result, the height of the MLC allocation may be constrained. A variable referred to as the maximum slot height ("maxSlotHeight") is used to denote the maximum slot height of an MLC allocation for a given transmit mode. For example, from the table 500 it can be seen that a transmit mode of four (4) supports an MLC allocation having a maxSlotHeight of three (3), and a transmit mode of one (1) supports an MLC allocation having a maxSlotHeight of seven (7).

Allocation Algorithm

In an aspect, all MLC's of a selected service are grouped together so that their allocations are temporally adjacent in the frame. This reduces the number of times a receiving device needs to "wake up" to receive different MLC's of a service. Thus, the power consumption of a receiving device is reduced or conserved.

With respect to a receiving device's power consumption, it is preferable that the height of an MLC allocation be its maxSlotHeight. This minimizes possible "on time" for the device to receive that MLC. However, for ease of packing, all the grouped MLC's of a service are allocated with the same height. Thus, the concept of "maxSlotHeight of a service" is defined as the minimum or smallest of the maxSlotHeight parameters of all the MLC's grouped for that service. For the remainder of this description, a service's height will mean the common height of all the MLC allocations of that service.

Figure 6:
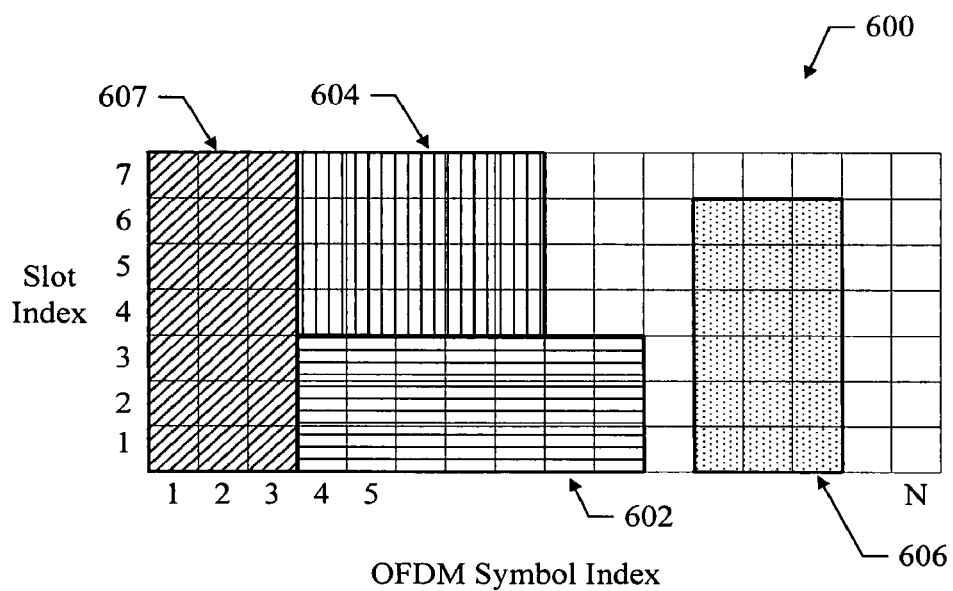
FIG. 6 shows an exemplary frame that illustrates different MLC slot allocations for use in a multiplexing system.

FIG. 6 shows an example of a frame 600 that illustrates different MLC slot allocations for use in a multiplexing system. The frame 600 is divided into MLC allocations having blocks of different heights. In an example, the block heights correspond to the possible maxSlotHeights a service can take. From the table 500 shown in FIG. 5, it can be determined that there are four possible maxSlotHeights (i.e., 3, 4, 6, or 7). In an example, the slot allocation algorithm operates to pack services into different block allocations based on the maxSlotHeight parameter. For example, allocations based on the possible maxSlotHeights (i.e., 3, 4, 6, or 7) are shown at 602, 604, 606, and 607, respectively.

Allocation Algorithm Operation

The following is a description of an exemplary allocation algorithm for use in a multiplexing system. The MUX logic 210 may operate to implement the allocation algorithm to perform the functions described below.

The inputs to the allocation algorithm are as follows.
1. Number of slots of data that each channel of a service has for a frame.
2. The maxSlotHeight of each channel of a service, which is determined by the transmit mode of that channel.

The outputs of the algorithm are as follows.
1. A decision indicating whether packing is possible. If packing is possible, the algorithm gives the locations of MLC allocations.
2. If packing is not possible the slot allocation algorithm asks for a resizing of services from the resize controller 212. In an aspect, the resize controller 212 decides on which services to resize and at what rates. A description of the operation of the resize controller 212 is provided in another section of this document.

Figure 7:
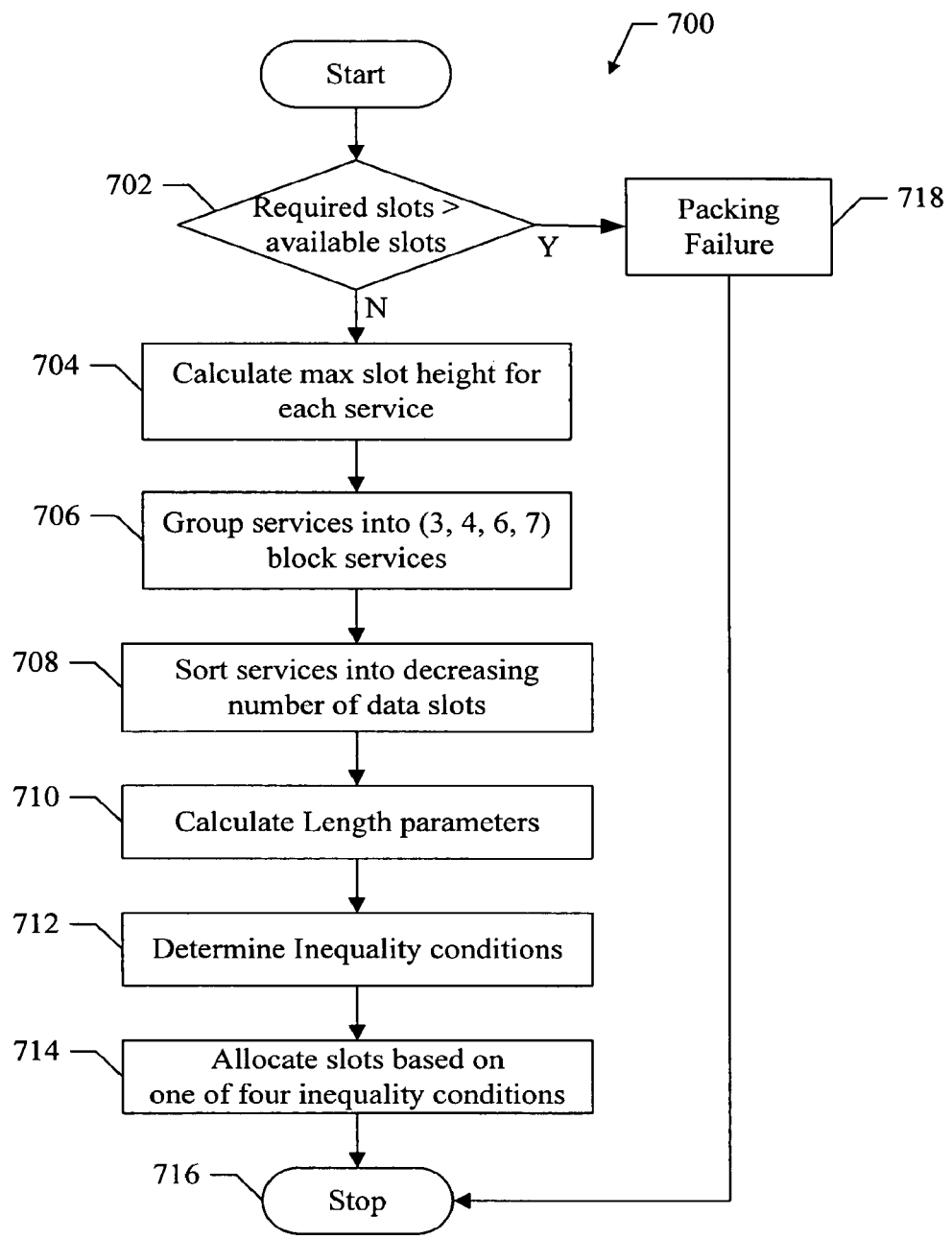
FIG. 7 shows a method for providing an exemplary allocation algorithm use in a multiplexing system.

FIG. 7 shows an exemplary method 700 for providing an allocation algorithm for use in a multiplexing system. For example, the method 700 operates to allocate slots to one or more RT services. In an aspect, the MUX logic 210 operates to provide the functions of the method 700 as describe below.

At block 702, a test is performed to determine if the total number of slots required by all the RT services to be multiplexed in a frame is greater than the number of available slots. For example, the MUX logic 210 makes this determination. In an aspect, the number of available slots has a value of seven times the "number of symbols per frame" (numOfdmSymbolsPerFrm). If the required number of slots is greater than the available slots, the method proceeds to block 718. If the required number of slots is less than or equal to the number of available slots, the method proceeds to block 704.

At block 718, a packing failure is determined. For example, in an aspect, the MUX logic 210 determines that there are not enough available slots to pack the services and the method then ends at block 716.

At block 704, a maxSlotHeight parameter for each RT service is calculated. For example, in an aspect, the MUX logic 210 operates to perform this calculation. The maxSlotHeight indicates the maximum number of slots per symbol permissible for each RT service.

At block 706, the RT services to be multiplexed are grouped into "three block services" (threeBlkSrvcs), "four block services" (fourBlkSrvcs), "six block services" (sixBlkSrvcs), and "seven block services" (sevenBlkSrvcs) based on their maxSlotHeight parameters. In an aspect, the MUX logic 210 operates to group the services by their slot requirements.

At block 708, the RT services in each group are sorted by decreasing number of data slots. For example, the RT services are sorted from largest to smallest with respect to the data slots required.

At block 710, the length variables L7, L6, L4 and L3 are calculated. For example, the length of sevenBlkSrvcs is "L7", the length of sixBlkSrvcs is "L6", the length of fourBlkSrvcs is "L4", and the length of threeBlkSrvcs is "L3." For example, the length of all sevenBlkSrvcs is defined as;

$$L7=\text{ceil}(\text{total data slots of all sevenBlkSrvcs}/7)$$

where ceil(x) is the smallest integer greater than x. In an aspect, the MUX logic 210 operates to compute the length parameters (L7, L6, L4 and L3).

At block 712, one or more inequality checks are performed. For example, the following inequalities are checked to determine whether each is true or false.

$$L7+L3+L6<=\text{numOfdmSymbolsPerFrm} \quad (1)$$

$$L7+L4+L6<=\text{numOfdmSymbolsPerFrm} \quad (2)$$

As a result of the above inequality equations, four inequality conditions are determined. The first inequality (1) has true and false results that are hereinafter referred to as (1T, 1F). The second inequality (2) has true and false results that are hereinafter referred to as (2T, 2F). Thus, the above two inequalities provide four inequality conditions (i.e., 1T2T, 1T2F, 1F2T, 1F2F) that are used to allocate slots according to one or more aspects of a multiplexing system.

At block 714, slots are allocated to the RT services based on one of four inequality conditions. For example, the results of the inequality checks performed at block 712 are used to allocate slots to the RT services. Each of the four conditions determines allocations as described in allocation methods discussed in the following sections of this document.

It should be noted that the method 700 represents just one implementation and the changes, additions, deletions, combinations or other modifications of the method 700 are possible within the scope of this disclosure.

Figure 8:
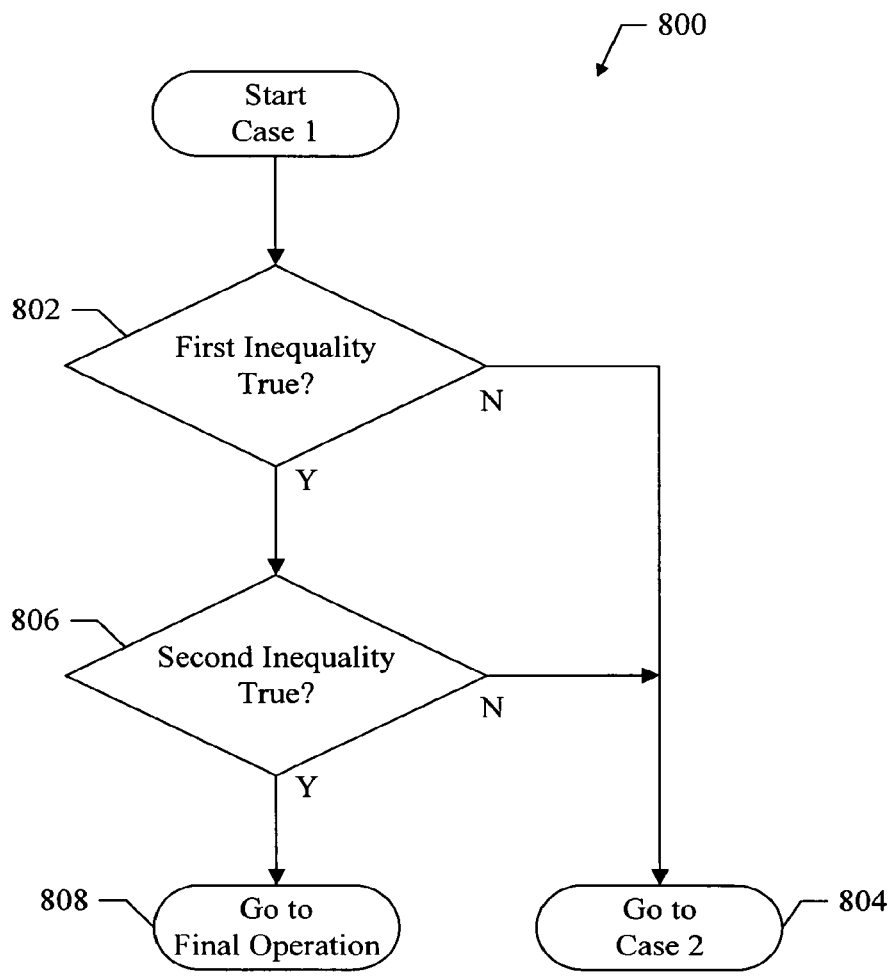
FIG. 8 shows an exemplary method for allocating slots to RT services based on a first inequality condition for use in a multiplexing system.

FIG. 8 shows an exemplary method 800 for allocating slots to RT services based on a first inequality condition for use in a multiplexing system. For example, the method 800 provides slot allocations associated with a first inequality condition described by (1T2T). In an aspect, the MUX logic 210 operates to provide the functions of the method 800 as describe below.

At block 802, a test is performed to determine if the state of the first inequality is true (i.e., 1T). If the state of the first inequality (1) is not 1T, the method proceeds to block 804. If the state of the first inequality (1) is 1T, the method proceeds to block 806.

At block 804, the method proceeds to test the second inequality condition. For example, because the state of the first inequality (1) is not 1T, the method proceeds to the method 900 to test the second inequality condition (1T2F).

At block 806, a test is performed to determine if the state of the second inequality (2) is true (i.e., 2T). If the state of the second inequality (2) is not 2T, the method proceeds to block 804. If the state of the second inequality (2) is 2T, the method proceeds to block 808.

At block 808, the method proceeds to the final operation. Because both states (1T2T) exist, the method proceeds to a final operation (described below) to complete the slot allocation.

It should be noted that the method 800 represents just one implementation and the changes, additions, deletions, combinations or other modifications of the method 800 are possible within the scope of this disclosure.

Figure 9:
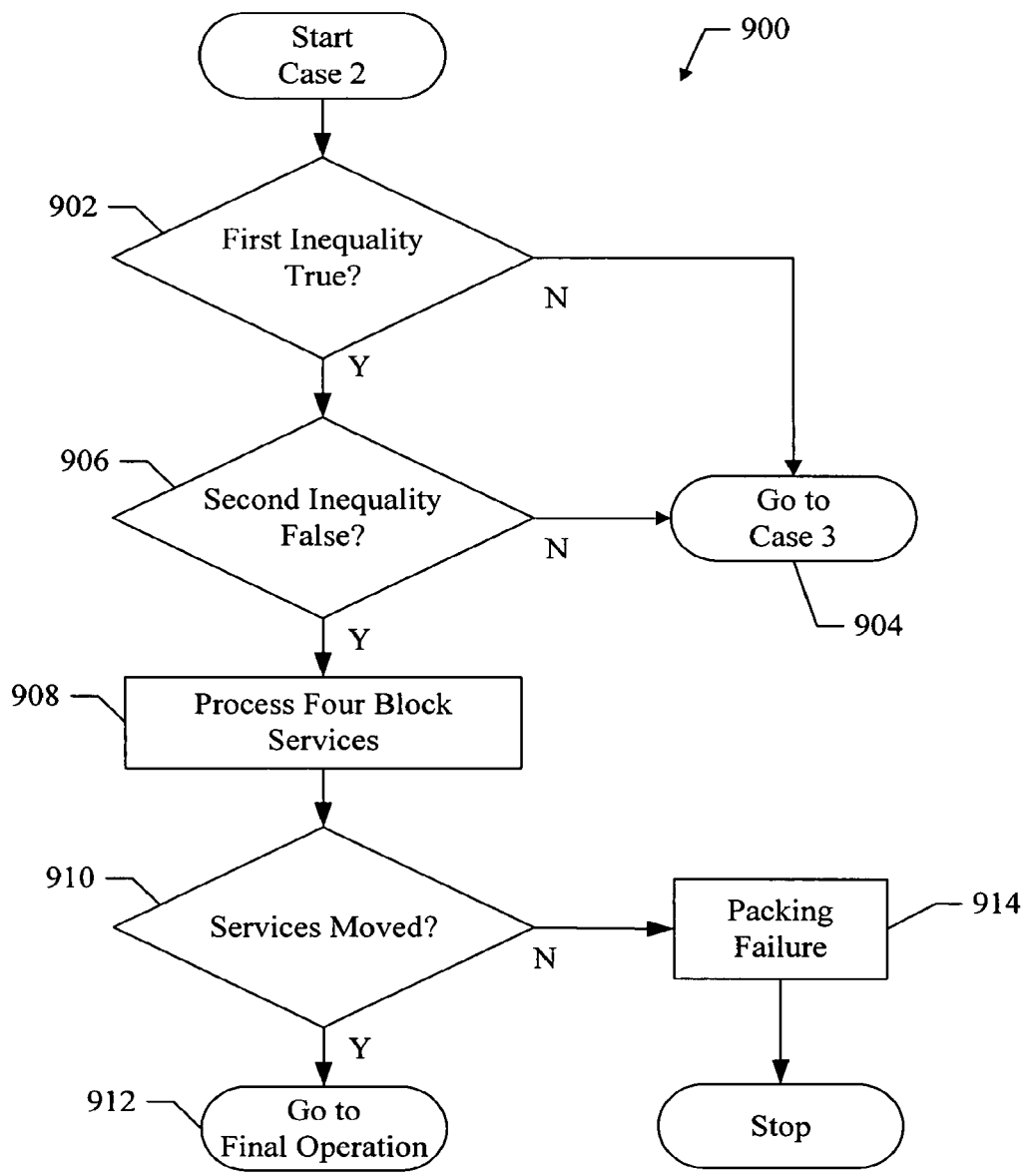
FIG. 9 shows an exemplary method for allocating slots to RT services based on a second inequality condition for use in a multiplexing system.

FIG. 9 shows an exemplary method 900 for allocating slots to RT services based on a second inequality condition for use in a multiplexing system. For example, the method 900 provides slot allocations associated with a second inequality condition described by (1T2F). In an aspect, the MUX logic 210 operates to provide the functions of the method 900 as describe below.

At block 902, a test is performed to determine if the state of the first inequality (1) is true (i.e., 1T). If the state of the first inequality (1) is not 1T, the method proceeds to block 904. If the state of the first inequality (1) is 1T, the method proceeds to block 906.

At block 904, the method proceeds to test the third inequality condition. For example, because the state of the first inequality (1) is not 1T, the method proceeds to the method 1100 to test the third inequality condition (1F2T).

At block 906, a test is performed to determine if the state of the second inequality (2) is false (i.e., 2F). If the state of the second inequality (2) is not 2F, the method proceeds to block 904. If the state of the second inequality (2) is 2F, the method proceeds to block 908 where four block services are processed.

Figure 10:
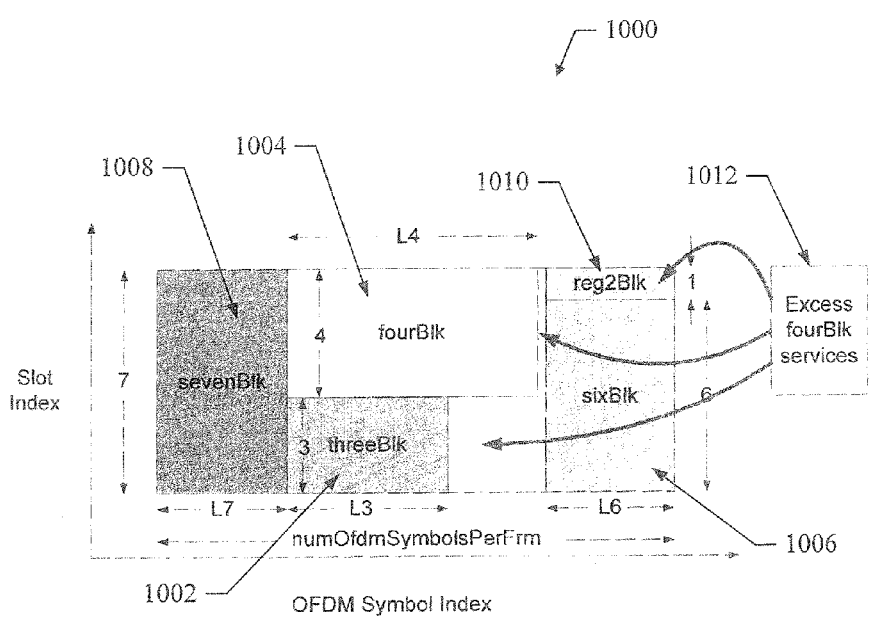
FIG. 10 shows a frame that illustrates the operation of an exemplary multiplexing system to allocate excess four block services.

FIG. 10 shows a frame 1000 that illustrates the operation of an aspect of a multiplexing system to allocate excess four block services. For example, the allocation blocks comprise threeBlk 1002, fourBlk 1004, sixBlk 1006, and sevenBlk 1008. The allocation blocks also include reg2Blk 1010. The frame 1000 illustrates how the method 900 operates to allocate excess four block services (fourBlkSrvc) 1012 to the fourBlk 1004, threeblck 1002 and reg2blk 1010 allocation blocks. In an aspect, the method 900 operates to allocate RT services to the frame 1000 shown in FIG. 10.

Referring again to FIG. 9, at block 908, four block services are processed. For example, in an aspect, the MUX logic 210 operates to process four block services as described below with reference to the frame 1000 shown in FIG. 10.

a. Find the fourBlkSrvc up to which fourBlk 1004 can hold to satisfy the first inequalities condition described with reference to the method 800 above. Then update fourBlk 1004 without excess fourBlkSrvcs.

b. Move excess fourBlkSrvcs to threeBlk 1002 and reg2Blk 1010. Reg2Blk 1010 is a block of height 1 as shown in FIG. 10.

c. While moving excess fourBlkSrvcs also check whether successive services can fit in fourBlk 1004 itself.

d. Complete the move only if the following conditional inequalities are true.

$((L7+L3+L6)<=numOfdmSymbolsPerFrm)\&\&$ $((L7+L4+L6)<=numOfdmSymbolsPerFrm)\&\&$ $((L7+L4+Lreg2)<=numOfdmSymbolsPerFrm)$ At block 910, a test is performed to determine if excess four block services can be moved as described above. If excess fourBlkSrvcs cannot be moved to either threeBlk 1002 or reg2Blk 1010 to satisfy the conditional inequalities at block 908, then the method proceeds to block 914 where a packing failure is determined and the method stops. If excess fourBlk-Srvcs can be moved, then the method proceeds to block 912.

At block 912, the method proceeds to the final operation. Because the excess fourBlkSrvcs were able to be successfully moved, the method proceeds to a final operation to complete the slot allocation.

It should be noted that the method 900 represents just one implementation and the changes, additions, deletions, combinations or other modifications of the method 900 are possible within the scope of this disclosure.

Figure 11:
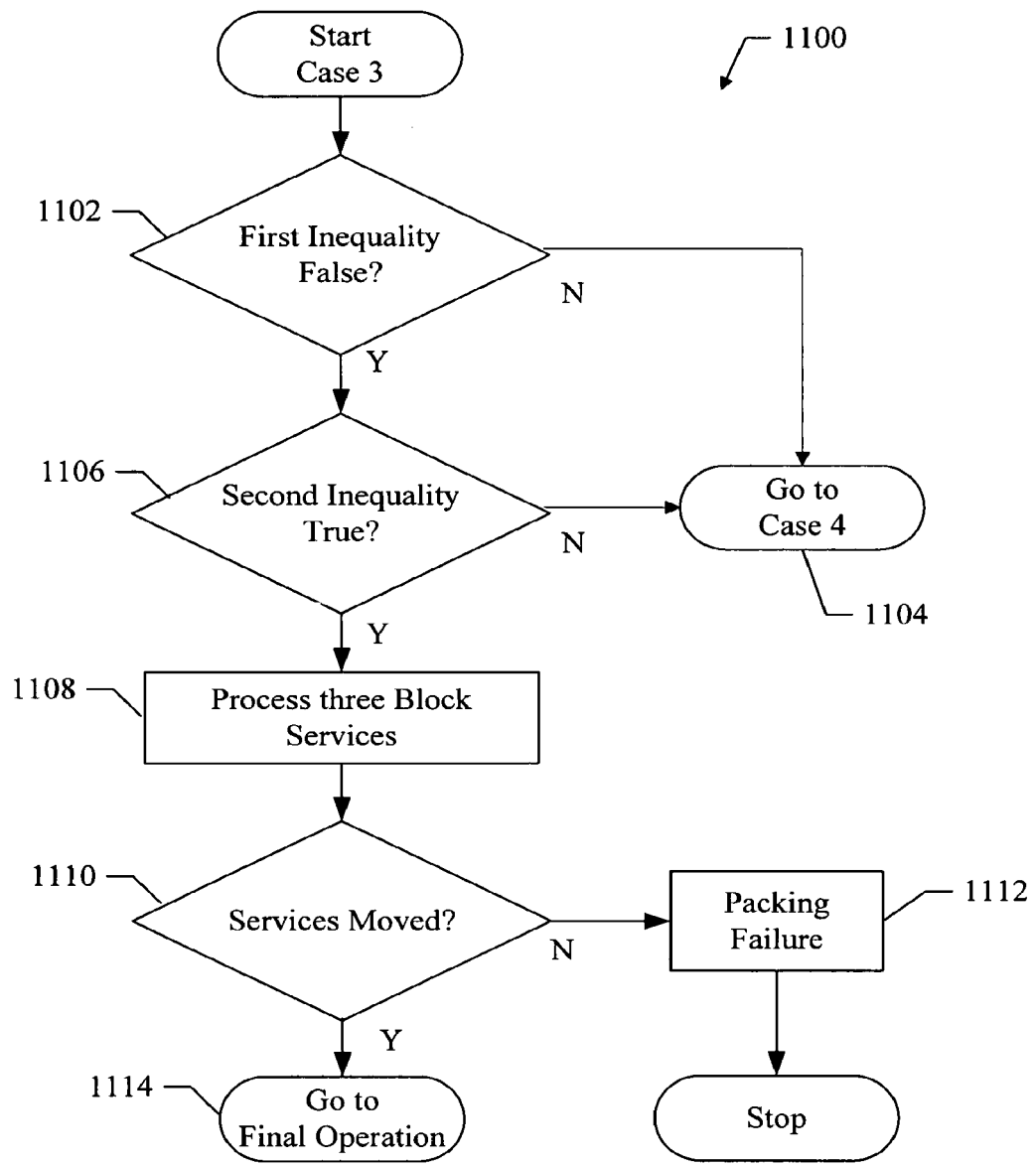
FIG. 11 shows an exemplary method for allocating slots to RT services based on a third inequality condition for use in a multiplexing system.

FIG. 11 shows an exemplary method 1100 for allocating slots to RT services based on a third inequality condition for use in a multiplexing system. For example, the method 1100 provides allocations when a third inequality condition (1F2T) exists. In an aspect, the MUX logic 210 operates to provide the functions of the method 1100 as describe below.

At block 1102, a test is performed to determine if the state of the first inequality (1) is false (i.e., 1F). If the state of the first inequality (1) is not 1F, the method proceeds to block 1104. If the state of the first inequality (1) is 1F, the method proceeds to block 1106.

At block 1104, the method proceeds to process the fourth inequality condition. For example, because the state of the first inequality (1) is not 1F, the method proceeds to the method 1300 to process the fourth inequality condition (1F2F) which now must exist because it is the only condition remaining.

At block 1106, a test is performed to determine if the state of the second inequality (2) is true (i.e., 2T). If the state of the second inequality (2) is not 2T, the method proceeds to block 1104. If the state of the second inequality (2) is 2T, the method proceeds to block 1108.

Figure 12:
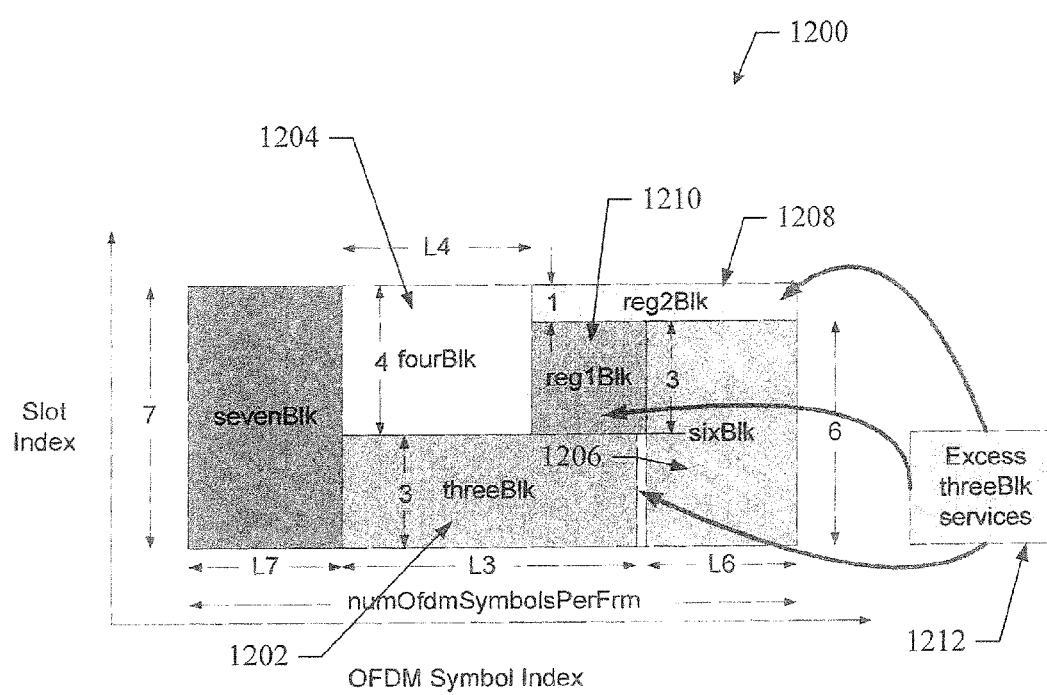
FIG. 12 shows a frame that illustrates the operation of an exemplary multiplexing system to allocate excess three block services.

FIG. 12 shows a frame 1200 that illustrates the operation of an aspect of a multiplexing system to allocate excess three block services. For example, the allocation blocks comprise threeBlk 1202, fourBlk 1204, sixBlk 1206, reg2Blk 1208, and reg1Blk 1210. The frame 1200 illustrates how the method 1100 operates to allocate excess three block services (threeBlkSrvcs) 1212 to the threeBlk 1202, reg1Blk 1210 and reg2Blk 1208 allocation blocks.

Referring again to FIG. 11, at block 1108, three block services (threeblkSrvcs) are processed. For example, in an aspect, the MUX logic 210 operates to process threeblkSrvcs as follows.

a. Find the threeBlkSrvc up to which threeBlk 1202 can hold to satisfy the first inequalities condition described with reference to the method 800 above. Then update threeBlk 1202 without excess threeBlkSrvcs.

b. Move excess threeBlkSrvcs to reg1Blk 1210 and reg2Blk 1208. Reg1Blk 1210 is a block of height 3 as shown in FIG. 12.

c. While moving also check whether successive services can fit into threeBlk 1202 itself.

d. Complete the move only if the following conditional inequalities are true.

$((L7+L3+L6)<=numOfdmSymbolsPerFrm)\&\&$ $((L7+L4+Lreg1+L6)<=numOfdmSymbolsPerFrm)\&\&$ $((L7+L4+Lreg2)<=numOfdmSymbolsPerFrm)$ At block 1110, a test is performed to determine if excess three block services can be moved. If excess threeBlkSrvcs cannot be moved to either reg1Blk 1210 or reg2Blk 1208 to satisfy the conditional inequalities at block 1108, then the method proceeds to block 1112 where a packing failure is determined and the method stops. If excess three block services can be moved, then the method proceeds to block 1114.

At block 1114, the method proceeds to the final operation. Because the excess threeBlkSrvcs were able to be successfully moved, the method proceeds to a final operation to complete the slot allocation.

It should be noted that the method 1100 represents just one implementation and the changes, additions, deletions, combinations or other modifications of the method 1100 are possible within the scope of this disclosure.

Figure 13:
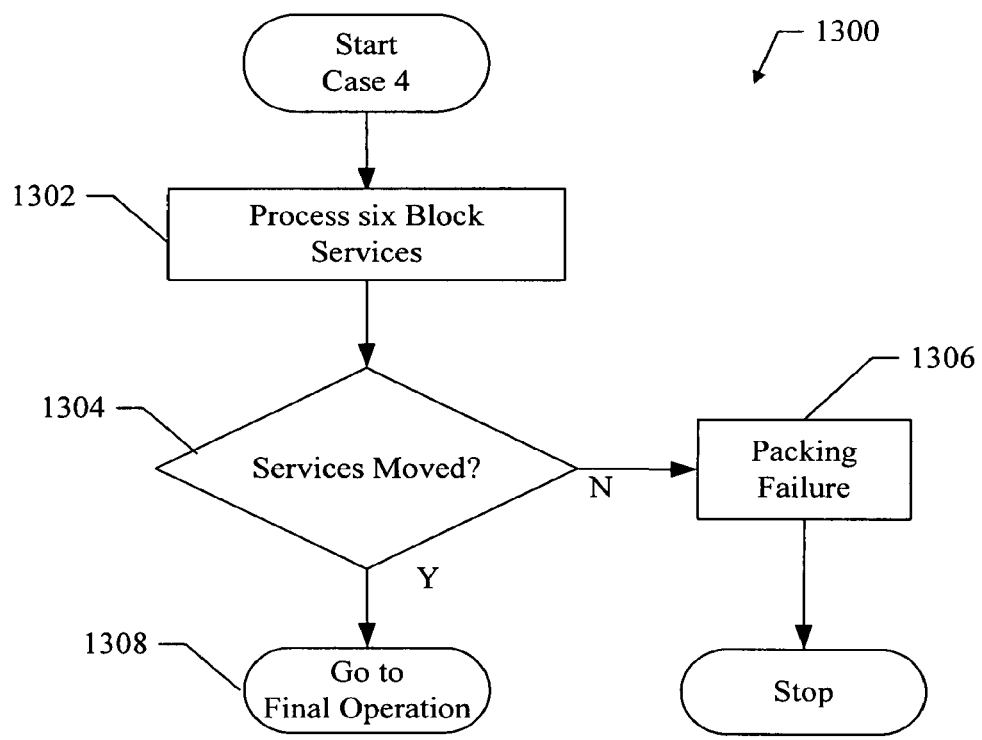
FIG. 13 shows an exemplary method for allocating slots to RT services based on a fourth inequality condition for use in a multiplexing system.

FIG. 13 shows an exemplary method 1300 for allocating slots to RT services based on a fourth inequality condition for use in a multiplexing system. The method 1300 provides allocations when the first, second and third inequality conditions do not exist. In this case, the state of the inequality equations can be described as (1F2F). In an aspect, the MUX logic 210 operates to provide the functions of the method 1300 as describe below.

Figure 14:
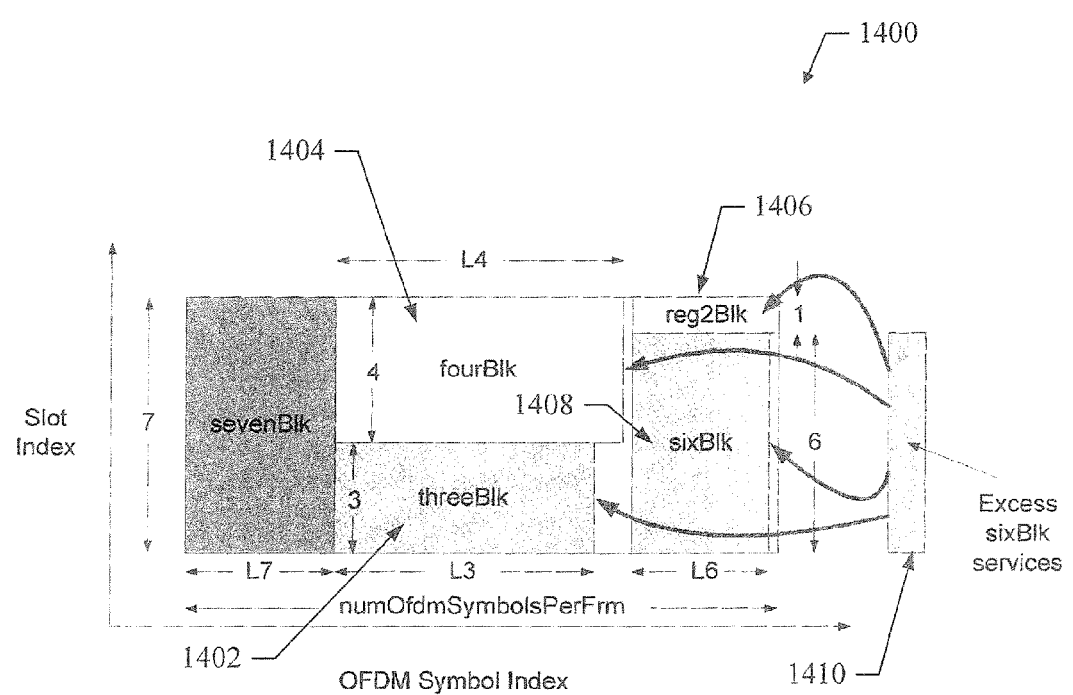
FIG. 14 shows a frame that illustrates the operation of an exemplary multiplexing system to allocate excess six block services.

FIG. 14 shows a frame 1400 that illustrates the operation of an aspect of a multiplexing system to allocate excess six block services. For example, the frame 1400 comprises threeBlk 1402, fourBlk 1404, reg2Blk 1406, and sixBlk 1408 allocation blocks. The frame 1400 illustrates how excess six block services (sixBlkSrvcs) 1410 are allocated.

Referring again to FIG. 13, at block 1302, six block services are processed. For example, in an aspect, the MUX logic 210 operates to process six block services as follows.

a. Find the sixBlkSrvc up to which fourBlk 1404 and sixBlk 1408 can hold to satisfy the first inequalities condition described with reference to the method 800 above. Then update sixBlk 1408 without excess services.
   b. Move excess sixBlkSrvcs to threeBlk 1402, fourBlk 1404, and reg2Blk 1406.
   c. While moving also check whether successive services can fit in sixBlk 1408 itself.
   d. Complete the move only if the following conditional inequalities are true.

$((L7+L3+L6)<=numOfdmSymbolsPerFrm)\&\&$ $((L7+L4+L6)<=numOfdmSymbolsPerFrm)\&\&$ $((L7+L4+Lreg2)<=numOfdmSymbolsPerFrm)$ At block 1304, a test is performed to determine if excess six block services can be moved. If excess six block services cannot be moved to fourblk 1404, threeblk 1402, or reg2Blk 1406 to satisfy the conditional inequalities at block 1302, then the method proceeds to block 1306 where a packing failure is determined and the method stops. If excess six block services can be moved, then the method proceeds to block 1308.

At block 1308, the method proceeds to the final operation. Because the excess sixBlkSrvcs were able to be successfully moved, the method proceeds to a final operation to complete the slot allocation.

It should be noted that the method 1300 represents just one implementation and the changes, additions, deletions, combinations or other modifications of the method 1300 are possible within the scope of this disclosure.

Final Operation

Thus, from the operations performed above, information is obtained regarding to which block each RT service is allocated. Additionally, the number of slots of data each channel of a RT service has for a frame is now known. This information is sufficient to arrive at the location of every channel allocation. In an aspect, the slots may be allocated contiguously to the channels within a block, respecting its max height constraint.

Packing Example

Figure 15:
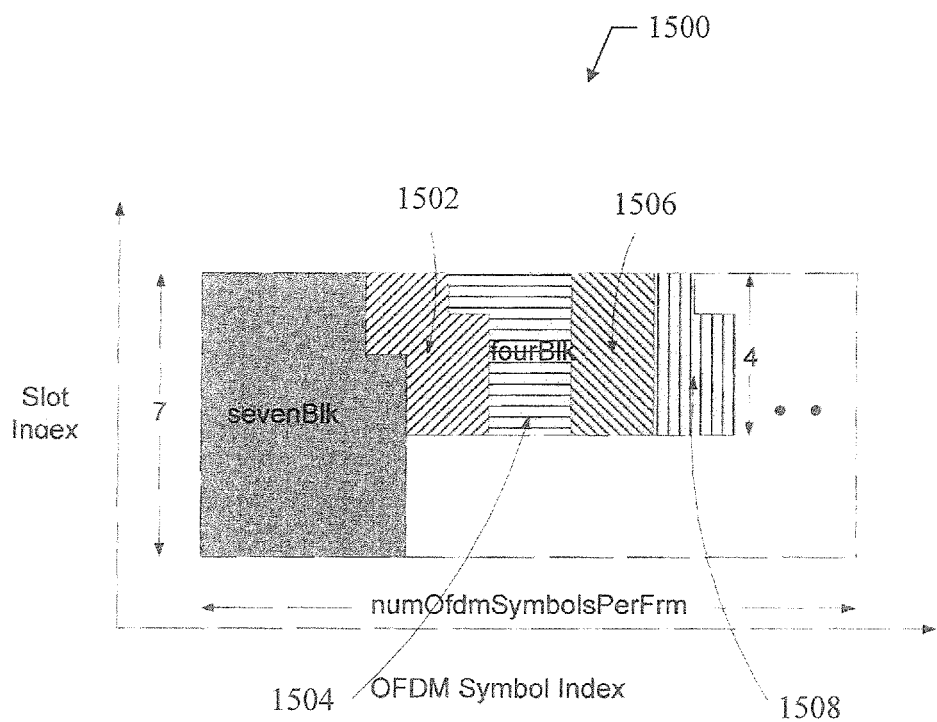
FIG. 15 shows a frame that illustrates the operation of an exemplary allocation algorithm to pack two RT services in a transmission frame for use in a multiplexing system.

FIG. 15 shows a frame 1500 that illustrates the operation of aspects of the allocation algorithm to pack two RT services into a transmission from for use in a multiplexing system. In this example, the two RT services namely; service A and B, are packed into a fourblk region of the frame 1500. For the purpose of illustration, it will be assumed that the previous operations have determined that both the RT services are in the fourBlk region. It will also be assumed that both of these RT services have two channels, namely; 1 and 2. It will further be assumed that the number of data slots for each channel is as follows.

Channel 1 of service A=9
   Channel 2 of service A=9
   Channel 1 of service B=8
   Channel 2 of service B=7

As illustrated in the frame 1500, the RT services are packed into the fourblk region according to the following parameters.

Channel 1 Service A (1502)
   Start symbol=5
   Start slot=6
   Lowest slot=4
   Highest slot=7
   Total slots=9

Channel 2 Service A (1504)
   Start symbol=7
   Start slot=7
   Lowest slot=4
   Highest slot=7
   Total slots=9

Channel 1 Service B (1506)
   Start symbol=10
   Start slot=4
   Lowest slot=4
   Highest slot=7
   Total slots=8

Channel 2 Service B (1508)
   Start symbol=12
   Start slot=4
   Lowest slot=4
   Highest slot=7
   Total slots=7

Algorithm Summary

In one or more aspects, the allocation algorithm provides efficient packing of flows into a frame, thereby minimizing the "wake-up" frequency and "on-time" of a receiving device. For example, grouping channels of a service together reduces wake-up frequency, while transmitting a service at its maxSlotHeight reduces on-time.

In an aspect, if a slot allocation provided by the algorithm fails because of one of the four inequality conditions, the algorithm passes on directives to the resizing controller 212 that controls how services are resized. If the resizing controller 212 has services resized based on these directives, a packing solution is guaranteed.

Figure 16:
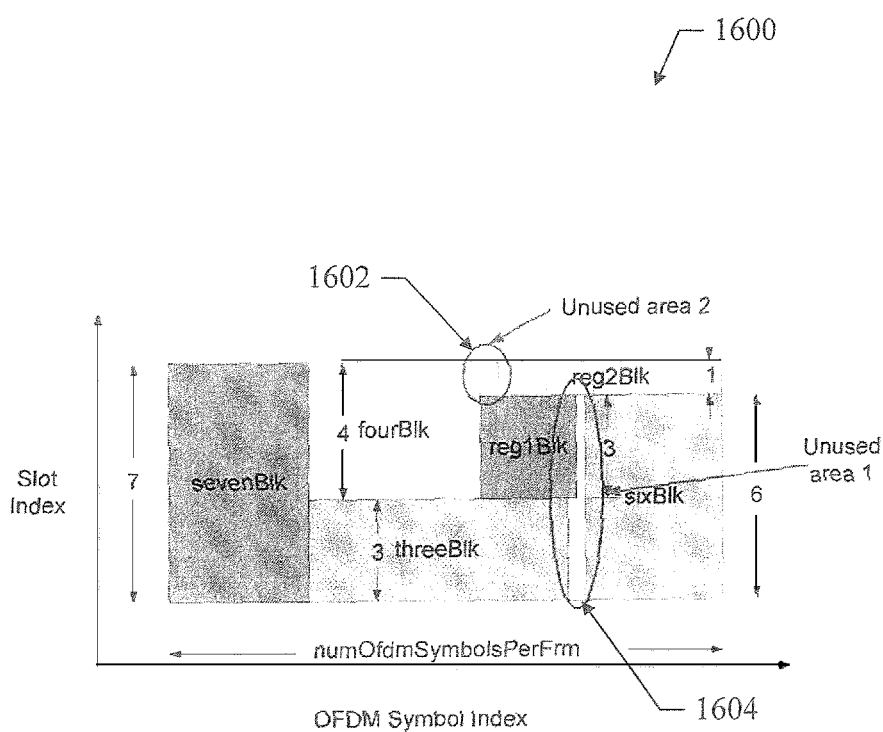
FIG. 16 shows a frame that illustrates the operation of an exemplary allocation algorithm to pack RT services in such a way that unused slots are grouped in two areas.

FIG. 16 shows a frame 1600 that illustrates the operation of an aspect of an allocation algorithm to pack RT services in such a way that unused slots are grouped in two areas. Collecting unused slots in fewer areas ensures better utilization of these slots by services that are lower in priority than the services that were input to the allocation algorithm. In an aspect, ORT services may be packed into these areas. For example, in the frame 1600, the unused slots are groups in areas 1602 and 1604.

Real-Time Service Resizing Algorithm

In one or more aspects, the resize controller 116 operates to control how services are resized so that they may be packed into a frame. For example, services are resized to adjust their associated delivery requirements. In an aspect, one or more services are resized to reduce associated bandwidth requirements; however, the resize controller 116 operates to resize services to adjust any of the associated delivery requirements. The following description describes a resizing algorithm that operates to resize component streams in RT services. The conditions which give rise to the resizing of RT services are also provided. In an aspect, the resize controller 116 operates to implement a resizing algorithm that determines resizing parameters. These parameters are then transmitted to the RTMS associated with the RT services in a resizing request.

The RTMS then operates to resize the identified RT services according to the parameters in the resizing request.

It should also be noted that the resize controller 116 also operates to resize any ORT service. For example, the resize controller 116 is operable to determine how one or more ORT services should be resized and communication with any NRTMS to implement the determined resizing. As a result, delivery requirements associated with those services will be adjusted. For example, the resize controller 116 may communicate with a NRTMS to reduce the bandwidth requirement of an ORT service thereby adjusting its delivery requirements. Thus, the aspects described herein with reference to resizing RT services are equally applicable to ORT services as well.

As shown in FIG. 1, the MUX 114 receives content flow data, and associated signaling data from the RTMS 126 and NRTMS 128. Every superframe, the MUX 114 negotiates data bandwidth with the RTMS 126 for all the active real time services and optionally with the NRTMS 128 for ORT services. In an aspect, the bandwidth negotiation involves the following sequence of operations.

a. The MUX 114 sends a GetDataSize.Request message to the RTMS 126 to request data sizes for RT services to be sent in a superframe.

b. The RTMS 126 sends a GetDataSize.Response message to the MUX 114 specifying data sizes for the RT services to be sent in a superframe.

c. The MUX 114 performs content scheduling (allocations) based on all the received data sizes from the RTMS 126 as well as from other sources.

d. The MUX 114 sends the updated sizes for the RT services flow data to the RTMS 126 as part of an UpdateDataSize.Notification message.

In an aspect, the MUX 114 operates to provide a content scheduling function that comprises aspects of the slot allocation algorithm described above. The resize controller 116 provides aspects of a resizing algorithm. The slot allocation algorithm is responsible for fitting the slots (rate) allocated to all the media services in a superframe. Certain systems constraints (e.g. peak throughput of the turbo decoder on the device limits the number of slots that can be assigned to a particular media service in a single OFDM symbol) can cause the slot allocation procedure to fail in spite of the total assigned slots being less than or equal to the total available slots in a superframe. Also, the real-time service component that is expected to dominate demand for air-link resources is video content. This content is compressed using source coding which results in a highly variable bit-rate flow. Finally, the capacity per superframe available for transmission of real time services may vary due to requirements of other concurrent media services. These factors lead to one of the following allocation conditions to occur.

1. The sum of all the data requested by the RT services is less than or equal to the available capacity and the slot allocation algorithm succeeds.

2. The sum of all the data requested by the RT services is less than or equal to the available capacity but the slot allocation algorithm fails.

3. The sum of all the data requested by the RT services is more than the available capacity.

The allocation conditions 2 and 3 result in failure to allocate the amount of data requested by the RT service flows. In these scenarios, the MUX 114 invokes the resize controller 116 to perform a resize algorithm to resize RT services. The next section explains the concept of quality for the real time services, and the objective of aspects of the resize algorithm.

Real Time Service Quality and Resize Algorithm Objective

The concept of quality is associated with the video flows within a real time streaming media service. The quality (Q) of a real-time service is a function of the bit rate (r) allocated to the service flows and is modeled by a quality function expressed as;

$$Q = f(r) \tag{3}$$

Every superframe, the RTMS 126 provides information which helps the MUX 114 evaluate this function. This is sent to the MUX 114 in the GetDataSize.Response message. As explained in the following sections, the MUX 114 uses this information for quality estimation of the real time service facilitating the resize procedure. It should also be noted that any selected quality measurement or characteristic can be used by the MUX 114 for quality estimation purposes.

The resize algorithm assigns rates (in units of physical layer packets (PLPs)) to the real time services such that the total allocated rate is less than or equal to the available capacity for RT services so that the slot allocation algorithm succeeds. Thus, in an aspect, the rate assignment for RT services should be such that the quality function of the RT service video flows is in proportion to their weights according to the following.

$$(Q_i/Q_j) = (W_i/W_j) \tag{4}$$

where $Q_i$ ($W_i$) and $Q_j$ ($W_j$) are quality functions (flow weights) for any RT services i, j. The quality function is estimated using equation (3) above. The weight value associated with a flow gives a measure of the relative significance of that flow amongst the other RT video flows. In an aspect, the MUX 114 obtains these flow weight values from a Subscription and Provisioning Sub-system, which may also be responsible for service planning and management functions associated with a distribution network.

Resize Algorithm

This section explains aspects of the RT service resize algorithm. The algorithm uses an iterative approach to converge to a rate assignment for the video component streams (flows) in the RT services. The algorithm begins with the number of PLPs (rate) requested by each video stream. Each of the iterations of the algorithm involves identifying a candidate service for rate reduction. The candidate stream is one that is least sensitive to rate reduction and does not suffer an unfavorable reduction in quality in comparison with the other streams. In an aspect, the functions of the resize algorithm are provided by the resize controller 212 shown in FIG. 2.

After a candidate stream is identified, the rate allocated to that stream is reduced. For example, the rate may be reduced by an amount corresponding to two Reed-Solomon code blocks. The network assigns rates to all services with a granularity defined by the number of PLPs corresponding to one Reed-Solomon block. The video streams are assumed to be transmitted using one of the network's layered transmit modes with base and enhancement video components. In addition, the system constrains the data in the two video components to be equal. Hence, the choice of two Reed-Solomon blocks as the unit of rate reduction. However, it should be noted that it is within the scope of the aspects to reduce the rate of a stream by any other selected amount.

Constants

The following constant parameters are used in aspects of a multiplexing system to provide a resize function.

rateReductionBnd
    The upper bound on the fractional reduction in rate for any real time video stream. The bound is in reference to the rates requested by the streams. In an aspect, a value of 0.5 is used.
sysMin
    A minimum value for a stream's quality. It is used to prevent streams that have reached the rate reduction bound from further reduction in rate.
payloadPLP
    Effective payload for a PLP, which is approximately 968 bits.
Algorithm Inputs
    The following inputs are used in aspects of a multiplexing system to provide a resize function.
maxRTSOFDMSym
    Capacity in number of OFDM symbols per superframe available for the real time services.
numRTS
    Number of real time services sharing the available capacity.
numVStreams
    The total number of video component streams in the real time services. For example, VStream is a list of structures describing each real time video component stream.
_weight
    Holds the relative weight value for the stream.
requestedPLPs
    Holds the number of PLPs per superframe requested by the stream. It is possible to estimate the raw number of bits requested as requestedPLPs×payloadPLP (968 bits).
rsCodeParameterK
    Parameter K for a Reed Solomon (N,K) code.
Variables
    The following variables are used in aspects of a multiplexing system to provide a resize function.
reqPLPs [numVStreams]
    Array indexed by a number (0 to numVStreams−1) identifying the video component stream. The array holds the number of PLPs per superframe requested by this stream as indicated by the requestedPLPs member of the VStream structure.
assgnPLPs [numVStreams]
    Array indexed by a number (0 to numVStreams−1) identifying the video component stream. The array holds the number of PLPs per superframe assigned to this stream.
tempPLPs [numVStreams]
    Array indexed by a number (0 to numVStreams−1) identifying the video component stream. The array holds the number of PLPs per superframe assigned to the video component stream. This is a temporary variable used internally by the algorithm.
weight [numVStreams]
    Array indexed by a number (0 to numVStreams−1) identifying the video component stream. The array holds the relative weight value of the stream indicated by the _weight member of the VStream structure.
effQuality [numVStreams]
    Array indexed by a number (0 to numVStreams−1) identifying the video component stream. The array holds the estimated quality for the real time service stream.
PLPsPerRSBlk [numVStreams]
    Array indexed by a number (0 to numVStreams−1) identifying the video component stream. The array holds the number of data PLPs per Reed-Solomon code block as indicated by the rsCodeParameterK member of the VStream structure.

Algorithm Outputs
    The following outputs are used in aspects of a multiplexing system to provide a resize function.
successFlag
    A flag set to 1 if the resize algorithm succeeds in converging to a rate assignment that satisfies the constraints. Otherwise, the successFlag is set to 0.
Internal Procedures Called by the Resize Algorithm
    The following is an internal procedure called by the resize algorithm in aspects of a multiplexing system.
reducePLPs ( )
    A procedure that identifies a video stream for rate reduction and reduces the amount of data allocated to that stream. This procedure shares the variables space as defined for the main routine.
External Algorithm Called by the Re-Encode Algorithm
    The following is an external procedure called by the resize algorithm in aspects of a multiplexing system.
slotAllocation
    Slot allocation algorithm is responsible for fitting the slots (rate) allocated to all the media services in a superframe. The resize algorithm calls the slot allocation algorithm with the required input arguments including allocated data (rate) for all media services.
Algorithm
    The following is a description of an aspect of a resize algorithm for use in aspects of a multiplexing system. In an aspect, the resize controller 212 implements the resize algorithm and performs one or more of the following functions.

```
a.   Using VStream structure data, populate the arrays reqPLPs[ ],
     qualityIndex[ ], PLPsPerRSBlk[ ], and weight[ ].
b.   Initialize all elements of array assgnPLPs[ ] to corresponding
     elements in reqPLPs[ ].
c.   Initialize an algorithmFlag = 1, and a successFlag = 0.
d.   Perform the following functions:
         while algorithm Flag == 1
             reducePLPs( )
             if reduction > 0
             call slotAllocation Algorithm
             if slotAllocation Algorithm succeeds
                 algorithmFlag = 0
                 success Flag = 1
             endif
             else
/* This condition signifies a failure to resize while respecting the
     rateReductionBnd bound.*/
             endif
         endwhile
```

The following functions are performed as part of the reducePLPs( ) procedure.

```
for i = 0 to numVStreams
    tempPLPs[i] = assgnPLPs[i]
    tempPLPs[i] = tempPLPs[i] − 2 x PLPsPerRSBlk[i]
/* PLPs allocated to a stream are reduced by an amount corresponding to
    two Reed- Solomon blocks. In an aspect, one RS block is removed
    from both base and enhancement components. The system constrains
    the data in base and enhancement video components to be equal. */
    if tempPLPs[i] / reqPLPs[i] > = rateReductionBnd
        effQuality[i] = f(tempPLPs[i] x payloadPLP) / weight[i]
    else
        effQuality[i] = sysMin
    endif
endfor
/* where f( ) is any suitable function that may be used to evaluate quality
*/
e.   Identify the index of the service with maximum effective quality as
     given by the array effQuality[ ]. Set the _index parameter to that
     value.
```

-continued

```
f.  Perform the following functions.
      if effQuality[_index] == sysMin
      /* This condition signifies failure to resize while respecting the
         rateReductionBnd bound. */
            reduction = -1
      else
            reduction = 2 x PLPsPerRSBlkLindex]
            assgnPLPsLindex] = tempPLPsLindex]
      endif
```

Thus, the resize controller 212 operates to provide the above functions to resize services in aspects of a multiplexing system. For example, the rate of a RT service is reduced to allow the service to be allocated to the available slots of a superframe as provided by aspects of the allocation algorithm described above.

Other than Real Time Services (ORTS)

Aspects of the slot allocation algorithm are described above that take into account various constraints and ensures that the number of turbo packets sent for a service in an OFDM symbol is decodable by a device. This algorithm is preferable for RT Services since the device is required to receive only one RT service at any time. However, a device might be receiving multiple ORT services in a superframe. If the same algorithm is used, the total number of packets for all the ORT services subscribed to by the device in an OFDM symbol may become greater than the device limit. This is termed a "turbo packet conflict." A turbo packet conflict leads to the loss of ORT service data. The magnitude of the loss depends generally on the subscription pattern of the user. Thus, additional aspects of the slot allocation algorithms for ORT services are provided and described below that will completely eliminate turbo packet conflicts.

Figure 17:
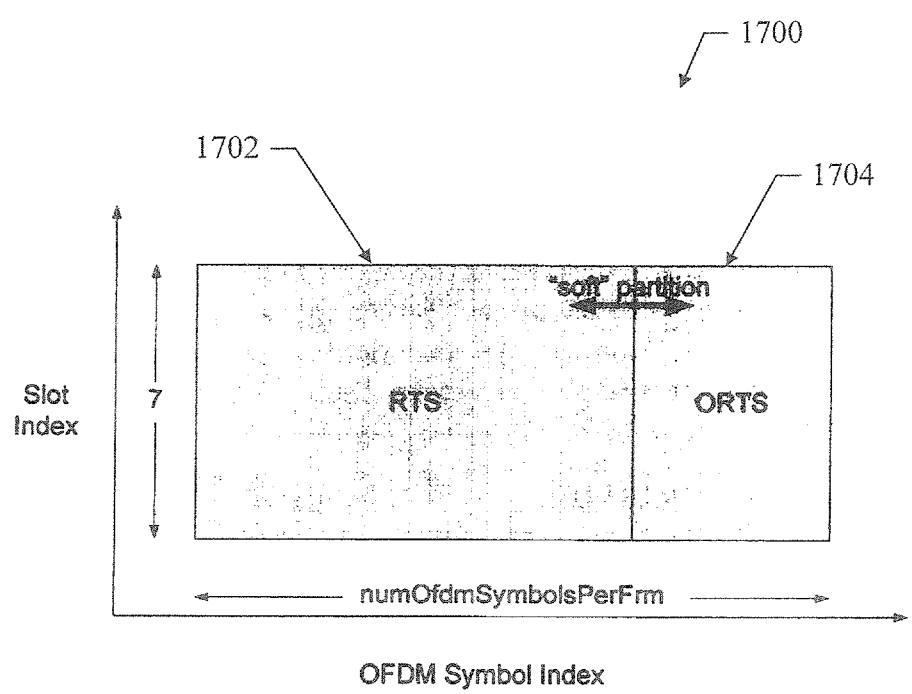
FIG. 17 shows an exemplary frame that is divided into regions for RT services and ORT services for use in a multiplexing system.

FIG. 17 shows an exemplary frame 1700 that is divided into regions for RT services and ORT services for use in a multiplexing system. A first region 1702 is provided for RT services, and a second region 1704 is provided for ORT services. Partitioning the frame into these regions will ensure that there is no turbo packet conflict between RT and ORT services. The partition between the RT 1702 and ORT 1704 regions is a "soft" partition (i.e., it varies from superframe to superframe depending on the available RT and ORT service data in that superframe). RT services are slot allocated in the RT service region 1702 using one of the slot allocation algorithms and the resize algorithm described above. ORT services are slot allocated in the ORT service region 1704 using one of the ORT service algorithms described below. In one or more aspects, the ORT services are also resized to fit into the available bandwidth. A more detailed description of resizing applied to ORT services is provided below.

ORT Service Slot Allocation

With respect to a receiving device's power consumption, it is preferable that the height of an MLC allocation be its maxSlotHeight. This minimizes possible "on time" for the device to receive that MLC. However, for ease of packing, all the grouped MLC's of a service are allocated with the same height. Thus, even for the ORT Services, the concept of "maxSlotHeight of a service" is defined as the minimum or smallest of the maxSlotHeight parameters of all the MLC's grouped for that service. For the remainder of this description, a service's height will mean the common height of all the MLC allocations of that service.

Channels of a Service are Grouped Together

In an aspect, all channels of a service are grouped together so that their allocations are temporally adjacent in the frame. This approach reduces the number of times a device needs to "wake up" to receive different channels of a service, and so this aids the device in reducing power consumption.

Orts Region is Divided into Blocks

Figure 18:
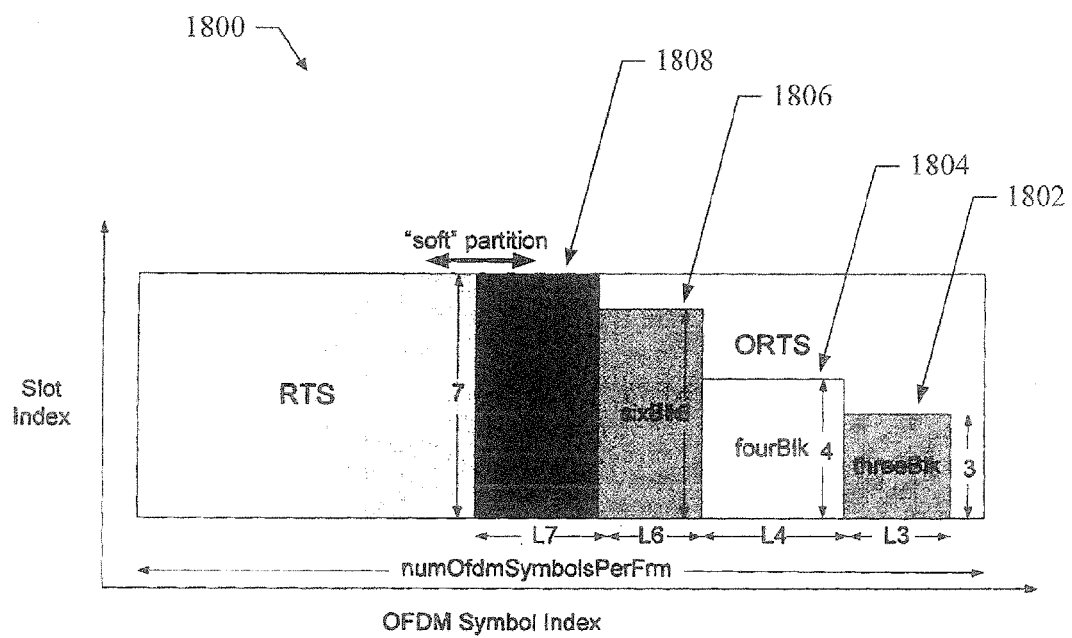
FIG. 18 shows an exemplary frame wherein an ORT service region is divided into blocks of different heights.

FIG. 18 shows an exemplary frame 1800 wherein an ORTS region is divided into blocks of different heights. In an aspect, the block heights correspond to the possible maxSlotHeights a service can take. From the Table 500 it can be seen that there are four maxSlotHeights (i.e., 3, 4, 6 and 7). Thus, the frame 1800 shows threeBlk 1802, fourBlk 1804, sixBlk 1806, and sevenBlk 1808 regions that are used to allocate associated services. The ORT service slot allocation algorithm then operates to pack services into different blocks based on the maxSlotHeight.

No Block Above Another

In an aspect, the blocks are arranged in the frame 1800 such that no block is above another. This ensures that no two ORT services have turbo packet conflicts.

ORT Service Slot Algorithm

In one or more aspects, the following parameters represent inputs to the ORT service slot allocation algorithm.

a. The number of slots of data each MLC of a service has for a frame.
b. The maxSlotHeight of each MLC of a service, which is determined by the transmit mode of that MLC.
c. The total number of symbols available (numAvailOrtsSymPerFrm) for the ORT service.

In one or more aspects, the following parameters represent outputs from the ORT service slot allocation algorithm a. A decision on whether packing is possible.
b. If packing is successful the number of symbols occupied (numOccuOrtsSymPerFrm) by the ORT service.

Figure 19:
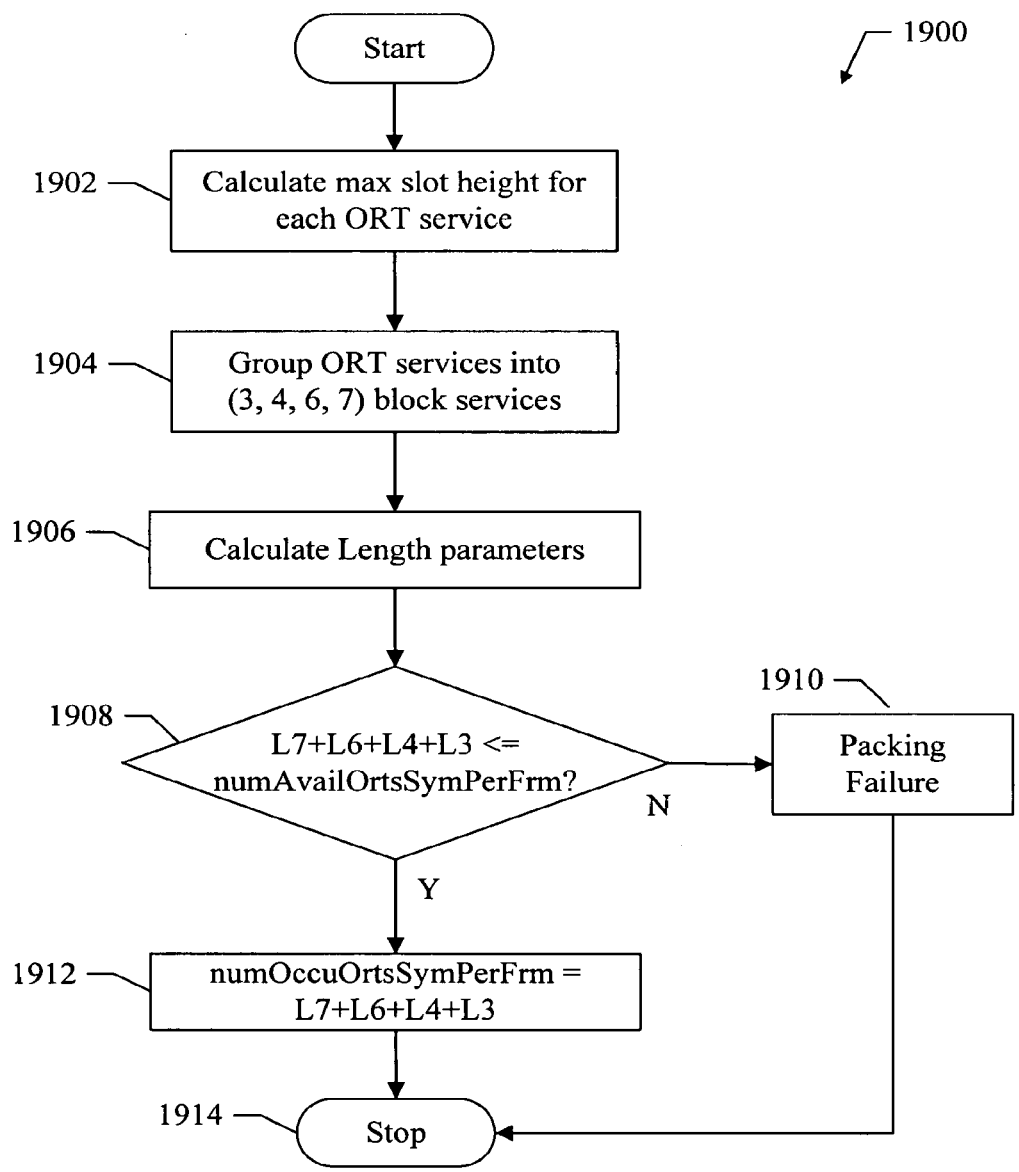
FIG. 19 shows an exemplary method for allocating slots to ORT service for use in a multiplexing system.

FIG. 19 shows an exemplary method 1900 for allocating slots to ORT services for use in a multiplexing system. In an aspect, the MUX logic 210 operates to provide the functions of the method 1900 as describe below.

At block 1902, a calculation of the maxSlotHeight of each ORT service is performed. In an aspect, the MUX logic 210 performs this calculation.

At block 1904, the ORT services are grouped into blocks based on the maxSlotHeight parameters for each service. For example, in an aspect, the services are grouped into threeBlkSrvcs, fourBlkSrvcs, sixBlkSrvcs, and sevenBlkSrvcs. In an aspect, the MUX logic 210 performs this operation.

At block 1906, the length variables L7, L6, L4 and L3 are calculated. For example L7=ceil (total slots of all sevenBlkSrvcs/7), where ceil(x) is the smallest integer greater than x. In an aspect, the MUX logic 210 performs this operation.

At block 1908, a test is performed to determine if the number of required symbols is greater than the number of available symbols. For example, the following inequality is evaluated.

$$(L7+L6+L4+L3 <= numAvailOrtsSymbolsPerFrm)$$

In an aspect, the MUX logic 210 performs this operation. If the above inequality is false, then the method proceeds to block 1910. If the above inequality is true, then the method proceeds to block 1912.

At block 1910, a packing failure is determined and the method ends at block 1914.

At block 1912, packing is successful and the number of occupied symbols is determined from the following equation.

$$numOccuOrtsSymPerFrm = L7+L6+L4+L3$$

In an aspect, the MUX logic 210 performs this operation. Once packing is successful, it is easy to arrive at the location of every MLC allocation, since the block that each service belongs to is known.

It should be noted that the method 1900 represents just one implementation and the changes, additions, deletions, combinations or other modifications of the method 1900 are possible within the scope of this disclosure.

Interactions Between Slot Allocation and Resize Algorithms

In the previous sections, aspects of slot allocation and resize algorithms are described. The following sections provide a description of the overall interaction of these algorithms for use in aspects of a multiplexing system.

Figure 20:
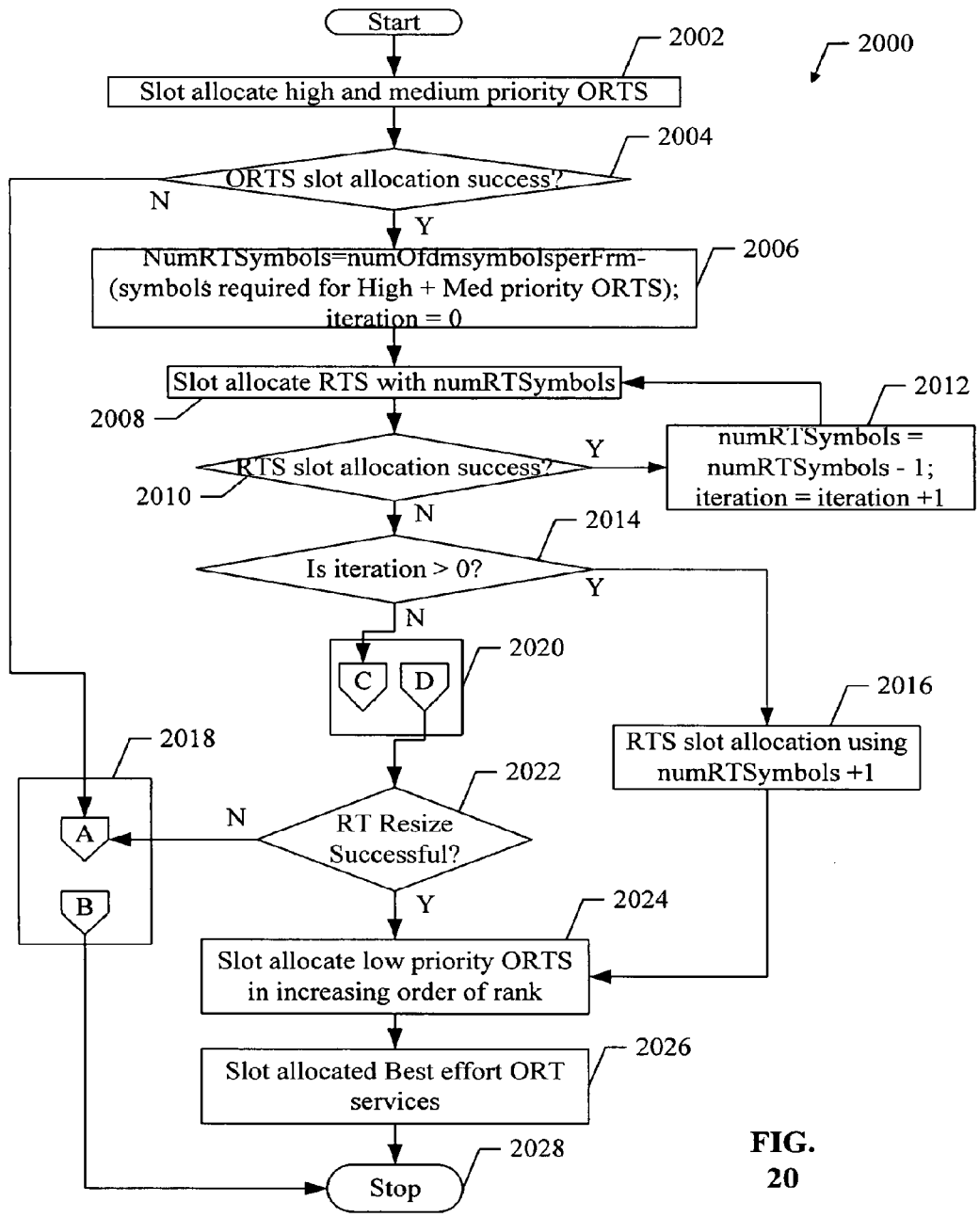
FIG. 20 shows an exemplary method for providing slot allocation, resizing, and congestion control for use in a multiplexing system.

FIG. 20 shows an exemplary method 2000 for providing slot allocation, resizing, and congestion control for use in a multiplexing system. For example, the server 200 operates to provide the functions described below.

At block 2002, high and medium priority ORT services are slot allocated. For example, every superframe the MUX 114 gets the amount of various flow data and their relative priorities from content entities, such as the RTMS 126 and the NRTMS 128 using the GetDataSize.Response instruction. Using this information, slot allocation for high priority and medium priority ORT services is performed. For example, in an aspect, the MUX logic 210 operates to perform slot allocation of high and medium priority ORT services according to the above algorithms.

At block 2004, a test is performed to determine if the high and medium priority ORT service slot allocation was successful. If the allocation was successful, the method proceeds to block 2006. If the allocation was not successful, the method proceeds to block 2018.

At block 2018, congestion control is performed. Because the high and medium priority ORT service slot allocation was not successful, the system experiences congestion that needs to be addressed. In an aspect, the MUX logic 210 performs a congestion control algorithm that is described with reference to FIG. 22. Upon returning from the congestion control the method stops at block 2028.

At block 2006, based on the success of the ORT service slot allocation, the number of symbols available for RT services is computed and an iteration parameter is set to zero. For example, in an aspect, the MUX logic 210 performs these functions.

At block 2008, slot allocation of RT service is carried out with the remaining symbols in the frame. For example, aspects of the slot allocation algorithm described above are used to allocate slots to the RT services.

At block 2010, a test is performed to determine if the RT services were successfully allocated. If the allocation was not successful, the method proceeds to block 2014. If the allocation was successful, the method proceeds to block 2012.

At block 2012, the number of available symbols is decreased and the iteration parameter is increased. For example, in an aspect, the MUX logic 210 performs these functions. The method then proceeds to block 2008 to slot allocated the RT services.

At block 2014, a test is performed to determine if the iteration parameter is greater than zero. For example, in an aspect, the MUX logic 210 performs these functions. If the iteration parameter is greater than zero, the method proceeds to block 2016. If the iteration parameter is not greater than zero, the method proceeds to block 2020.

At block 2016, RT service slot allocation is performed using the numRTSymbols plus one. For example, the MUX logic 210 performs slot allocation for the RT services using the increased numRTSymbols value. The method then proceeds to block 2024.

At block 2020, selected RT services are resized. In an aspect, a resize algorithm is used to resize the rate of one or more flow so that a RT service slot allocation can succeed. For example, the resize controller 212 operates to perform one of the resize algorithms described herein. Upon returning from the resize algorithm, the method proceeds to block 2022.

At block 2022, a test is performed to determine if the resize of the RT services was successful. For example, there may be a situation where the resize algorithm fails to achieve a slot allocation with an acceptable lower bound video quality or lower bound resize ratios. If the resize was successful, the method proceeds to block 2024. If the resize was not successful, this situation means that the system is congested, and so the method proceeds to block 2018 to perform congestion control.

At block 2024, low priority ORT services are slot allocated in increasing order of rank. For example, the MUX logic 210 performs this function.

At block 2026, Best Effort ORT service or data is slot allocated. For example, the MUX logic 210 performs this function. The method 2000 then ends at block 2028.

Therefore, at the completion of the method 2000, the MUX 114 has the information on the exact data sizes of various flows that can be sent in the current superframe. This information is conveyed back to the RTMS 126 and the ORTMS 128 using the UpdateDataSize.Notification message.

It should be noted that the method 2000 represents just one implementation and the changes, additions, deletions, combinations or other modifications of the method 2000 are possible within the scope of this disclosure.

Figure 21:
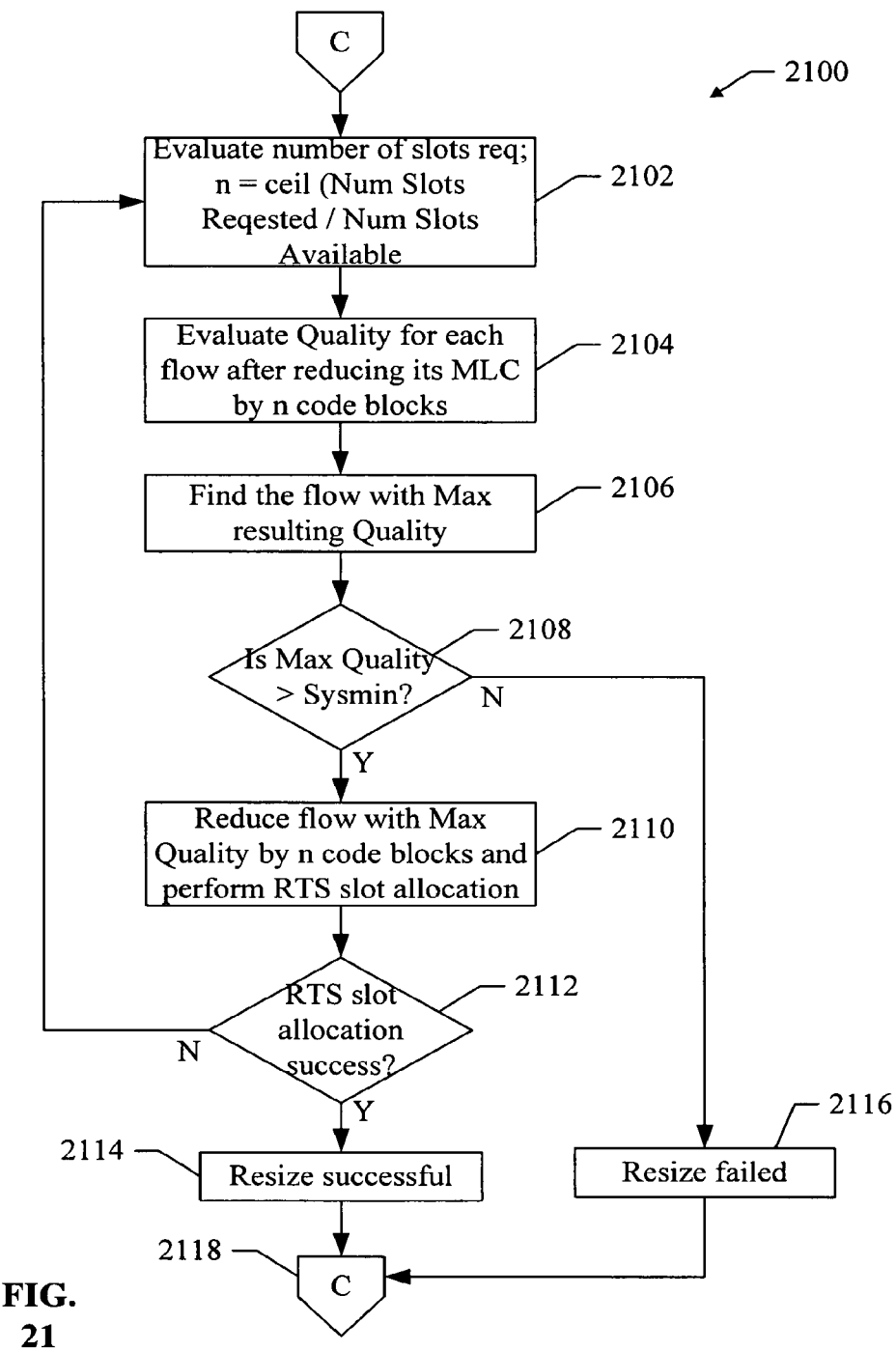
FIG. 21 shows an exemplary method for providing resizing of real time services for use in a multiplexing system.

FIG. 21 shows an exemplary method 2100 for providing resizing for use in a multiplexing system. For example, the method 2100 is suitable for use as block 2020 in FIG. 2000. In an aspect, the resize controller 212 operates to provide the functions described below.

At block 2102, the number of slots requested is evaluated and a parameter n is calculated. In an aspect, n represents a ratio between the number of slots requested for a service and the number of slots available. For example, the resize controller 212 performs this calculation.

At block 2104, the quality of flows to be resized is evaluated. For example, after reducing the MLCs for each flow by n code blocks a quality evaluation is made. For example, the quality (Q) of a service is a function of the bit rate (r) allocated to the service flows and is modeled by the quality function expressed above. For example, the resize controller 212 performs this quality determination.

At block 2106, the flow with the maximum resulting quality is determined (candidate). For example, the resize controller 212 determines the flow with the maximum quality that would result after performing the reduction of code blocks at block 2104.

At block 2108, a test is performed to determine if the maximum quality is greater than a system minimum quality requirement. For example, the resize controller 212 determines the result of this test. If the maximum quality is not greater than the system minimum quality requirement, the method proceeds to block 2116. If the maximum quality is greater than the system minimum quality requirement, the method proceeds to block 2110.

At block 2110, the flow having the maximum quality is resized and slot allocation is performed. For example, the flow having the maximum quality is reduced by n code blocks and slot allocation is performed. For example, the resize controller 212 resizes the flow and requests the MUX logic 210 to perform a slot allocation.

At block 2112, a test is performed to determine if the slot allocation was successful. For example, the resize controller 212 receives an indicator from the MUX logic 210 that indicates whether the slot allocation performed at block 2110 was successful. If the slot allocation was successful, the method proceeds to block 2114. If the slot allocation was not successful, the method proceeds to block 2102.

At block 2114, the resize is determined to be successful, and at block 2116, the resize is determined to have failed. For example, the resize controller 212 makes these determinations. The method then proceeds to block 2118 where the method returns to block 2020 in FIG. 2000.

Therefore, the method 2100 operates to provide resizing for use in a multiplexing system. It should be noted that the method 2100 represents just one implementation and the changes, additions, deletions, combinations or other modifications of the method 2100 are possible within the scope of this disclosure.

Figure 22:
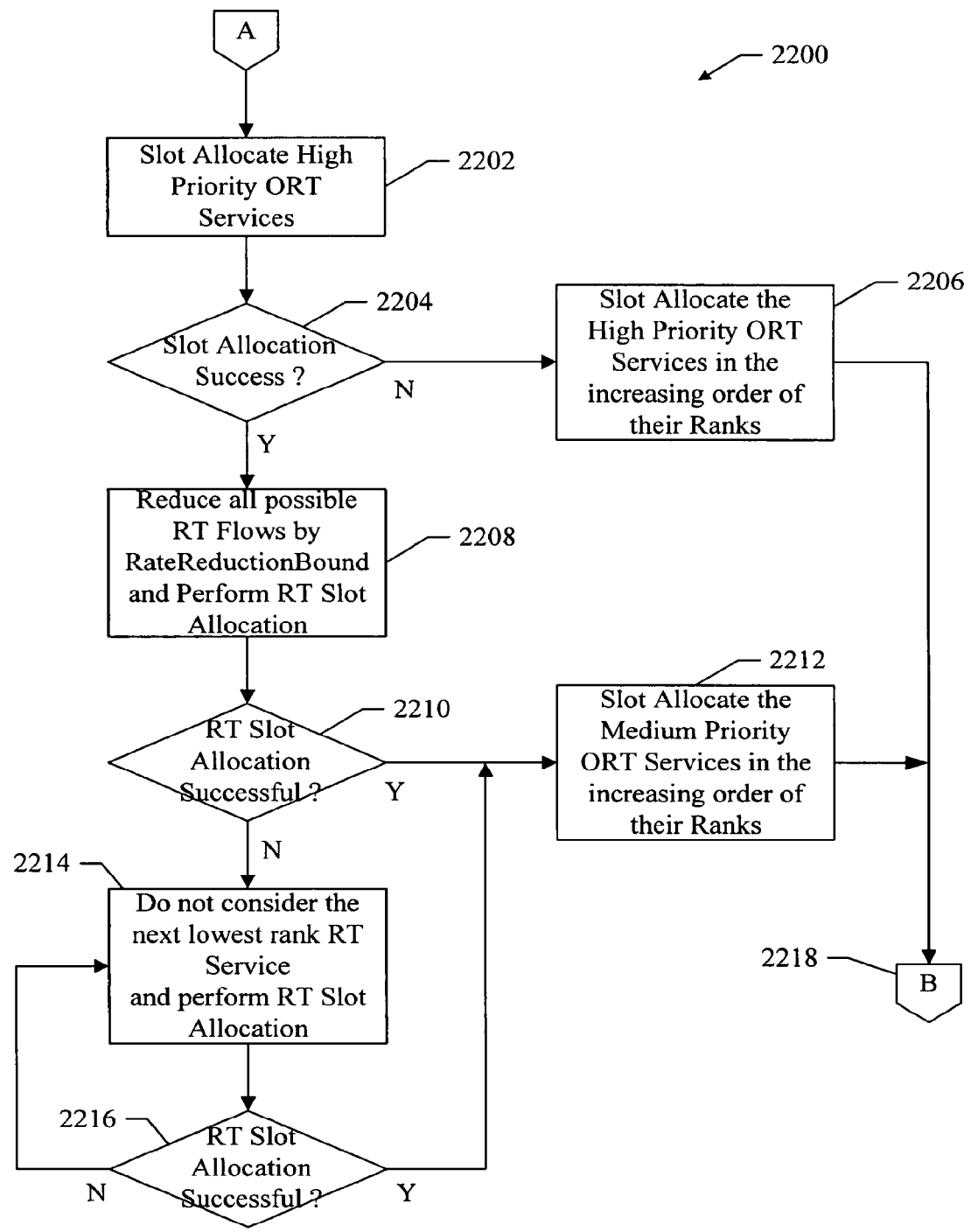
FIG. 22 shows an exemplary method for providing congestion control for use in a multiplexing system.

FIG. 22 shows an exemplary method 2200 for providing congestion control for use in a multiplexing system. For example, the method 2200 is suitable for use as block 2018 in FIG. 2000. In an aspect, the MUX 210 operates to provide the functions described below.

At block 2202, high priority ORT services are slot allocated. For example, the MUX 210 performs this allocation according to aspects of an allocation algorithm described herein.

At block 2204, a test is performed to determine if the allocation performed at block 2202 was successful. For example, the MUX 210 performs this function. If the allocation was a success, the method proceeds to block 2208. If the allocation was not successful, the method proceeds to block 2206.

At block 2206, high priority ORT services are allocated by the increasing order of their rank. For example, the MUX 210 performs this allocation according to aspects of an allocation algorithm described herein. The method 2200 then ends at 2218.

At block 2208, all possible RT service flows are reduced by a selected amount and slot allocation of those flows is performed. For example, the resize controller 212 and the MUX 210 perform these operations according to aspects described herein. The selected amount is based on a rate reduction parameter known to the system.

At block 2210, a test is performed to determine if the RT service slot allocation at block 2208 was successful. For example, the MUX 210 performs this function. If the allocation was successful, the method proceeds to block 2112. If the allocation was not successful, the method proceeds to block 2214.

At block 2212, the medium priority ORT services are slot allocated in order of the increasing rank. For example, the MUX 210 performs this allocation according to aspects of an allocation algorithm described herein. The method 2200 then ends at 2218.

At block 2214, a RT service slot allocation is performed that excludes the next lowest ranked service. For example, the MUX 210 performs this allocation according to aspects of an allocation algorithm described herein.

At block 2216, a test is performed to determine if the allocation at block 2214 was successful. For example, the MUX 210 performs this function. If the allocation was successful, the method proceeds to block 2212. If the allocation was not successful, the method proceeds back to block 2214 to exclude another service and attempt slot allocation again.

Therefore, the method 2200 operates to provide congestion control for use in a multiplexing system. It should be noted that the method 2200 represents just one implementation and the changes, additions, deletions, combinations or other modifications of the method 2200 are possible within the scope of this disclosure.

Figure 23:
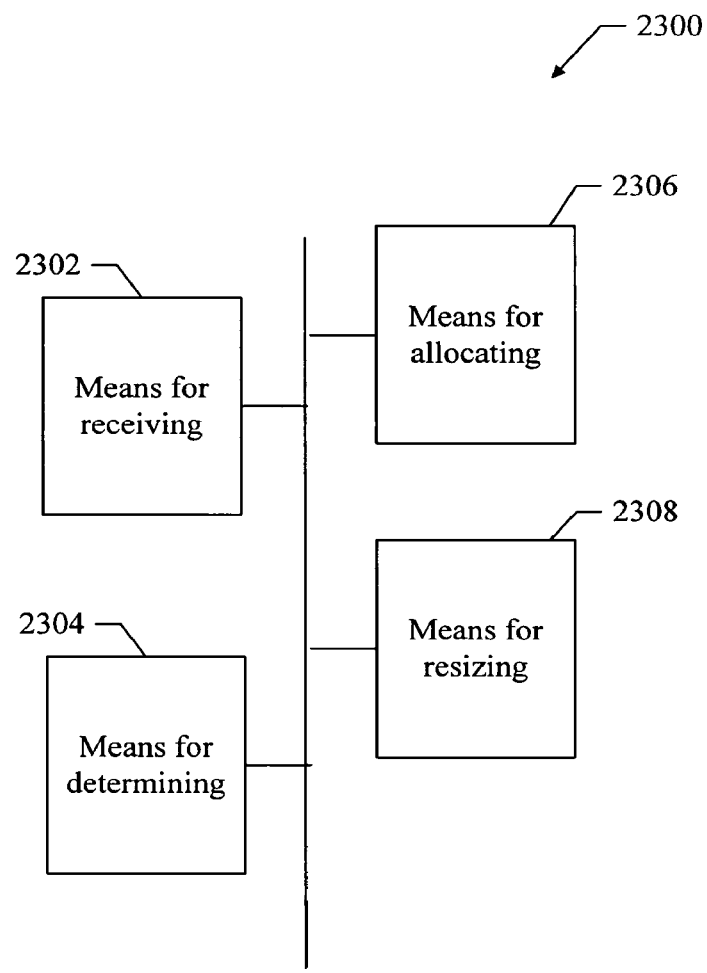
FIG. 23 shows an exemplary multiplexing system.

FIG. 23 shows an exemplary multiplexing system 2300. The multiplexing system 2300 comprises means (2302) for receiving data, means (2304) for determining bandwidth, means (2306) for allocating data, and means (2308) for resizing data. In an aspect, the means (2302-2308) are provided by at least one processor executing a computer program to provide aspect of a multiplexing system as described herein.

Figure 24:
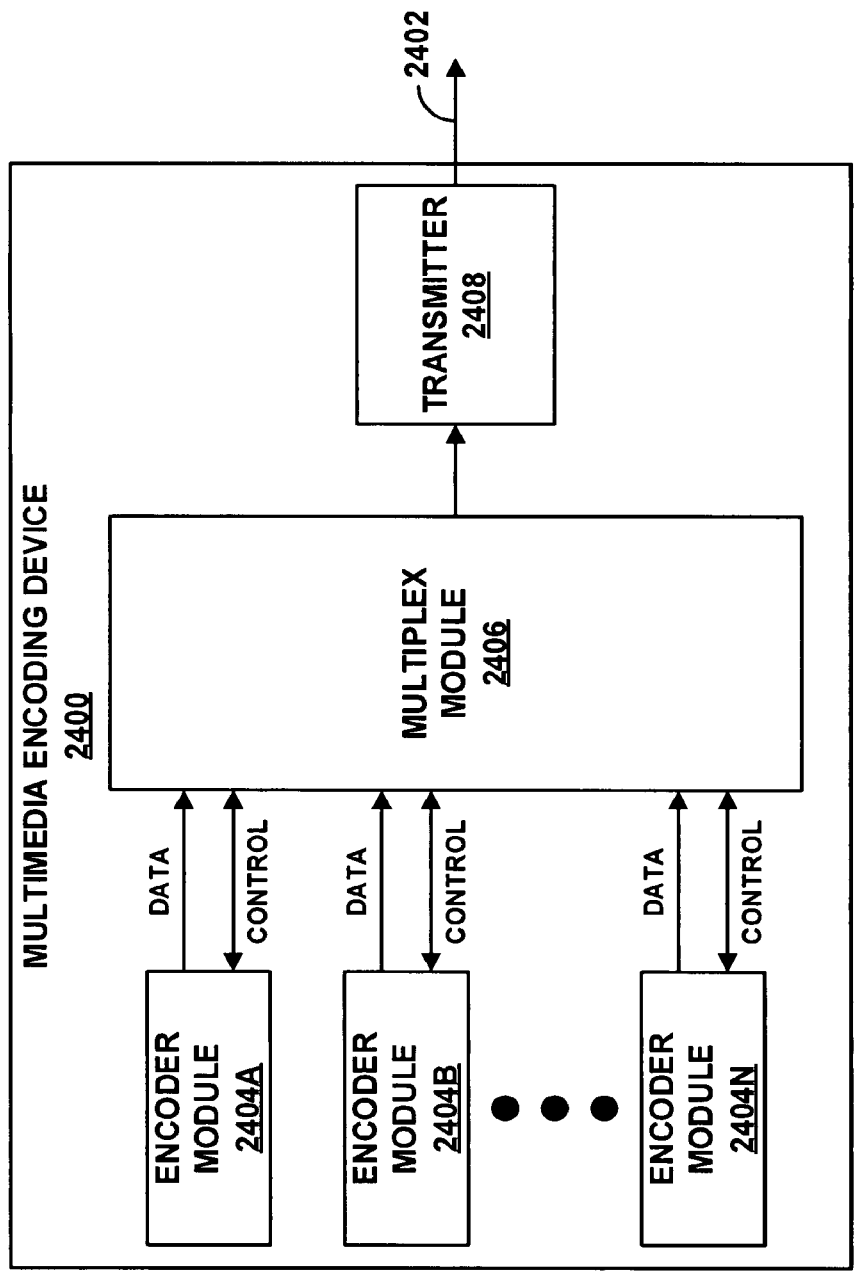
FIG. 24 is a block diagram illustrating an exemplary multimedia encoding device that encodes multimedia data in accordance with the techniques described herein.

FIG. 24 is a block diagram illustrating another exemplary multimedia encoding device 2400 that encodes multimedia data in accordance with the techniques described herein. Multimedia encoding device 2400 may form part of a broadcast network component used to broadcast one or more channels of multimedia data. Multimedia encoding device 2400 may, for example, form part of a wireless base station, server, or any infrastructure node that is used to broadcast one or more channels of encoded multimedia data to one or more wireless devices, such as mobile device 102 (FIG. 1). For instance, multimedia encoding device 2400 may represent server 104 of FIG. 1.

Multimedia encoding device 2400 encodes a plurality of services that include one or more flows of multimedia data, combines the encoded flows and transmits the combined flows to a multimedia decoding device via a transmission channel 2402. In one aspect of this disclosure, multimedia encoding device 2400 encodes, combines, and transmits portions of the flows of data received over a period of time. As an example, multimedia encoding device 2400 may operate on the flows on a per second basis. In other words, multimedia encoding device 2400 encodes one-second segments of data of the plurality of flows, combines the one-second segments of data to form a superframe of data, and transmits the superframe over transmission channel 2402 via a transmitter 2408. As used herein, the term "superframe" refers to a group of segments of data collected over a time period or window, such as a one second time period or window. The segments of data may include one or more frames of data. Although the techniques of this disclosure are described in the context of one-second segments of data, the techniques may also be utilized for combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals.

Transmission channel 2402 may comprise any wired or wireless medium, or a combination thereof. In one aspect, transmission channel 2402 is a fixed bandwidth channel. In this case, the number of bits of data that multimedia encoding device 2400 may transmit via transmission channel 2402 is limited to the size of the fixed bandwidth channel. Multimedia encoding device 2400 attempts to output each of the flows of data at a target quality level. The target quality level used to determine the bit rate can be pre-selected, selected by a user, selected through an automatic process or a semi-automatic process requiring an input from a user or from another process, or be selected dynamically by the encoding device or system based on predetermined criteria. A target quality level can be selected based on, for example, the type of encoding application, or the type of client device that would be receiving the multimedia data. If the number of bits necessary to output each of the flows of data at the target quality level exceeds the amount of bits available over transmission channel 2402, multimedia encoding device 2400 manages bit allocation among the flows in an attempt to preserve the highest overall quality for the plurality of flows in accordance with the techniques of this disclosure.

As shown in FIG. 24, multimedia encoding device 2400 includes encoder modules 2404A-2404N (collectively, "encoder modules 2404"), a multiplex module 2406 and a transmitter 2408. Encoder modules 2404 receive flows of digital multimedia data from one or more sources. Encoder modules 2404 may, for example, receive the flows of multimedia data from a memory or an image capture device coupled to encoder modules 2404. The flows of multimedia data may comprise live real-time video, audio, or video and audio flows to be coded and transmitted as a broadcast, or may comprise pre-recorded and stored video, audio, or video and audio flows to be coded and transmitted as a broadcast or on-demand. The techniques of this disclosure may also be applied to non-real time services or a combination of real-time services and non-real time services. In other words, multimedia encoding device 2400 may include one or more ORT modules that generate ORT services. For simplicity, however, FIG. 24 illustrates only encoder modules 2404.

Encoder modules 2404 may associate the received flows of data with at least quality and rate information. As will be described in more detail, encoder modules 2404 may analyze content of the flows and associate the flows with respective quality and rate information, such as quality-rate curves, content classification curves or quality-rate tables. The quality and rate information indicates, among other things, sizes of the segments of data at different quality levels for the segments of data that encoder modules 2404 desire to include in the current superframe. Encoder modules 2404 send at least the quality and rate information associated with the segments of data to multiplex module 2406. Encoder modules 2404 may send the quality and rate information to multiplex module 2406 via control channels. For example, encoder modules 2404 may send the quality and rate information via the control channels in response to requests received from multiplex module 2406. Multiplex module 2406 and encoder modules 2404 may communicate using a number of different communication protocols. In one aspect, multiplex modules 2406 may communicate using protocols that utilize the message transport layer (MTL) as the underlying transport mechanism.

Multiplex module 2406 receives the quality and rate information. In some cases, multiplex module 2406 may also receive delivery requirements, e.g., priority and latency requirements associated with one or more ORT services. Multiplex module 2406 analyzes one or more delivery requirements to determine whether the segments of data that encoder modules 2404 desire to include in the current superframe fit within the available bandwidth of transmission channel 2402. Multiplex module 2406 may, for example, make an initial determination as to whether the segments of data will fit within the current superframe using sizes corresponding to an intersection between the target quality level of multimedia encoding device 2400 and respective quality-rate curves associated with the segments of data. As another example, multiplex module 2406 may make an initial determination as to whether the segments of data will fit within the current superframe using sizes corresponding to a highest quality level specified in quality-rate tables associated with the segments of data.

To determine whether the segments of data fit within the available bandwidth of transmission channel 2402, multiplex module 2406 may determine an amount of transmission channel resources necessary to send each of the segments of data at the sizes corresponding to a selected one of the quality levels, sum the amounts of transmission channel resources necessary to send the segments of data and compare the sum total of transmission channel resources required by all the segments of data with an amount of available transmission channel resources to determine whether there is sufficient transmission channel resources to send the segments of data. In the wireless context, the transmission channel resources may comprise air-link or air-interface resources. In one aspect example, multiplex module 2406 may perform a slot allocation algorithm, such as one of the slot allocation algorithms described above, to determine whether there are sufficient transmission channel resources. As described in more detail above, multiplex module 2406 may also account for the delivery requirements of the ORT services in conjunction with the quality and rate information associated with the segments of data of encoder modules 2404 to determine whether all the services/segments fit within the available bandwidth.

If multiplex module 2406 determines the plurality of segments of data do not fit within the available bandwidth, e.g., the slot allocation algorithm fails or the sum total of necessary transmission channel resources exceeds the available transmission channel resources, multiplex module 2406 selects one or more of the segments to be resized based on the quality and rate information received from encoder modules 2404. Multiplex module 2406 attempts to select the segments of data to be resized that have a least amount of impact in quality at the corresponding reduced size. As will be described in more detail below, multiplex module 2406 analyzes the quality and rate information to determine quality impacts on each of the segments of data after reduction of the number of bits allocated to the segments, and selects one or more of the segments of data with the highest quality levels at the reduced sizes. In this manner, multiplex module may arbitrate among the real-time services of encoder modules 2404. In some cases, however, multiplex module 2406 may also select one or more ORT services to be resized based on their associated delivery requirements and thus allocate the bandwidth among the real-time services of encoder modules 2404 as well as the ORT services. Again, the techniques herein are described in the context of real-time services for exemplary purposes. Multiplex module 2406 may still analyze and resize ORT services in accordance with the techniques described above. Thus, the techniques described in the following figures are more applicable to resizing real-time services.

Multiplex module 2406 requests encoder modules 2404 associated with the selected segments of data to resize the flows of digital multimedia data in accordance with the reduced bit allocation. In some cases, multiplex module 2406 may request encoder modules 2404 to downsize the selected segments of data when there is not enough bandwidth to transmit the service. In other cases, multiplex module 2406 may request encoder modules 2404 to upsize the selected segments of data when there is excess available bandwidth. Multiplex module 2406 may send a resize request to the encoder modules 2404 associated with the selected segments via the control channel. The resize request may specify a size, e.g., in bits, for the selected segment of data.

Encoder modules 2404 associated with the selected segments of data receive the resize requests associated with their respective segments of data, and resize the segments of multimedia data. Encoder modules 2404 may resize the segments of data in a number of different ways. Encoder modules 2404 associated with the selected segments of data may adjust one or more encoding variables to reduce the size of the segments of data to be less than or equal to the maximum size specified in the resize request. For example, encoder modules 2404 may re-encode the segments of data using a higher quantization parameter (QP). As another example, encoder modules 2404 may re-encode the segments of data a reduced encoding rate. Alternatively or additionally, encoder modules 2404 may reduce the amount of information that is to be encoded, thus reducing the size of the segments of data. In some cases, encoder modules 24040 may adjust one or more encoding variables to increase the size of the segments of data to be the size specified in the resize request. For example, encoder modules 2404 may re-encode the segments of data using a lower QP or re-encode the segments of data at an increased encoding rate.

Multiplex module 2406 collects the encoded segments of data when multiplex module 2406 is ready to generate the current superframe. Multiplex module 2406 may, for example, send transfer requests to encoder modules 2404 via the control channel. In response to the requests, encoder modules 2404 send the encoded segments of multimedia data to multiplex module 2406. Multiplex module 2406 combines the flows of multimedia data to form a superframe and sends the superframe to transmitter 2408 for transmission to one or more decoding devices via transmission channel 2402. In this manner, multiplex module 2406 manages bit allocation among the flows to most efficiently fit all the segments of data into the fixed bandwidth channel 2402 while preserving the highest overall quality of the plurality of flows of data.

The components in multimedia encoding device 2400 are exemplary of those applicable to implement the techniques described herein. Multimedia encoding device 2400, however, may include many other components, if desired. Moreover, the techniques of this disclosure are not necessarily limited to use in a system like that of FIG. 24, nor a broadcast system. The techniques may find application in any multimedia encoding environment in which encoding techniques are used to encode a plurality of flows of multimedia data for transmission over a transmission channel with limited bandwidth. The illustrated components of multimedia encoding device 2400 may be integrated as part of an encoder/decoder (CODEC). Transmitter 2408 may be formed on different components or chips than the encoders or CODECs.

The components in multimedia encoding device 2400 may be implemented as one or more processors, digital signal processors, application specific integrated circuits (ASICs), field programmable gate arrays (FPGAs), discrete logic, software, hardware, firmware, or any combinations thereof. Moreover, multimedia encoding device 2400 may comply with a multimedia coding standard such as Moving Picture Experts Group (MPEG-4), International Telecommunication Union Standardization Sector (ITU-T), e.g., H.263 or H.264, or another coding standard, or a combination thereof. In particular, each of encoder modules 2404 communicating with multiplex module 2406 may comply with a different multimedia coding standard by virtue of the fact that the quality and rate information used by multiplex module 2404 to arbitrate can be generated independently for each of encoder modules 2404.

Depiction of different features as modules is intended to highlight different functional aspects of multimedia encoding device 2400 and does not necessarily imply that such modules must be realized by separate hardware or software components. Rather, functionality associated with one or more modules may be, integrated within common or separate hardware or software components. Thus, the disclosure should not be limited to the example of multimedia encoding device 2400.

Figure 25:
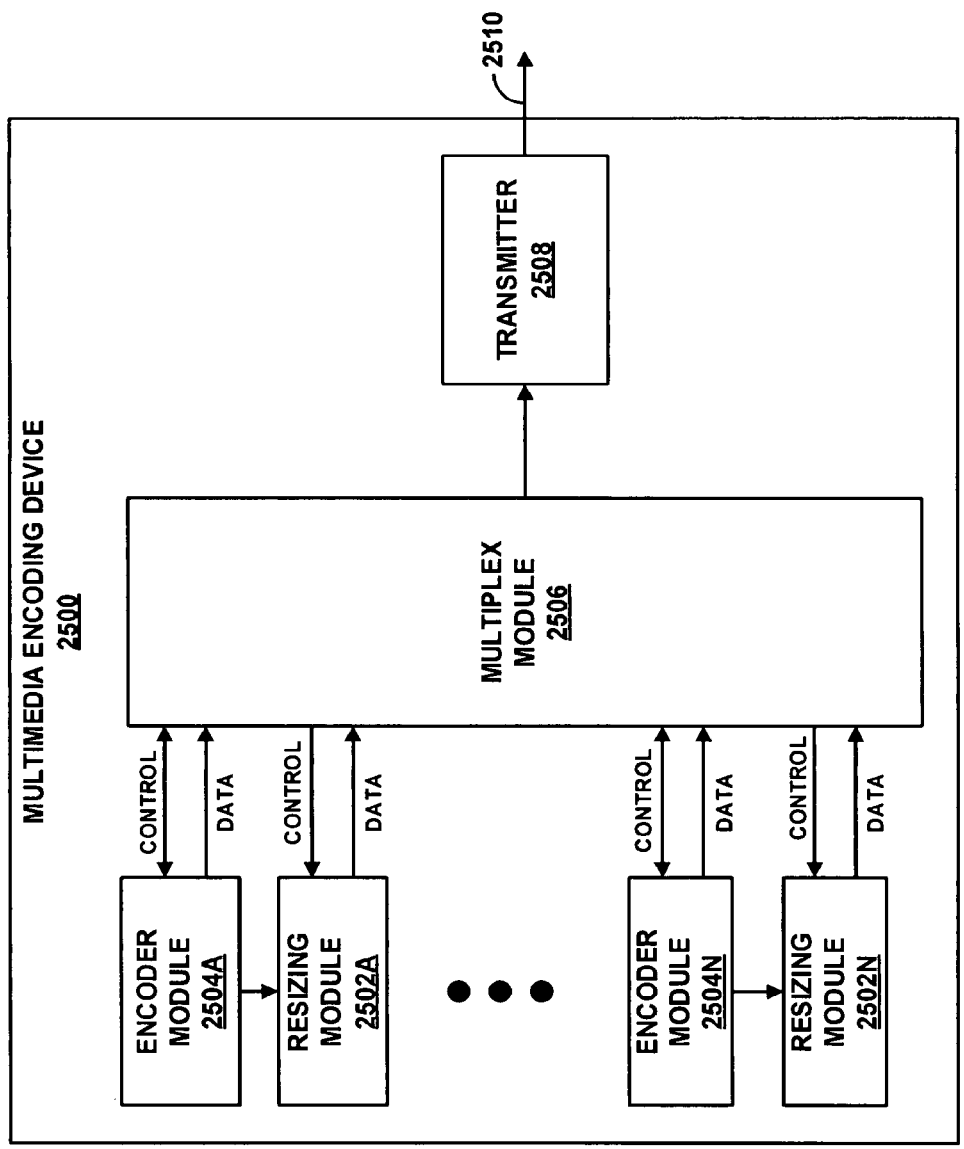
FIG. 25 is a block diagram illustrating an exemplary multimedia encoding device that encodes multimedia data in accordance with the techniques described herein.

FIG. 25 is a block diagram illustrating another exemplary multimedia encoding device 2500 that manages bit allocation among a plurality of flows in an attempt to most efficiently fit the flows within a superframe, while preserving the highest overall quality for the plurality of flows. Multimedia encoding device 2500 conforms substantially to multimedia encoding device 2400 of FIG. 24, but the resizing of selected segments of multimedia data is performed by resizing modules 2502A-2502N (collectively, "resizing modules 2502") associated with the selected segments of data.

Thus, the functionality of encoder modules 2404 of FIG. 24 is divided between encoder modules 2504 and resizing modules 2502. In other words, encoder modules 2504 provide multiplex module 2506 with quality and rate information associated with each of the segments of data for use in allocating the available bandwidth to the segments of data and selecting one or more of the segments of data to be resized when the allocation fails. Resizing modules 2502 receive requests from multiplex module 2506 to resize the segments of data and resize the segments of data in accordance with the resize request received from multiplex module 2506.

Figure 26:
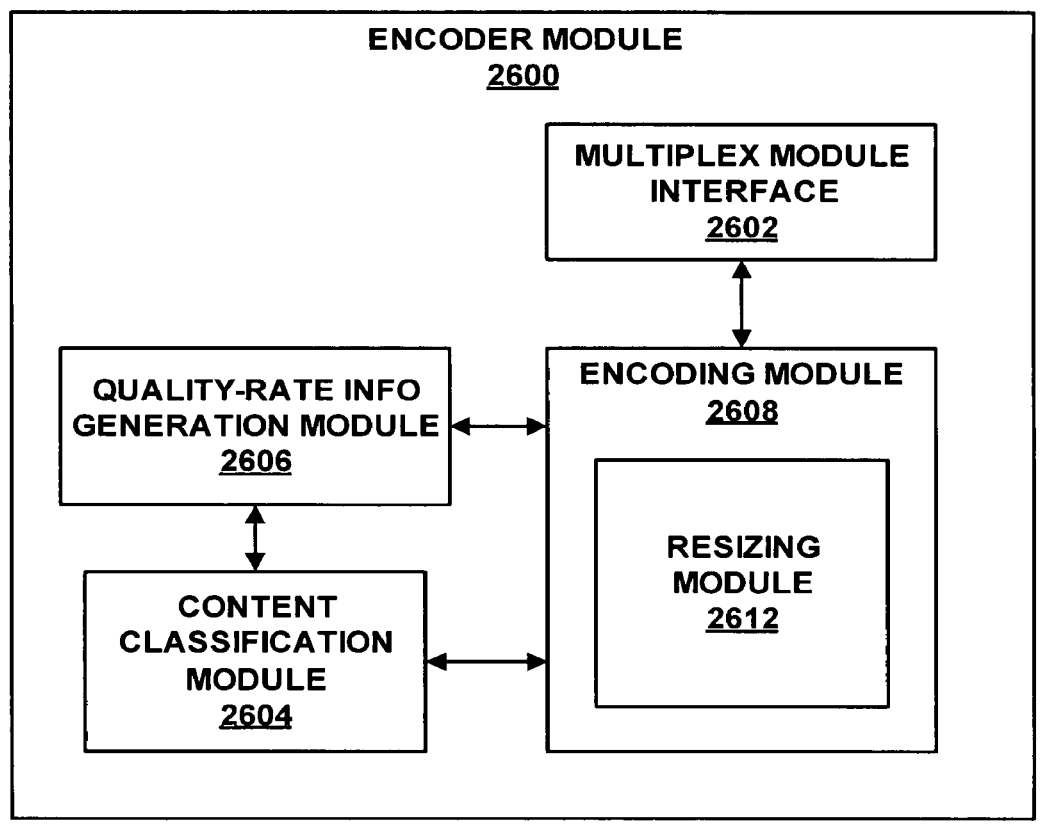
FIG. 26 is a block diagram illustrating an exemplary encoder module that functions in accordance with the techniques of this disclosure.

FIG. 26 is a block diagram illustrating an exemplary encoder module 2600 that functions in accordance with the techniques of this disclosure. Encoder module 2600 may, for example, represent any one of encoder modules 2404 of encoding device 2400 of FIG. 24. Encoder module 2600 includes a multiplex module interface 2602, a content classification module 2604, quality-rate information module 2606, and an encoding module 2602. Encoding module 2608 further includes a resizing module 2612. Resizing module 2612 may represent resize controller 116 of FIG. 1.

Encoder module 2600 receives one or more flows of multimedia data from a source. Encoder module 2600 may, for example, receive the flows of multimedia data from a memory or an image capture device coupled to encoder module 2600. The flows of multimedia data may comprise live real-time video, audio or video and audio flows to be coded and transmitted as a broadcast, or may comprise a pre-recorded and stored video, audio or video and audio flows to be coded and transmitted as a broadcast or on-demand. The techniques of this disclosure may also be applied to non-real time services or a combination of real-time services and non-real time services.

As described above, encoder module 2600 may attempt to maintain a constant perceived quality metric for the flows of data regardless of the content of the data. In other words, encoder module 2600 may attempt to output every flow of data at a target quality level. To maintain a constant or similar perceived quality level, encoder module 2600 may select different bit rates for segments of data with different content. To this end, content classification module 2604 classifies the segments of data based on their content. Content classification module 2604 may classify the segment of data based on the complexity (e.g., spatial complexity and/or temporal complexity) of the data of the segment. Suitable content classification methods are described in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein by reference. For example, content classification module 2604 may classify motion information into categories of "high," "medium," and "low" (on an x-axis) and classify texture information into categories of "high," "medium," and "low," (on a y-axis) and the content classification is indicated at the point of intersection. This classification may be associated, for example, with a particular quality-rate curve.

Content classification module 2604 associates the segments of data with quality and rate information based on the classifications. In one aspect, content classification module 2604 associates the segments of data with respective quality-rate curves. The quality-rate curves model a quality metric, such as peak signal to noise ratio (PSNR), as a function of a bit rate. The quality-rate curves may, for example, be modeled using a logarithmic function of the form:

$$Q=a*\ln(R)+b,$$

where Q is the quality metric, R is the bit rate, and a and b are constants computed using a number of sample data points. Encoder module 2600 may maintain a plurality of quality-rate curves that represent quality-rate characteristics for flows of data with varying content. As an example, encoder module 2600 may maintain quality-rate curves for eight different classes associated with varying levels of motion and texture in the content of the flows, e.g., varying levels of motion and texture. To account for the fact that constant PSNR does not necessarily mean constant perceived quality, encoder module 2600 may maintain quality-rate curves that use a quality metric other than PSNR, such as mean opinion scores (MOS). Alternatively, encoder module 2600 may adjust the quality-rate curves to account for the fact that constant PSNR does not necessarily mean constant perceived quality. For example, encoder module 2600 may adjust traditional quality-rate curves by an offset as described in detail in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated herein be reference.

Alternatively, encoder module 2600 may adjust the target quality level associated with each content curve by an offset. Segments of data that include high motion, high texture content may, for example, be encoded at a slightly lower quality with respect to the target quality level, whereas segments of data that include low motion, low texture content may be encoded at slightly higher quality with respect to the target quality level. Because each content class has its own adjusted quality level relative to the overall target quality level, encoder module 2600 may normalize the quality level for each content class to measure the current quality level at encoder module 2600. Encoder module 2600 may achieve this normalization according to the linear equation below:

$$Q_{norm}=Q_r-Q_k, \quad (5)$$

where $Q_{norm}$ is the normalized quality level, $Q_r$ is the recorded quality level, and $Q_k$ is the adjustment offset in quality level for curve k. If quality normalization is not a linear function, rank determination must be done after quality normalization.

In another aspect of this disclosure, content classification module 2604 may associate the segments of data with pre-computed quality-rate tables that indicate one or more quality levels associated with the segments and sizes of the segment at each of the quality levels. To do so, content classification module 2604 may associate the segment of data with a quality-rate curve, which corresponds to a particular one of the quality-rate tables. The quality-rate curves, the adjusted quality-rate curves, and pre-computed quality-rate tables may be maintained within a memory (not shown), and accessed by content classification module 2604 when needed.

In some cases, encoder module 2600 does not store pre-computed quality-rate information or only pre-computes a portion of the quality-rate information. Quality-rate information generation module 2606 may, for example, pre-compute a plurality of quality-rate curves or adjusted quality-rate curves for use in content classification. One exemplary technique for generating quality-rate curve and content classification curves is described in co-pending and commonly assigned U.S. patent application Ser. No. 11/373,577, entitled "CONTENT CLASSIFICATION FOR MULTIMEDIA PROCESSING" and filed on Mar. 10, 2006, the entire content of which is incorporated by reference.

Quality-rate information generation module 2606 may, however, generate the quality-rate tables for each of the segments of data on a segment by segment basis based on the classification. For example, quality-rate information generation module 2606 may generate a table that lists rank and size pairs. The ranks correspond with particular quality levels. Each rank may, for example, correspond with a particular drop in the quality metric. Using PSNR as an exemplary quality metric, each of the ranks may correspond to a 0.05 dB drop in PSNR. In particular, a rank of 0 may correspond to a best effort quality level, while a rank of 1 corresponds with a highest quality level, a rank of 2 corresponds with a quality level that is 0.05 dB lower than the previous quality level and so on. In one aspect, ranks corresponding with the highest qualities (e.g., ranks 1, 2 and 3) may in fact correspond to quality levels that are greater than the target quality level.

Quality-rate information generation module 2606 may determine the ranks using a corresponding one of the quality-rate curves, as described in further detail below. In one aspect, quality-rate information generation module 2606 may compute a plurality of quality levels and corresponding ranks and determine the size of each segment of data at each of the quality levels using a corresponding quality-rate curve. In another aspect of this disclosure, quality-rate information generation module 2606 may compute sizes of the segments of data that encoder module 2600 can provide, and then compute a quality level and corresponding rank at each of those sizes. For example, encoder module 2600 may incrementally reduce the size by fixed amounts, e.g., the minimum transmission unit size of the transmission channel, and compute the rank corresponding to each of the desired sizes using the equation:

$$\text{Rank}=\text{CEILING}((A_k-S)/x_k), \quad (6)$$

where RANK is the corresponding rank value for the desired size, $A_k$ is an adjusted target quality level for the $k^{th}$ quality-rate curve, S is the quality level corresponding to the desired size (i.e., quality level corresponding to the intersection of the desired size and the $k^{th}$ quality-rate curve), $x_k$ is the incremental quality drop per rank, and CEILING(x) is a ceiling function that outputs the smallest integer value that is greater than or equal to x.

Encoder module 2600 sends at least the quality and rate information associated with each of the segments of data to multiplex module (2406, 2506) to assist multiplex module (2406, 2506) in monitoring the size of a current superframe and determining which of the segments of data to resize. Encoder module 2600 may, for example, send the quality and rate information associated with the segments of data to be included in the current superframe. Encoder module 2600 may send at least the quality and rate information to multiplex module (2406, 2506) in response to a request from multiplex module (2406, 2506). Encoder module 2600 may, for example, send a quality-rate curve or quality-rate table associated with the segment of data.

If any of the segments of data associated with encoder module 2600 need to be resized, multiplex module (2406, 2506) sends a resize request to encoder module 2600. In response to the resize request, resizing module 2612 resizes the segment of multimedia data. In one example, resizing module 2612 may increase the size of the segment of data, i.e., upsize the segment of data. In another example, resizing module 2612 reduces the size of the segment of data, i.e., downsizes the segment of data. The downsizing of the segment of data may cause the quality level of the segment of data to fall below the target quality level. If, however, the quality level of the resized segment of data falls below a minimum quality level, resizing module 2612 may only resize the segment of data to a size that is greater than or equal to the minimum quality level. The resize request from multiplex module (2406, 2506) may include a size, e.g., a maximum size, for the segment of data, and resizing module 2612 may adjust one or more encoding variables to achieve the size specified in the re-encode request. Resizing module 2612 may, for example, re-encode the segment of data at an adjusted bit rate to resize the segment of data, e.g., re-encode the segment of data at a reduced bit rate to resize the segment of data to be less than or equal to the maximum size specified in the resize request. As another example, resizing module 2612 may re-encode the segment of data using an adjusted quantization parameter.

Encoder module 2600 receives a request from multiplex module (2406, 2506) to send the encoded segments of data to be included within the current superframe. In response to the request from multiplex module (2406, 2506), encoder module 2600 sends the encoded segments of data to multiplex module (2406, 2506). As described above, encoder module 2600 sends the segments of data that were not selected for resizing at the configured target quality. Encoder module 2600, however, sends the segments of data that were selected for resizing at the reduced quality.

The components in encoder module 2600 are exemplary of those applicable to implement the techniques described herein. Encoder module 2600, however, may include many other components, if desired. The components in encoder module 2600 may be implemented as one or more processors, digital signal processors, ASICs, FPGAs, discrete logic, software, hardware, firmware, or any combinations thereof. Moreover, encoder module 2600 may comply with a multimedia coding standard such as MPEG-4, ITU-T H.263, ITU-T H.264, or another coding standard. Depiction of different features as modules is intended to highlight different functional aspects of encoder module 2600 and does not necessarily imply that such modules must be realized by separate hardware or software components. Rather, functionality associated with one or more modules may be integrated within common or separate hardware or software components. Thus, the disclosure should not be limited to the example of encoder module 2600.

Figure 27:
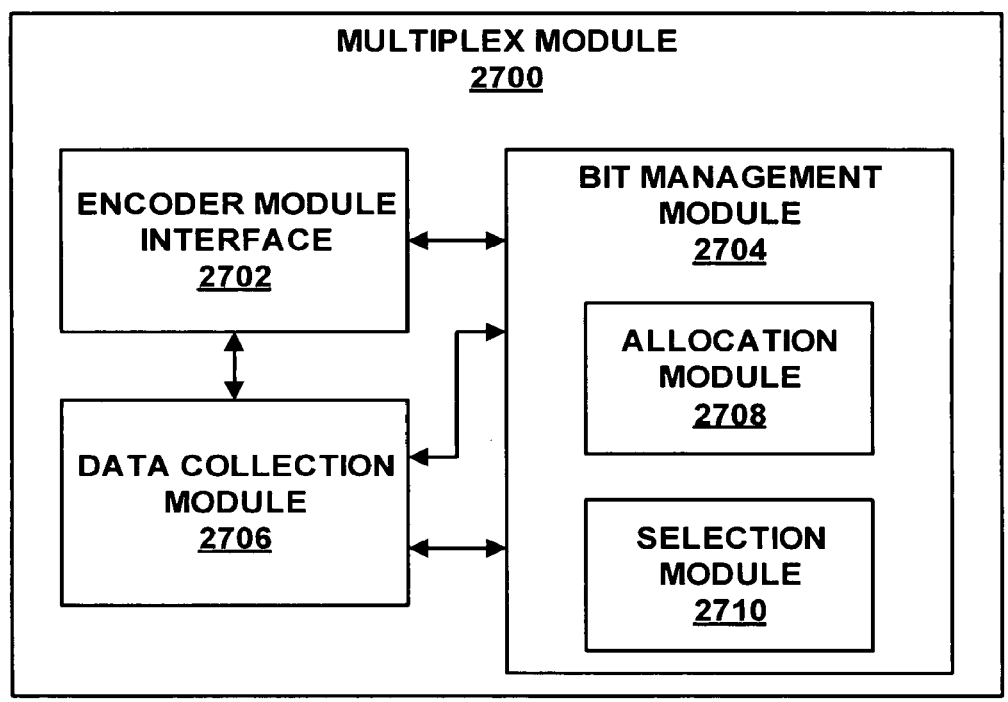
FIG. 27 is a block diagram illustrating an exemplary multiplex module that manages bit allocation in accordance with the techniques of this disclosure.

FIG. 27 is a block diagram illustrating an exemplary multiplex module 2700 that manages bit allocation in accordance with the techniques of this disclosure. In particular, multiplex module 2700 receives a plurality of segments of data from respective encoder modules, such as encoder modules 2404 (FIG. 24), and requests resizing of one or more of the segments of data to ensure that the air-link resources necessary to send the segments of data does not exceed the available air-link resources. Multiplex module 2700 may, for example, represent multiplex module 2406 of FIG. 24 or multiplex module 2506 of FIG. 25. Multiplex module 2700 includes an encoder module interface 2702, a data collection module 2086, and a bit management module 2704. Bit management module 2704 further includes an allocation module 2708 that allocates the available bandwidth and a selection module 2710 that determines which of the segments of data to resize when the bandwidth allocation is unsuccessful.

As described above, multiplex module 2700 receives encoded segments of data from encoder modules 2404 via encoder module interface 2702, combines the encoded segments of data into a superframe, and transmits the superframe to one or more decoding devices, such as mobile device 102 of FIG. 1. Although the techniques of this disclosure are described in the context of one-second superframes of data, the techniques may also be utilized for transmitting other segments of data, such as for segments of data received over a different period of time or for individual frames of data.

Bit management module 2704 monitors the size of each of the generated superframes to ensure that the transmission channel resources (e.g., air-link resources) necessary to send the superframes does not exceed the available transmission channel resources over transmission channel 2402. To assist bit management module 2704 in monitoring the sizes of the superframes, data collection module 2706 collects quality and rate information from each of encoder modules 2704. Data collection module 2706 may, for example, send a request to each of encoder modules 2404 requesting delivery requirements, such as quality and rate information, associated with each segment of data encoder modules 2404 desire to include in the current superframe. The quality and rate information indicates at least a quality metric for the segment of data as a function of a bit rate or data size. For example, data collection module 2706 may receive quality-rate curves corresponding to the segments that model a quality metric, such as PSNR, as a function of a bit rate for the respective segments of data. In another example, data collection module 2706 receives quality-rate tables associated with the segments of data. As described above, the quality-rate tables may indicate various ranks (or quality levels) and sizes associated with each of the different ranks. Thus, the quality and rate information describes, among other things, the size of the segment of data at different quality levels for segments of data that encoder modules 2404 desires to transmit in the current superframe.

Bit management module 2704 analyzes at least the quality and rate information to determine whether the plurality of segments of data fit within the available bandwidth of transmission channel 2402. Bit management module 2704 may analyze other delivery requirements in addition to the quality and rate information. For example, bit management module 2704 may analyze priority and latency requirements associated with ORT services. Bit management module 2704 may include an allocation module 2708 that attempts to allocate the available bandwidth among the segments of data. Allocation module 2708 may, for example, attempt to allocate the available bandwidth using one of the allocation algorithms described above. In its first attempt to allocate the available bandwidth, allocation module 2708 may attempt to allocate the bandwidth using sizes corresponding to an intersection between a target quality level and respective quality-rate curves associated with the segments of data. As another example, multiplex module 2406 may make an initial determination as to whether the segments of data will fit within the current superframe using sizes corresponding to a highest quality level specified in quality-rate tables associated with the segments of data. If allocation module 2708 is successful in allocating the bandwidth among the segments of data, e.g., there are sufficient transmission channel resources and no excess transmission channel resources to send the segments of data, no resizing is necessary.

If, however, allocation module 2708 fails to successfully allocate the available bandwidth using the size information associated with the target quality level or best quality level, bit management module 2704 selects one or more of the segments of data to be resized. For example, bit management module 2704 may select one or more of the segments of data to be resized when there are insufficient transmission channel resources. As another example, bit management module 2704 may select one or more of the segments of data to be resized when the amount of excess transmission channel resources exceeds a threshold. In particular, bit management module 2704 includes a selection module 2710 that analyzes at least the quality and rate information received from encoder modules 2404 to select one or more segments of data for resizing. In cases in which selection module 2710 selects one or more segments of data for downsizing, selection module 2710 may select the one or more segments of data that have a least amount of impact in quality at the corresponding reduced sizes based on the analysis. The quality of a segment of data ($Q_v$) is a function of the bit rate (r) allocated to the segment of data and is given by the following quality function:

$$Q_v = k \ln(r),$$

where k is a constant specific to the multimedia segment, and provided by encoder modules 2404.

Selection module 2710 attempts to maximize the overall quality of all the segments of data according to the optimization problem formulated below.

$$\text{Maximize} \left\{ Q_{Total} = \sum_{i=1}^{n} Q_{Vi} = \sum_{i=1}^{n} k_i \ln(r_i) \right\}$$

$$\text{Given} \sum_{i=1}^{n} r_i = R \text{ and} \quad (7)$$

$$Q_{V_i} / Q_{V_{i+1}} = w_i / w_{i+1} \text{ for } i = 1 \ldots (n-1) \text{ and}$$

$$Q_{V_i} \geq Q_{V-min_i} \quad \text{for } i = 1 \ldots n$$

where n is a total number of segments of data, $Q_{Total}$ is an overall quality of all the segments of data, $k_i$ is a constant associated with the $i^{th}$ segment of data, $r_i$ is a bit rate associated with the $i^{th}$ segment of data, R is a total available bandwidth, $Q_{vi}$, is the quality associated with $i^{th}$ segment of data, $Q_{V-min_i}$ is a minimum quality associated with the $i^{th}$ segment of data, and $w_i$ is a priority associated with the $i^{th}$ segment of data.

Selection module 2710 assigns bit rates, and thus sizes, to the segments of data in such a way that the resultant qualities associated with the segment of data are proportional to their assigned priorities, if any. The above optimization problem can be solved by using Lagrange multiplier method and Kuhn Tucker Conditions. Converting the optimization problem into standard form (maximization and constraint) we get following:

$$\text{Maximize} \left\{ Q_{Total} = \sum_{i=1}^{n} Q_{Vi} = \sum_{i=1}^{n} k_i \ln(r_i) \right\}$$

$$\text{Given} \sum_{i=1}^{n} r_i = R \text{ and} \quad (8)$$

$$Q_{V_i} / Q_{V_{i+1}} = w_i / w_{i+1} \text{ for } i = 1 \ldots (n-1) \text{ and}$$

$$-Q_{V_i} \leq -Q_{V-min_i} \quad \text{for } i = 1 \ldots n$$

The Lagrangian Function is defined as follows:

$$F(r_i, \lambda_i, \mu_i) = \sum_{i=1}^{n} Q_{V_i} - \delta \left( \sum_{i=1}^{n} r_i - R \right) - \sum_{i=1}^{n-1} \lambda_i (Q_{V_i} w_{i+1} - Q_{V_{i+1}} w_i) - \quad (9)$$

$$\sum_{i=1}^{n} \mu_i (-Q_{V_i} + Q_{V-min_i})$$

$$= \sum_{i=1}^{n} (k_i \ln(r_i)) - \delta \left( \sum_{i=1}^{n} r_i - R \right) -$$

$$\sum_{i=1}^{n-1} \lambda_i (w_{i+1} k_i \ln(r_i) - w_i k_{i+1} \ln(r_{i+1})) +$$

$$\sum_{i=1}^{n} \mu_i ((k_i \ln(r_i)) - Q_{V-min_i})$$

where $\delta$, $\lambda_i$ for i=1 ... (n−1) and $\mu_i$ for i=1 ... n are Lagrange multipliers.

The following are the set of Kuhn Tucker Conditions:

$$\frac{dF}{dr_i} = \frac{k_i}{r_i} - \delta - \lambda_i \left( \frac{w_{i+1} k_i}{r_i} \right) + \mu_i \left( \frac{k_i}{r_i} \right) = 0 \quad i = 1 \quad (10)$$

$$\frac{dF}{dr_i} = \frac{k_i}{r_i} - \delta - \lambda_{i-1} \left( \frac{-w_{i-1} k_i}{r_i} \right) - \lambda_i \left( \frac{w_{i+1} k_i}{r_i} \right) + \mu_i \left( \frac{k_i}{r_i} \right) = 0$$

$$2 \leq i \leq (n-1)$$

$$\frac{dF}{dr_i} = \frac{k_i}{r_i} - \delta - \lambda_{i-1} \left( \frac{-w_{i-1} k_i}{r_i} \right) + \mu_i \left( \frac{k_i}{r_i} \right) = 0 \quad i = n$$

$$\frac{dF}{d\delta} = \sum_{i=1}^{n} r_i - R = 0 \quad (11)$$

$$\frac{dF}{d\lambda_i} = w_{i+1} k_i \ln(r_i) - w_i k_{i+1} \ln(r_{i+1}) = 0 \quad 1 \leq i \leq (n-1) \quad (12)$$

$$\mu_i (k_i \ln(r_i) - Q_{V-min_i}) = 0 \quad 1 \leq i \leq n \quad (13)$$

$$-k_i \ln(r_i) \leq -Q_{V-min_i} \quad 1 \leq i \leq n \quad (14)$$

$$\mu_i \geq 0 \quad 1 \leq i \leq n \quad (15)$$

A desirable assignment of bit rates to real time video flows should satisfy equations (10)-(15). Selection module 2710 may solve these set of equations using any of the standard nonlinear programming techniques.

Below is an example scheduling of rates for two segments of data (i.e., n=2) and following parameter values:

$Q_{V_1} = 5 \ln(r1) =$
$Q_{V_2} 8 \ln(r2)$
$Q_{v-min_1} = 25$
$Q_{v-min_2} = 25$
R=5000 kpbs
$w_1 = W_2 = 1$ Based on the parameters above, selection module 2710 would assign a bit rate of 4800 kbps to the first multimedia segment and a bit rate of 200 kbps to the second multimedia segment. In the case of one-second segments of data, the maximum size of the first segment of data is 4800 kilobits and the maximum size of the second segment of data is 200 kilobits. Selection module 2710 compares the estimated sizes of the segments of data indicated in the quality and rate information with the computed maximum sizes and selects any of the segments of data that exceeds its associated maximum size as a segment to be resized.

In another example, multiplex module 14 may select the one or more segments of data to be resized using the quality-rate tables received from encoder modules 2404. As described above, during the initial bandwidth allocation, allocation module 2708 attempts to allocate the bandwidth using the size information corresponding to the ranking associated with the highest quality level. When allocation of bandwidth to the segments of data at the sizes of the selected rankings is unsuccessful, selection module 2710 selects a combination of rankings for the segments of data that has the next highest overall quality. TABLE 1 below illustrates a portion of the quality-rate tables corresponding to four segments of data associated with flows 1-4. In particular, TABLE 1 illustrates a current rank value, a size of the segment of data at the current rank, a next rank value, and a size of the segment of data at the next rank for four segments of data associated with flows 1-4. Reference to TABLE 1 will be used to aid in illustration of the selection process of selection module 2710.

TABLE 1

|  | Flow 1 | Flow 2 | Flow 3 | Flow 4 |
| --- | --- | --- | --- | --- |
| Current Rank | 3 | 3 | 4 | 6 |
| Size in Bytes of Current Rank | 40,000 | 50,000 | 45,000 | 20,000 |
| Next Rank | 5 | 6 | 5 | 8 |
| Size in Bytes of Next Rank | 30,000 | 40,000 | 40,000 | 15,000 |

Selection module 2710 analyzes the quality-rate tables to identify one or more of the segments of data that have a next ranking associated with a highest quality level. In the case illustrated in TABLE 1, a next ranking having the smallest value corresponds with the highest quality level. With reference to TABLE 1, selection module 2710 identifies segments associated with flow 1 and flow 3 as having the smallest next ranking. As illustrated in TABLE 1, the segments of data associated with flow 1 and flow 3 both have next ranking values of 5, while the segments of data associated with flow 2 and flow 4 have next ranking values of 6 and 8, respectively, which corresponds to worse quality levels. In this manner, selection module 2710 analyzes the quality-rate tables to identify one or more segments of data with subsequent quality levels corresponding to a next best quality level.

Selection module 2710 selects at least one of the identified segments of data to resize. Of the identified segments of data, selection module 2710 may select the identified segment of data with the largest size associated with the current rank. With reference to TABLE 1, selection module 2710 selects the segment of data associated with flow 3 because its current size is 45,000 bytes as opposed to 40,000 bytes. Alternatively, selection module 2710 may select the identified segment of data that has a largest difference between the size of the segment at the current rank and the size of the segment at the next rank. Again with reference to TABLE 1, selection module 2710 selects the segment of data associated with flow 1, which has a difference of 10,000 bytes as opposed to the difference of 5,000 bytes for the segment associated with flow 3.

After selection module 2710 selects one or more of the segments of data, allocation module 2708 attempts to allocate the available bandwidth using the sizes associated with the reduced rankings or qualities for the selected segments of data. If the allocation algorithm is still unsuccessful, selection module 2710 selects additional segments of data to be resized or the same segments to be resized at an even more reduced quality.

After allocation module 2708 successfully allocates the available bandwidth among the segments of data, bit management module 2704 requests resizing of each of the selected segments of data to ensure that all the segments of data fit within the available bandwidth of the transmission channel. Bit management module 2704 may, for example, send resize requests to the encoder modules 2404 associated with the selected segments of multimedia data. Bit management module 2704 may specify a maximum acceptable size of the segment of data. Encoder modules 2404 re-encode the data based on the information contained in the resize request as described in detail above.

Allocation module 2708 and selection module 2710 may perform bit allocation for the segments of data and select one or more segments of data to be upsized in a similar manner. For example, using quality-rate tables associated with the selected segments of data, allocation module may initially attempt to allocate the bandwidth using the size information corresponding to the ranking associated with the target quality level. When allocation of bandwidth to the segments of data at the sizes corresponding to the target quality level is unsuccessful, i.e., in this case, the amount of excess bandwidth exceeds a threshold, selection module 2710 selects a new combination of rankings for the segments of data that has a better overall quality.

In particular, selection module 2710 may analyze the quality-rate tables to identify one or more of the segments of data that have a next highest ranking associated with a next highest quality level. Selection module 2710 selects at least one of the identified segments of data to upsize. Of the identified segments of data, selection module 2710 may select the identified segment of data with the smallest size corresponding to the current rank. Alternatively, selection module 2710 may select the identified segment of data that has a smallest difference between the size of the segment at the current rank and the size of the segment at the next highest rank.

In either case, data collection module 2706 sends out a data request when it is ready to combine the segments of data into a superframe. Data collection module 2706 receives encoded segments of data in response to the commands. Multiplex module 2700 assembles the superframe by combining the encoded segments of multimedia data. Multiplex module 2700 may then provide the superframe to transmitter 2408 (FIG. 24) for transmission or buffer the superframe until transmitter 2408 requests the superframe.

The components in multimedia multiplex module 2700 are exemplary of those applicable to implement the techniques described herein. Multiplex module 2700, however, may include many other components, if desired. The components in multiplex module 2700 may be implemented as one or more processors, digital signal processors, ASICs, FPGAs, discrete logic, software, hardware, firmware, or any combinations thereof. Moreover, multiplex module 2700 may comply with a multimedia coding standard such as MPEG-4, ITU-T H.263, ITU-T H.264, or another coding standard. Depiction of different features as modules is intended to highlight different functional aspects of multiplex module 2700 and does not necessarily imply that such modules must be realized by separate hardware or software components. Rather, functionality associated with one or more modules may be integrated within common or separate hardware or software components. Thus, the disclosure should not be limited to the example of multiplex module 2700.

Figure 28:
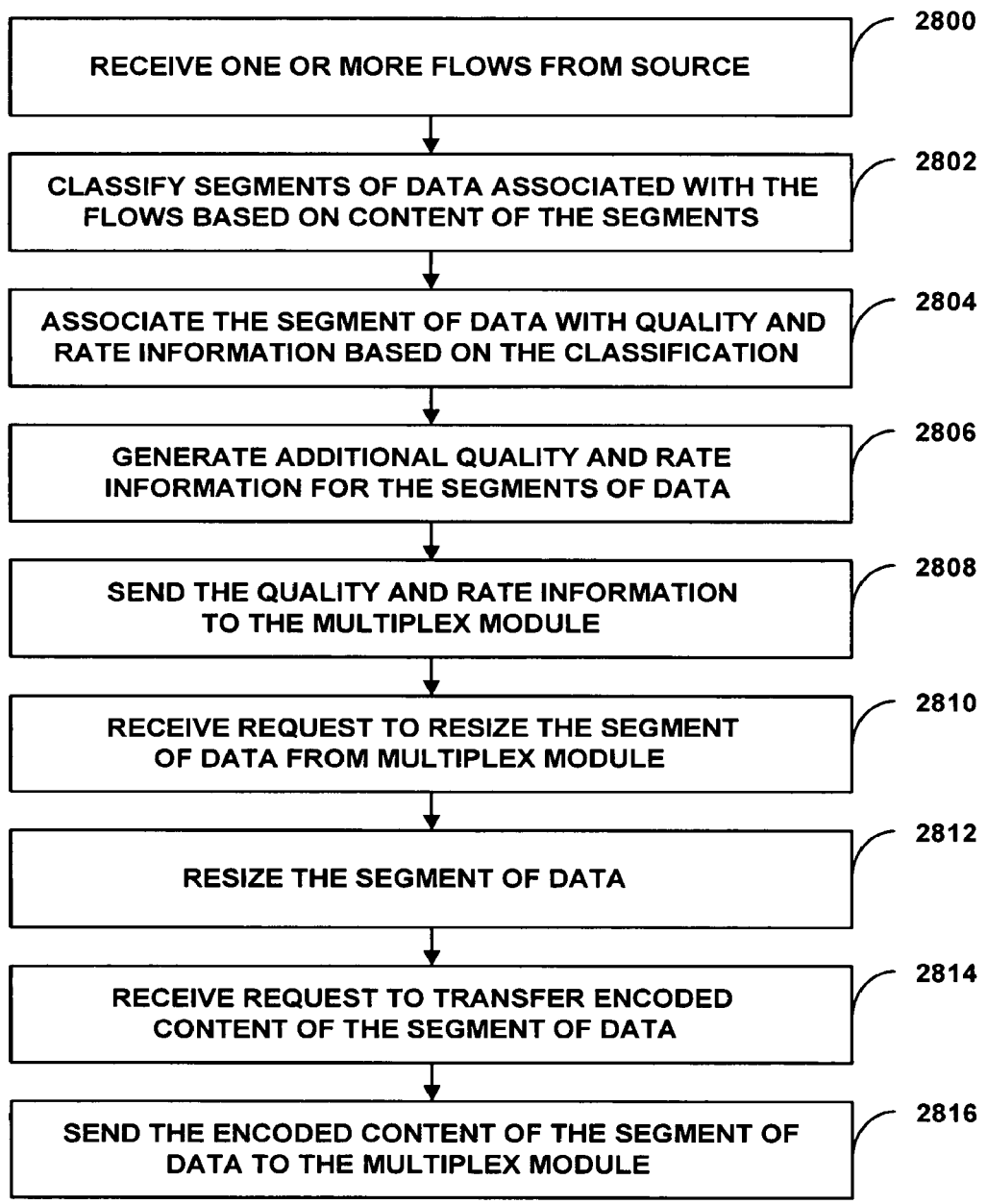
FIG. 28 is a flow diagram illustrating exemplary operation of an encoder module encoding multimedia data in accordance with the techniques of this disclosure.

FIG. 28 is a flow diagram illustrating exemplary operation of an encoder module, such as encoder module 2600 of FIG. 26, encoding multimedia data in accordance with the techniques of this disclosure. Encoder module 2600 receives one or more flows of multimedia data from a source (2800). Encoder module 2600 may, for example, receive the flows of multimedia data from a memory or an image capture device coupled to encoder modules 2404. The flows of multimedia data may comprise live real-time content, non real-time content, or a combination of real-time content and non real-time content.

Encoder module 2600 classifies the segments of data based on their content (2802). Content classification module 2604

(FIG. 26) may, for example, classify the received segments of data based on the complexity (e.g., spatial complexity and/or temporal complexity) of the data of the segment.

Content classification module 2604 associates the segments of data with quality and rate information based on the classification (2804). As an example, content classification module 2604 may associate the segments of data with one of a plurality of quality-rate curves. As described above, the quality-rate curves may be pre-computed and stored in a memory. As another example, content classification module 2604 may associate the segments of data with one of a plurality of pre-computed quality-rate tables.

Encoder module 2600 may generate additional quality and rate information for the segments of data (2806). For example, quality and rate information generation module 2606 may generate quality-rate tables for each of the segments of data. As describe above, the quality-rate tables indicate one or more quality levels associated with the segments of data and sizes of the segment of data at each of the quality levels. As an example, quality and rate information generation module 2606 may generate a table that lists rank and size pairs using the quality-rate curves associated with the segments of data.

Encoder module 2600 sends the quality and rate information associated with the segment of data to a multiplex module (2808). Encoder module 2600 may, for example, send the quality and rate information associated with the segment of data in response to a request from the multiplex module. Encoder module 2600 may, for example, send a quality-rate curve and/or a quality-rate table associated with the segment of data. As described in detail above, the multiplex module uses the quality and rate information to monitor the size of a current superframe and to assist the multiplex module in determining which of the segments of data need to be resized.

If any of the segments of data associated with encoder module 2600 need to be resized, encoder module 2600 receives a resize request from the multiplex module (2810). The resize request from the multiplex module may include a size, e.g., a maximum size in bits, for the segment of data. In response to the resize request, resizing module 2612 resizes the encoded segment of data to meet the size limitation specified in the resize request (2812). In one aspect of this disclosure resizing module 2612 adjusts one or more encoding variables to reduce the size of the segment of data. Resizing module 2612 may, for example, re-encode the segment of data at a reduced bit rate or using an adjusted, e.g., higher, quantization parameter. Alternatively or additionally, resizing module 2612 may adjust the amount of information to be encoded. For example, resizing module 2612 may reduce the number of bits used for encoding motion information to reduce the size of the segment of data. In another aspect of this disclosure, resizing module 2612 may adjust one or more encoding variables to increase the size of the segment of data. Resizing module 2612 may, for example, re-encode the segment of data at an increased bit rate or using a lower quantization parameter.

Encoder module 2600 receives a request from the multiplex module to send the encoded content of the segments of data to be included within the current superframe (2814). In response to the request from the multiplex module, encoder module 2600 sends the encoded content of the segment of data to multiplex module (2816). As described above, encoder module 2600 sends segments of data that were not selected for resizing at the original size and sends segments of data that were selected for resizing at the reduced size.

Figure 29:
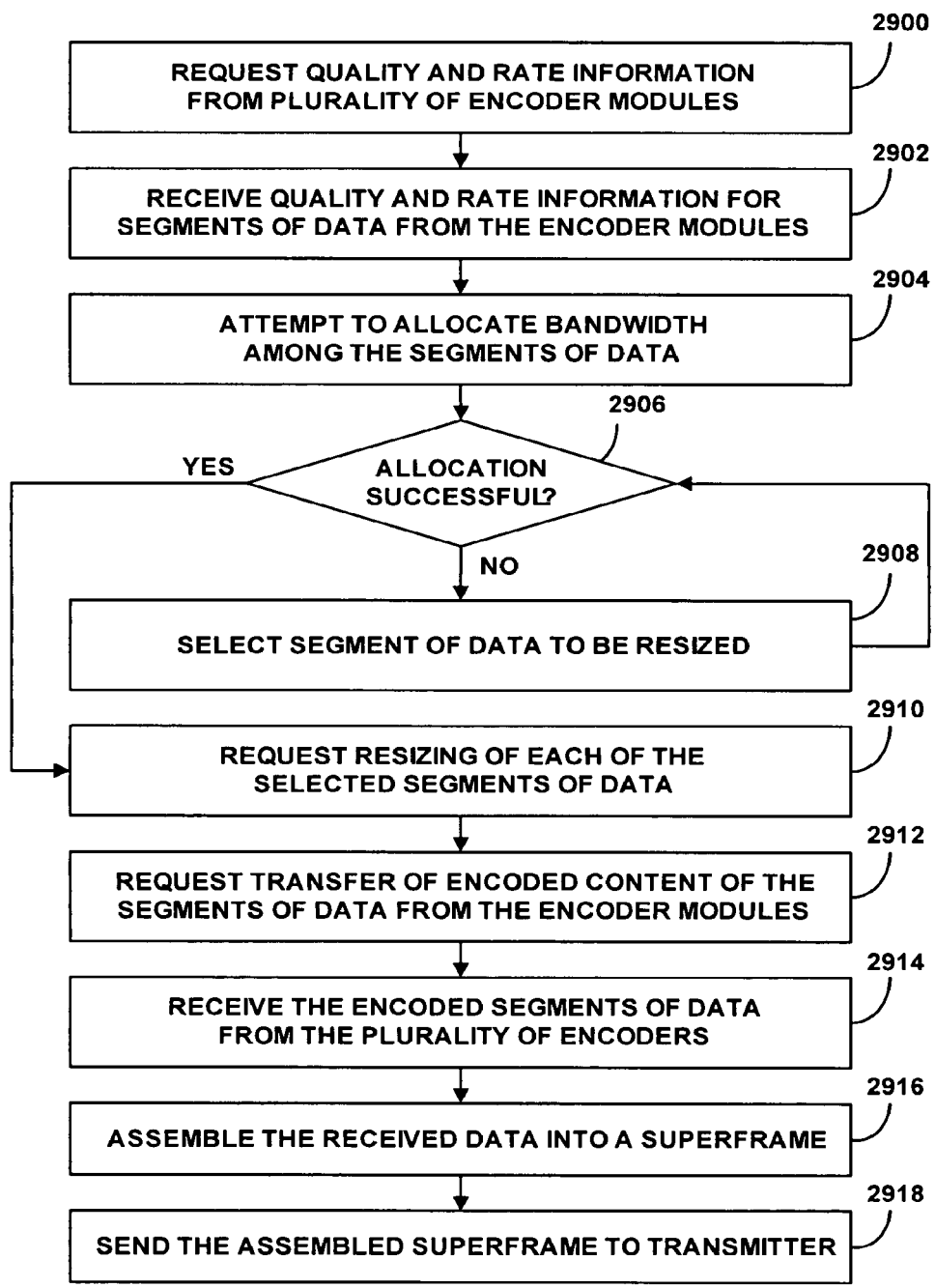
FIG. 29 is a flow diagram of exemplary operation of a multiplex module that manages bit allocation in accordance with the techniques of this disclosure.

FIG. 29 is a flow diagram of exemplary operation of multiplex module 2800 that manages bit allocation in accordance with the techniques of this disclosure. Data collection module 2806 requests at least quality and rate information from each of encoder modules 2404 (2900). Data collection module 2806 may request other delivery requirement information from encoder modules 2404 in addition to the quality and rate information. Additionally, data collection module 2806 may request one or more delivery requirements associated with ORT services which multiplex module 2800 will include within the current superframe. Data collection module 2806 receives at least quality and rate information associated with the segments of data that each of encoder modules 2404 desires to include in the current superframe (2902). As described above, the quality and rate information indicates, among other things, a quality metric for the segments of data as a function of a bit rate or data size. The quality and rate information may include, for example, quality-rate curves associated with the segments of data or quality-rate tables associated with the segments of data. As described above, data collection module 2806 may also receive delivery requirements other that quality and rate information for the segments of data as well as one or more delivery requirements associated with ORT services.

Allocation module 2808 attempts to allocate the available bandwidth among the segments of data (2904). Allocation module 2808 may, for example, attempt to allocate the available bandwidth using one of the allocation algorithms described above. In its first attempt to allocate the available bandwidth, allocation module 2808 may attempt to allocate the bandwidth using the sizes associated with a best desired quality of the segments of data. If the quality rate information comprises quality-rate tables, for example, allocation module 2808 attempts to allocate the bandwidth using the sizes associated with a rank value of 1. If the quality and rate information comprises quality-rate curves, allocation module 2808 may attempt to allocate the bandwidth using sizes corresponding to the intersection of the target quality level with each of the quality-rate curves. Allocation module 2808 may additionally allocate the available bandwidth between the segments of data and ORT services as described in detail above.

Allocation module 2808 determines whether the allocation of the available bandwidth is successful (2906). If allocation module 2808 does not successfully allocate the bandwidth, selection module 2810 selects at least one of the segments of data to be resized based on the quality and rate information associated with the segments of data (2908). In one aspect, selection module 2810 may select one or more segments of data to be downsized when there is not enough bandwidth to transmit the service. In particular, selection module 2810 selects the one or more segments of data that have a least amount of impact in quality at the corresponding reduced sizes. For example, selection module 2810 may identify one or more segments of data that have next ranks corresponding to a next best quality level. If two or more segments of data have the same next rank, selection module 2810 may select the identified the segment of data with the largest size associated with the current rank. Alternatively, selection module 2810 may select the identified segment of data with the largest difference between the size of the segment at the current rank and the size of the segment at the next rank. In another aspect, selection module 2810 may select one or more segments of data to be upsized when the amount of excess available bandwidth exceeds a threshold. In some cases, selection module 2810 may also select one or more ORT services to be resized.

Allocation module 2808 re-attempts to allocate the available bandwidth using the reduced sizes of the selected segments of data. If the allocation algorithm is still unsuccessful, selection module 2810 selects additional segments of data to be resized or the same segments to be resized at an even further reduced quality.

After allocation module 2808 successfully allocates the available bandwidth among the segments of data, multiplex module 2800 requests resizing of each of the selected segments of data to achieve the available bandwidth for the plurality of segments (2910). Multiplex module 2800 may, for example, send resize requests to each of encoder modules 2404 associated with the selected segments of data. The resize requests may specify a maximum acceptable size of the segment of data or a reduced bit rate. Encoder modules 2404 resize the data based on the information contained in the resize request as described in detail above.

Data collection module 2806 requests transfer of encoded content of the segments of data from encoder modules 2404 (2912). Data collection module 2806 may, for example, send data requests to encoder modules 2404 when it is ready to combine the data into a superframe. Data collection module 2806 receives encoded segments of data in response to the commands (2914). Multiplex module 2800 assembles the superframe by combining the encoded segments of multimedia data (2916). Multiplex module 2800 may then send the superframe to transmitter 2408 for transmission (2918). In some cases, multiplex module 2800 may buffer the superframe until transmitter 2408 requests the superframe.

Figure 30:
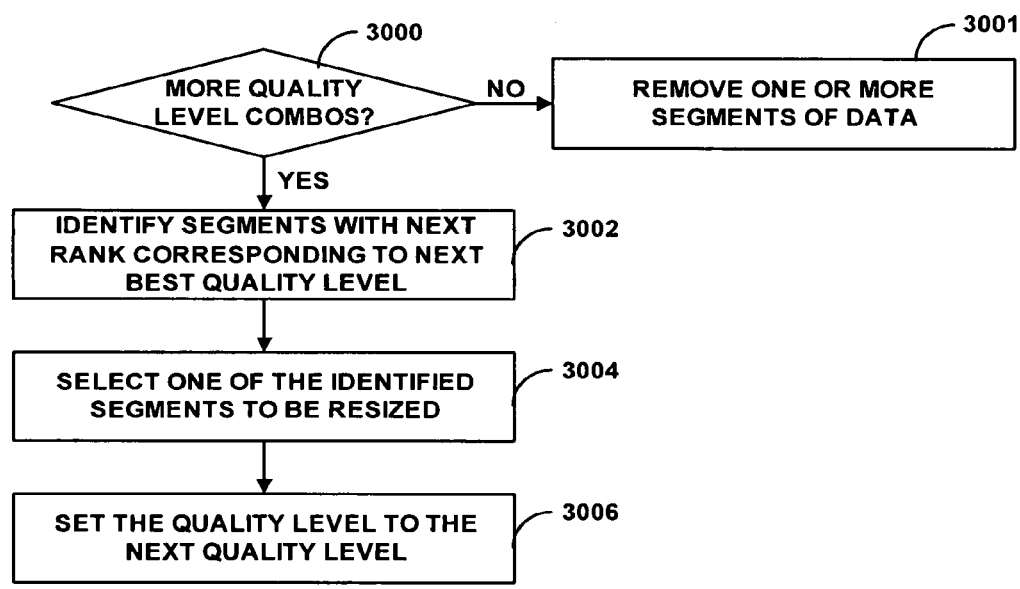
FIG. 30 is a flow diagram illustrating exemplary operation of a multiplex module selecting segments of data to be resized using quality-rate tables associated with the segments of data.

FIG. 30 is a flow diagram illustrating exemplary operation of multiplex module 2800 selecting segments of data to be resized using quality-rate tables associated with the segments of data. Initially, selection module 2810 determines whether there are any other possible rank combinations (3000). Selection module 2810 may analyze the quality-rate tables to determine whether there are any segments of data that are not at the worst rank. In the examples described above, the worst rank may correspond to the highest numbered rank. If there are no other possible rank combinations, i.e., each of the segments of data is at its worst rank, selection module 2810 begins to select one or more segments of data to remove from the superframe (3001). Selection module 2810 may, for example, select one or more segments to be removed from the superframe using the congestion control algorithm described above.

If there are other possible rank combinations, selection module 2810 identifies one or more segments of data that have next ranks corresponding to the next best quality level (3002). For example, selection module 2810 may identify the segments of data that have the smallest next rank when the quality-rate tables are generated as described above. In this manner, selection module 2810 analyzes the quality-rate tables to identify one or more streams with subsequent quality levels corresponding to a next best quality level.

Selection module 2810 selects one of the identified segments of data to be resized (3004). If only one segment of data has the smallest next rank value, multiplex module 2800 selects that segment. If two or more segments of data have the same next rank, selection module 2810 may select the identified segment of data with the largest size associated with the current rank. Alternatively, selection module 2810 may select the identified segment of data with the largest difference between the size of the segment at the current rank and the size of the segment at the next rank.

Selection module 2810 sets the rank associated with the selected segment of data to the next rank (3006). After selection module 2810 selects one or more of the segments of data, allocation module 2808 re-attempts to allocate the available bandwidth using the sizes associated with the reduced rank for the selected segment of data. If the allocation algorithm is still unsuccessful, selection module 2810 selects additional segments of data to be resized or the same segments to be resized at an even more reduced quality in a similar manner as described above.

The techniques described herein may be implemented in hardware, software, firmware, or any combination thereof. If implemented in hardware, the techniques may be realized using digital hardware, analog hardware or a combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other tangible medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

A computer program product, as disclosed herein, includes a computer-readable medium as well as any materials associated with the computer-readable medium, including packaging materials within which the computer-readable medium is packaged. The code associated with a computer-readable medium of a computer program product may be executed by a computer, e.g., by one or more processors, such as one or more digital signal processors (DSPs), general purpose microprocessors, ASICs, FPGAs, or other equivalent integrated or discrete logic circuitry. In some aspects, the functionality described herein may be provided within dedicated software modules or hardware modules configured for encoding and decoding, or incorporated in a combined CODEC.

Various aspects have been described. These and other aspects are within the scope of the following claims.

What is claimed is:

1. A method performed by a multimedia encoding device, the method comprising:
   determining that a plurality of data segments, which are associated with flows of digital multimedia data, do not fit within a bandwidth; and
   in response to determining that the plurality of data segments do not fit within the bandwidth:
   selecting a first subset of the plurality of data segments upon which a reduction in size will have a lesser amount of impact on the quality thereof so as to reduce impact of a size reduction of the plurality of data segments on an overall quality, wherein the overall quality is a function of a bit rate associated with each data segment and a priority associated with each data segment; and applying a first size reduction to the selected first subset of the plurality of data segments such that the plurality of data segments fit within the bandwidth, wherein applying comprises assigning a bit rate to each of the selected data segments such that a resultant quality associated with each data segment is proportional to the priority associated with the data segment.

2. The method of claim 1, further comprising:
transmitting the plurality of data segments within the bandwidth.

3. The method of claim 1, wherein selecting a first subset of the data segments comprises:
assessing the impact on the quality of the first subset of the plurality of data segments at the reduced size;
assessing the impact on the quality of a second subset of the plurality of data segments at a second reduced size;
determining that the impact on the quality of the first subset of the plurality of data segments at the reduced size is less than the impact on the quality of the second subset of the plurality of data segments at the second reduced size; and
in response to determining that the impact on the quality of the first subset of the plurality of data segments at the reduced size is less than the impact on the quality of the second subset of the plurality of data segments at the second reduced size, selecting the first subset.

4. The method of claim 3, further comprising:
transmitting the plurality of data segments within the bandwidth.

5. A system comprising:
a multimedia encoding device configured to:
determine that a plurality of data segments, which are associated with flows of digital multimedia data, do not fit within a bandwidth; and
in response to determining that the plurality of data segments do not fit within the bandwidth:
select a first subset of the plurality of data segments upon which a reduction in size will have a lesser amount of impact on the quality thereof so as to reduce impact of a size reduction of the plurality of data segments on an overall quality, wherein the overall quality is a function of a bit rate associated with each data segment and a priority associated with each data segment; and
apply a first size reduction to the selected first subset of the plurality of data segments such that the plurality of data segments fit within the bandwidth, wherein applying comprises assigning a bit rate to each of the selected data segments such that a resultant quality associated with each data segment is proportional to the priority associated with the data segment.

6. The system of claim 5, wherein the multimedia encoding device is further configured to:
transmit the plurality of data segments within the bandwidth.

7. The system of claim 5, wherein the multimedia encoding device is configured to select the first subset of the plurality of data segments by being further configured to:
assess the impact on the quality of the first subset of the plurality of data segments at the reduced size;
assess the impact on the quality of a second subset of the plurality of data segments at a second reduced size;
determine that the impact on the quality of the first subset of the plurality of data segments at the reduced size is less than the impact on the quality of the second subset of the plurality of data segments at the second reduced size; and
in response to determining that the impact on the quality of the first subset of the plurality of data segments at the reduced size is less than the impact on the quality of the second subset of the plurality of data segments at the second reduced size, select the first subset.

8. The system of claim 7, wherein the multimedia encoding device is further configured to:
transmit the plurality of data segments within the bandwidth.

9. An apparatus comprising:
means for determining that a plurality of data segments, which are associated with flows of digital multimedia data, do not fit within a bandwidth; and
means for, in response to determining that the plurality of data segments do not fit within the bandwidth:
selecting a first subset of the plurality of data segments upon which a reduction in size will have a lesser amount of impact on the quality thereof so as to reduce impact of a size reduction of the plurality of data segments on an overall quality, wherein the overall quality is a function of a bit rate associated with each data segment and a priority associated with each data segment; and
applying the first size reduction to the selected first subset of the plurality of data segments such that the plurality of data segments fit within the bandwidth, wherein applying comprises assigning a bit rate to each of the selected data segments such that a resultant quality associated with each data segment is proportional to the priority associated with the data segment.

10. The apparatus of claim 9, further comprising:
means for transmitting the plurality of data segments within the bandwidth.

11. A non-transitory machine-readable medium having stored thereon one or more machine-executable instructions for performing a method, the method comprising:
determining that a plurality of data segments, which are associated with flows of digital multimedia data, do not fit within a bandwidth; and
in response to determining that the plurality of data segments do not fit within the bandwidth:
selecting a first subset of the plurality of data segments upon which a reduction in size will have a lesser amount of impact on the quality thereof so as to reduce impact of a size reduction of the plurality of data segments on an overall quality, wherein the overall quality is a function of a bit rate associated with each data segment and a priority associated with each data segment; and
applying a first size reduction to the selected first subset of the plurality of data segments such that the plurality of data segments fit within the bandwidth, wherein applying comprises assigning a bit rate to each of the selected data segments such that a resultant quality associated with each data segment is proportional to the priority associated with the data segment.

12. The medium of claim 11, wherein the method further comprises:

transmitting the plurality of data segments within the bandwidth.

13. The medium of claim 11, wherein selecting the first subset of the data segments comprises:
- assessing the impact on the quality of the first subset of the plurality of data segments at the reduced size;
- assessing an impact on the quality of a second subset of the plurality of data segments at a second reduced size;
- determining that the impact on the quality of the first subset of the plurality of data segments at the reduced size is less than the impact on the quality of the second subset of the plurality of data segments at the second reduced size; and
- in response to determining that the impact on the quality of the first subset of the plurality of data segments at the reduced size is less than the impact on the quality of the second subset of the plurality of data segments at the second reduced size, selecting the first subset.

14. The medium of claim 13, wherein the method further comprises:
- transmitting the plurality of data segments within the bandwidth.

\* \* \* \* \*